United States Patent
Mitsuhashi

(10) Patent No.: US 12,066,454 B2
(45) Date of Patent: Aug. 20, 2024

(54) ENCODER DEVICE AND MANUFACTURING METHOD THEREOF, DRIVE DEVICE, STAGE DEVICE, AND ROBOT DEVICE

(71) Applicant: NIKON CORPORATION, Tokyo (JP)

(72) Inventor: Yuichi Mitsuhashi, Sendai (JP)

(73) Assignee: NIKON CORPORATION, Tokyo (JP)

( * ) Notice: Subject to any disclaimer, the term of this patent is extended or adjusted under 35 U.S.C. 154(b) by 910 days.

(21) Appl. No.: 17/041,271

(22) PCT Filed: Mar. 22, 2019

(86) PCT No.: PCT/JP2019/012280
§ 371 (c)(1),
(2) Date: Sep. 24, 2020

(87) PCT Pub. No.: WO2019/188859
PCT Pub. Date: Oct. 3, 2019

(65) Prior Publication Data
US 2021/0109122 A1    Apr. 15, 2021

(30) Foreign Application Priority Data
Mar. 28, 2018 (JP) .................. 2018-061036

(51) Int. Cl.
*G06F 11/30* (2006.01)
*G01D 5/14* (2006.01)
(Continued)

(52) U.S. Cl.
CPC ............ *G01P 3/4815* (2013.01); *G01D 5/145* (2013.01); *G01D 5/2458* (2013.01); *G01P 3/487* (2013.01)

(58) Field of Classification Search
CPC .................................................... G01P 3/4815
See application file for complete search history.

(56) References Cited

U.S. PATENT DOCUMENTS

| | | |
|---|---|---|
| 8,655,615 B2 | 2/2014 | Mehnert et al. |
| 9,200,925 B2 | 12/2015 | Mehnert et al. |
| (Continued) | | |

FOREIGN PATENT DOCUMENTS

| | | |
|---|---|---|
| CN | 101821591 A | 9/2010 |
| CN | 106537093 A | 3/2017 |
| (Continued) | | |

OTHER PUBLICATIONS

Jan. 12, 2023 Office Action issued in Chinese Patent Application No. 201980013309.5.

(Continued)

*Primary Examiner* — Phuong Huynh
(74) *Attorney, Agent, or Firm* — Oliff PLC

(57) ABSTRACT

An encoder device including: a position detection unit for detecting position information of a moving part; a magnet having a plurality of polarities along a moving direction of the moving part; an electric signal generation unit for generating an electric signal, based on a magnetic characteristic of a magnetosensitive part, the electric signal generation unit having the magnetosensitive part whose magnetic characteristic is changed by a change in magnetic field associated with movement of the moving part and a first magnetic body for guiding magnetic flux lines of the magnet toward the magnetosensitive part; and a second magnetic body for guiding magnetic flux lines of a part having one polarity of the magnet toward a part having other polarity of the magnet, the second magnetic body being disposed between the magnet and the magnetosensitive part.

25 Claims, 33 Drawing Sheets

(51) Int. Cl.
  *G01D 5/245* (2006.01)
  *G01P 3/481* (2006.01)
  *G01P 3/487* (2006.01)

(56) References Cited

U.S. PATENT DOCUMENTS

| 2010/0213927 | A1 | | 8/2010 | Mehnert et al. |
| 2011/0184691 | A1 | | 7/2011 | Mehnert et al. |
| 2014/0067301 | A1 | * | 3/2014 | Mehnert ............... G01D 5/2454 702/78 |

FOREIGN PATENT DOCUMENTS

| JP | S57-46816 | U | | 3/1982 |
| JP | H08-136558 | A | | 5/1996 |
| JP | 2000-161989 | A | | 6/2000 |
| JP | 2000161989 | A | * | 6/2000 |
| JP | 2001-133286 | A | | 5/2001 |
| JP | 2001-343207 | A | | 12/2001 |
| JP | 2005-114609 | A | | 4/2005 |
| JP | 2018-36138 | A | | 3/2018 |
| JP | 201836138 | | * | 3/2018 |

OTHER PUBLICATIONS

May 6, 2022 Office Action issued in Chinese Patent Application No. 201980013309.5.

Jun. 4, 2019 Search Report issued in International Patent Application No. PCT/JP2019/012280.

Jun. 4, 2019 Written Opinion of the International Searching Authority issued in International Patent Application No. PCT/JP2019/012280.

Mar. 3, 2021 Office Action issued in Japanese Patent Application No. 2020-510005.

* cited by examiner

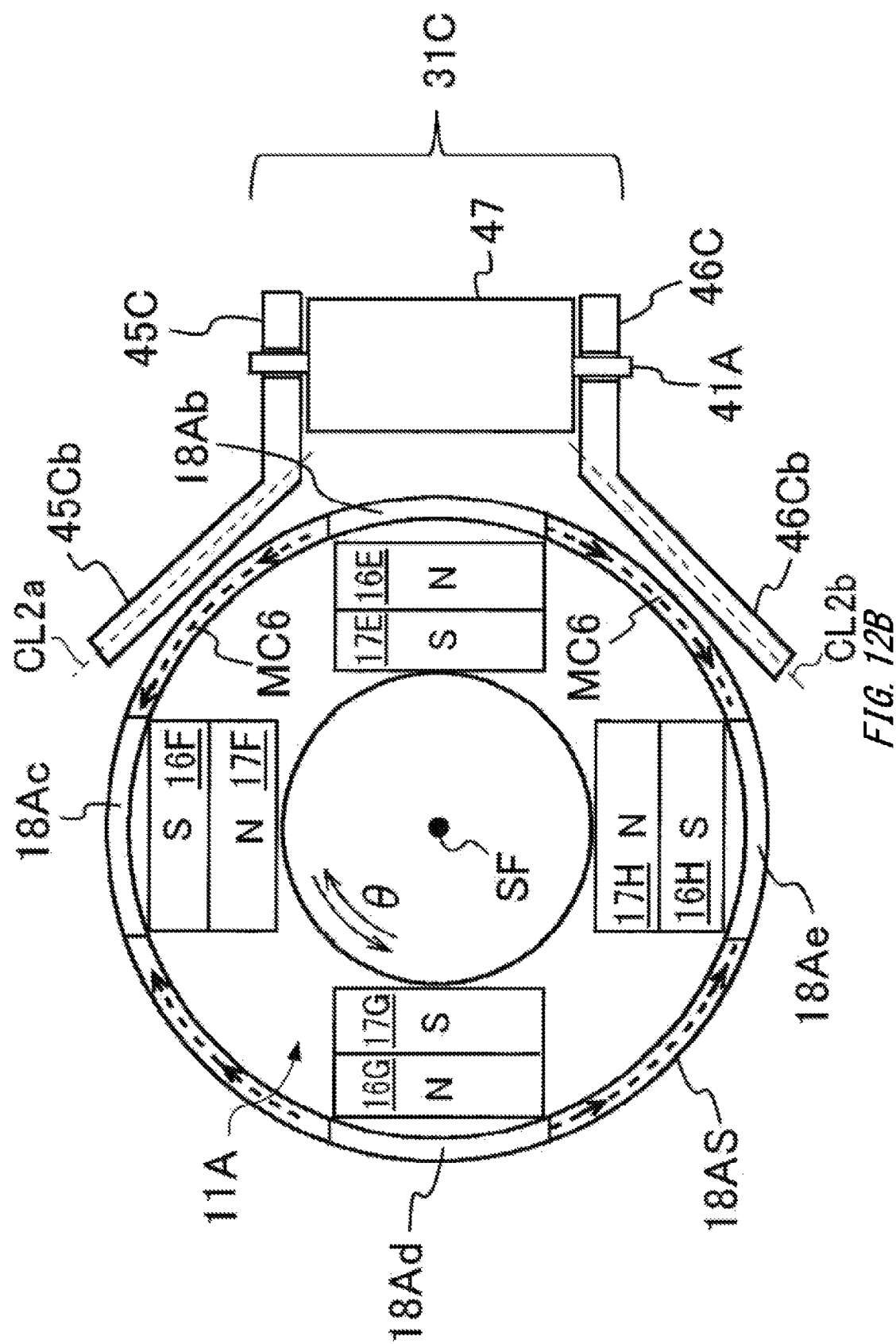

ENCODER DEVICE AND MANUFACTURING METHOD THEREOF, DRIVE DEVICE, STAGE DEVICE, AND ROBOT DEVICE

The contents of the following Japanese patent application are incorporated herein by reference:
No. 2018-061036 filed in JP on Mar. 28, 2018, and
No. PCT/JP2019/012280 filed in WO on Mar. 22, 2019.

BACKGROUND

1. Technical Field

The present invention relates to an encoder device, a manufacturing method of an encoder device, a drive device, a stage device, and a robot device.

2. Related Art

An encoder device that detects position information of an object to be detected, such as a rotating angle, a rotating speed and the like is mounted to a variety of devices such as a robot device. As the encoder device of the related art, known is a device that converts a change in magnetic field of a rotating magnet into an electric signal by using a magnetic wire such as a Wiegand wire and obtains a rotating speed by using the electric signal (for example, see Patent Document 1). For the encoder device in which the magnetic wire is used as described above, it is needed to generate a stable electric signal by reducing noises due to an unnecessary magnetic field of the magnet, thereby improving reliability of a detection result.

Patent Document 1: Japanese Patent Application Publication No. H08-136558

GENERAL DISCLOSURE

According to a first aspect, there is provided an encoder device comprising a position detection unit for detecting position information of a moving part; a magnet having a plurality of polarities along a moving direction of the moving part; an electric signal generation unit for generating an electric signal, based on a magnetic characteristic of a magnetosensitive part, the electric signal generation unit having the magnetosensitive part whose magnetic characteristic is changed by a change in magnetic field associated with movement of the moving part and a first magnetic body for guiding magnetic flux lines of the magnet toward the magnetosensitive part; and a second magnetic body for guiding magnetic flux lines of a part having one polarity of the magnet toward a part having other polarity of the magnet, the second magnetic body being disposed between the magnet and the magnetosensitive part.

According to a second aspect, there is provided a drive device comprising the encoder device according to the first aspect; and a power supplying unit for supplying power to the moving part. According to a third aspect, there is provided a stage device comprising a moving object; and the drive device according to the second aspect for moving the moving object. According to a fourth aspect, there is provided a robot device comprising the drive device according to the second aspect, and an arm for causing relative movement by the drive device.

According to a fifth aspect, there is provided a manufacturing method of an encoder device, the encoder device comprising: a position detection unit for detecting position information of a moving part; a magnet having a plurality of polarities along a moving direction of the moving part; an electric signal generation unit having a magnetosensitive part whose magnetic characteristic is changed by a change in magnetic field associated with movement of the moving part, an electric power generation part for generating an electric signal based on the magnetic characteristic of the magnetosensitive part, and a first magnetic body for guiding magnetic flux lines of the magnet toward the magnetosensitive part; and a second magnetic body for guiding magnetic flux lines of a part having one polarity of the magnet toward a part having other polarity of the magnet, the second magnetic body being disposed between the magnet and the magnetosensitive part, the manufacturing method of the encoder device comprising: preparing the magnetosensitive part, the electric power generation part, and the first magnetic body; inserting the electric power generation part into a first hole portion of an assembling jig and inserting the magnetosensitive part into a second hole portion provided in the first hole portion through the electric power generation part; fixing the electric power generation part and the magnetosensitive part; and fixing the electric power generation part taken out from the assembling jig to a housing disposed on a side surface of the second magnetic body.

According to a sixth aspect, there is provided a manufacturing method of an encoder device, the encoder device comprising: a position detection unit for detecting position information of a moving part; a magnet having a plurality of polarities along a moving direction of the moving part; an electric signal generation unit having a magnetosensitive part whose magnetic characteristic is changed by a change in magnetic field associated with movement of the moving part, an electric power generation part for generating an electric signal based on the magnetic characteristic of the magnetosensitive part, and a first magnetic body for guiding magnetic flux lines of the magnet toward the magnetosensitive part; and a second magnetic body for guiding magnetic flux lines of a part having one polarity of the magnet toward a part having other polarity of the magnet, the second magnetic body being disposed between the magnet and the magnetosensitive part, the manufacturing method of the encoder device comprising: preparing the magnetosensitive part, the electric power generation part, and the first magnetic body; fixing the electric power generation part to a housing disposed on a side surface of the second magnetic body; inserting the magnetosensitive part into the electric power generation part through an opening provided in the housing; and fixing the magnetosensitive part to the housing.

BRIEF DESCRIPTION OF THE DRAWINGS

FIG. 12B is a plan view of FIG. 12A.

DESCRIPTION OF EXEMPLARY EMBODIMENTS

First Embodiment

Figure 1:
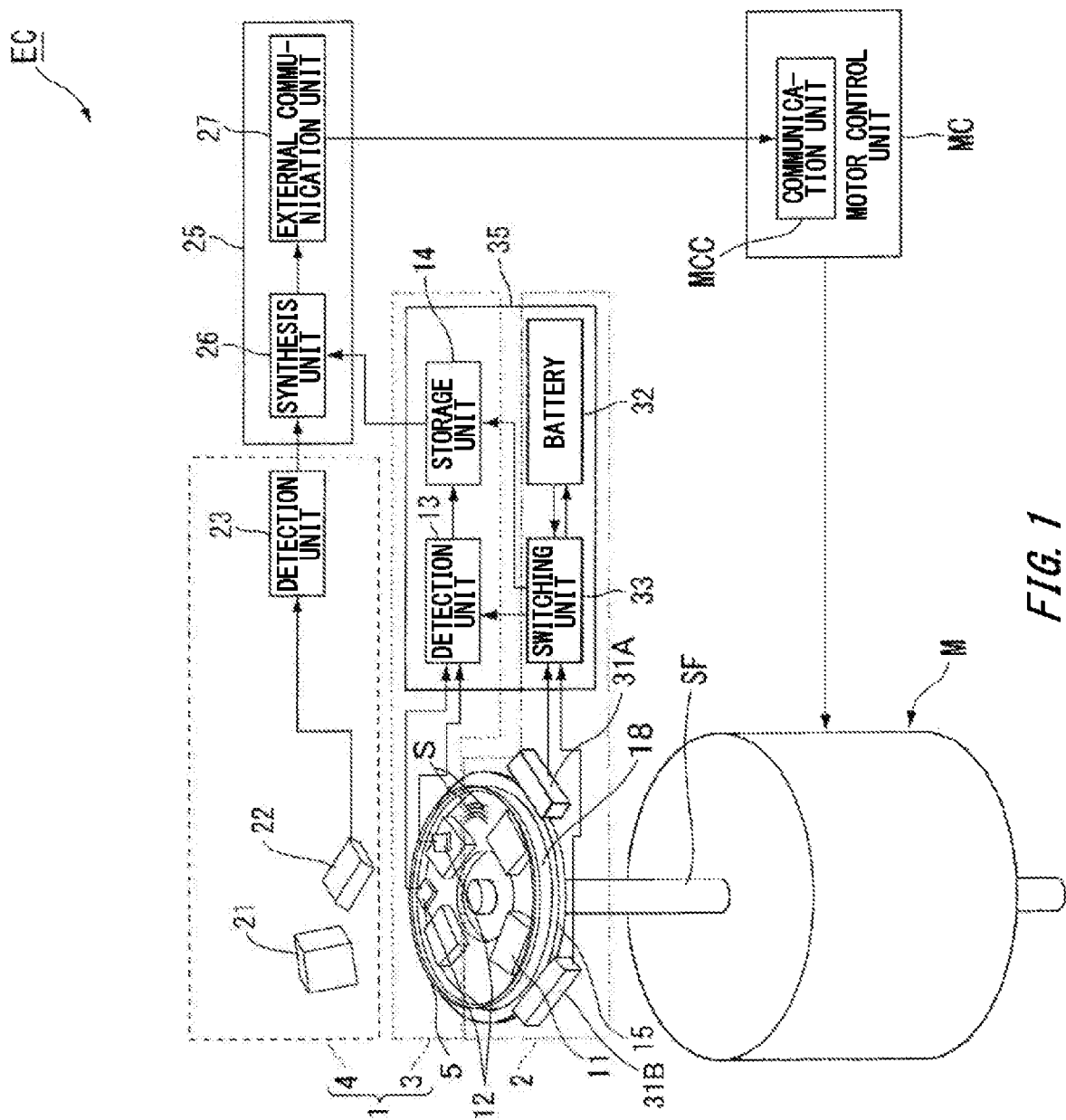
FIG. 1 shows an encoder device in accordance with a first embodiment.

A first embodiment is described with reference to FIG. 1 to FIG. 9B. FIG. 1 shows an encoder device EC in accordance with the present embodiment. In FIG. 1, the encoder device EC detects rotational position information of a rotary shaft SF (moving part) of a motor M (power supplying unit). The rotary shaft SF is, for example, a shaft (rotor) of the motor M, but may also be an operation shaft (output shaft) connected to the shaft of the motor M via a power transmission unit such as a transmission and also connected to a load. The rotational position information detected by the encoder device EC is supplied to a motor control unit MC.

The motor control unit MC controls rotation of the motor M by using the rotational position information supplied from the encoder device EC. The motor control unit MC controls rotation of the rotary shaft SF.

The encoder device EC comprises a position detection system (position detection unit) 1 and an electric power supplying system (electric power supplying unit) 2. The position detection system 1 detects the rotational position information of the rotary shaft SF. The encoder device EC is a so-called multi-turn absolute encoder, and detects the rotational position information including multi-turn information indicative of the number of rotations of the rotary shaft SF and angular position information indicative of an angular position (rotating angle) less than one-turn. The encoder device EC comprises a multi-turn information detection unit 3 for detecting the multi-turn information of the rotary shaft SF, and an angle detection unit 4 for detecting the angular position of the rotary shaft SF.

At least a part (for example, an angle detection unit 4) of the position detection system 1 operates by receiving electric power supply from a device (for example, a drive device, a stage device, a robot device) on which the encoder device EC is mounted, in a state (for example, a normal state) where a power supply of the device is on, for example. Also, at least a part (for example, a multi-turn information detection unit 3) of the position detection system 1 operates by receiving electric power supply from the electric power supplying system 2, in a state (for example, an abnormal state and a backup state) where a power supply of the device on which the encoder device EC is mounted is off. For example, in a state where the supply of electric power from the device on which the encoder device EC is mounted is cut off, the electric power supplying system 2 intermittently supplies electric power to at least a part (for example, the multi-turn information detection unit 3) of the position detection system 1, and the position detection system 1 detects at least a part (for example, multi-turn information) of the rotational position information of the rotary shaft SF during electric power is supplied from the electric power supplying system 2.

The multi-turn information detection unit 3 detects multi-turn information by magnetism, for example. The multi-turn information detection unit 3 includes, for example, a magnet 11, magnetism detection units 12, a detection unit 13, and a storage unit 14. The magnet 11 is a block-shaped divided magnet or a annular-shaped magnet, and is provided on a bottom surface (an inside of a side surface) of a yoke member 18 (which will be described in detail later) having a short cylindrical side surface and an annular bottom surface. The yoke member 18 is fixed to the rotary shaft SF via a disc-shaped support member 15, as an example. An upper surface of the yoke member 18 is provided with a disc 5 having an annular flat plate shape so as to cover the magnet 11. Since the disc 5 and the yoke member 18 rotate together with the rotary shaft SF, the magnet 11 rotates in conjunction with the rotary shaft SF. Mutual relative positions of the magnet 11 and the magnetism detection unit 12 are changed by the rotation of the rotary shaft SF. The strength and direction of a magnetic field on the magnetism detection unit 12 formed by the magnet 11 are changed by the rotation of the rotary shaft SF. The magnetism detection unit 12 detects a magnetic field that is formed by the magnet, and the detection unit 13 detects the position information of the rotary shaft SF, based on a detection result of the magnetism detection unit 12 detecting the magnetic field that is formed by the magnet 11. The storage unit 14 stores the position information detected by the detection unit 13. Note that, the magnet 11 may also be configured to rotate relative to the rotary shaft SF.

The angle detection unit 4 is an optic or magnetic encoder, and detects position information (angular position information) within one-turn of the disc 5. For example, in a case where the angle detection unit 4 is an optic encoder, the angle detection unit 4 detects the angular position within one-turn of the rotary shaft SF by reading patterning information of the disc 5 with a light-receiving element, for example. The patterning information of the disc 5 is, for example, a pattern with bright and dark slits on the disc 5. The angle detection unit 4 detects the angular position information of the rotary shaft SF that is the same as a detection target of the multi-turn information detection unit 3. The angle detection unit 4 includes a light-emitting element 21, the disc 5, a light-receiving sensor 22, and a detection unit 23.

The disc 5 rotates in conjunction with the rotary shaft SF. An incremental scale S and an absolute scale S are formed on an upper surface (a surface facing the light-emitting element 21 and the light-receiving sensor 22) of the disc 5. The scale S may also be provided on another disc-shaped member (not shown) fixed to the rotary shaft SF or may be a member integrated with the disc-shaped member. For example, the disc 5 may be provided between the magnet 11 and the motor M. The scale S may be provided on at least one of the inside and the outside of the magnet 11.

The light-emitting element 21 (an irradiation unit, a light-emitting unit) irradiates the scale S of the disc 5 with light. The light-receiving sensor 22 (a light detection unit) detects light emitted from the light-emitting element 21 and passing through the scale S. In FIG. 1, the angle detection unit 4 is a reflection type, and the light-receiving sensor 22 detects light reflected on the scale S. Note that, the angle detection unit 4 may also be a transmission type. The light-receiving sensor 22 supplies a signal indicative of a detection result to the detection unit 23. The detection unit 23 detects the angular position of the rotary shaft SF by using the detection result of the light-receiving sensor 22. For example, the detection unit 23 detects an angular position of a first resolution by using a detection result of light from the absolute scale. Also, the detection unit 23 detects an angular position of a second resolution higher than the first resolution by performing interpolation calculation on the angular position of the first resolution by using a detection result of light from the incremental scale.

In the present embodiment, the encoder device EC comprises a signal processing unit 25. The signal processing unit 25 calculates and processes a detection result of the position detection system 1. The signal processing unit 25 includes a synthesis unit 26 and an external communication unit 27. The synthesis unit 26 acquires the angular position information of the second resolution detected by the detection unit 23. Also, the synthesis unit 26 acquires the multi-turn information of the rotary shaft SF from the storage unit 14 of the multi-turn information detection unit 3. The synthesis unit 26 synthesizes the angular position information from the detection unit 23 and the multi-turn information from the multi-turn information detection unit 3, and calculates the rotational position information. For example, when the detection result of the detection unit 23 is θ (rad) and the detection result of the multi-turn information detection unit 3 is n-turn, the synthesis unit 26 calculates (2π×n+θ) (rad), as the rotational position information. The rotational position information may also be information in which the multi-turn information and the angular position information less than one-turn are combined.

The synthesis unit 26 supplies the rotational position information to the external communication unit 27. The external communication unit 27 is communicatively connected to a communication unit MCC of the motor control unit MC in a wired or wireless manner. The external communication unit 27 supplies the rotational position information of a digital format to the communication unit MCC of the motor control unit MC. The motor control unit MC appropriately decodes the rotational position information from the external communication unit 27 of the angle detection unit 4. The motor control unit MC controls the rotation of the motor M by controlling electric power (drive electric power) supplied to the motor M by using the rotational position information.

The electric power supplying system 2 includes a first electric signal generation unit 31A and a second electric signal generation unit 31B, a battery 32, and a switching unit 33. The electric signal generation units 31A and 31B each generate an electric signal by the rotation of the rotary shaft SF. The electric signal includes a waveform where electric power (current, voltage) changes over time, for example. The electric signal generation units 31A and 31B each generate electric power as the electric signal by a magnetic field that changes based on the rotation of the rotary shaft SF, for example. For example, the electric signal generation units 31A and 31B generate electric power by a change in magnetic field formed by the magnet 11 that is used for the multi-turn information detection unit 3 to detect the multi-turn position of the rotary shaft SF. The electric signal generation units 31A and 31B are each disposed so that a relative angular position to the magnet 11 is changed by the rotation of the rotary shaft SF. The electric signal generation units 31A and 31B generate positive or negative pulsed electric signals when relative positions of the electric signal generation units 31A and 31B and the magnet 11 each reach predetermined positions, for example. By performing full-wave rectification by a rectifier or the like on the electric signals, DC electric signals that can be easily used in an electric circuit and the like are obtained.

The battery 32 supplies at least a part of electric power that is consumed in the position detection system 1, based on the electric signals generated from the electric signal generation units 31A and 31B. The battery 32 includes, for example, a primary battery 36 such as a button-shaped battery and a dry-cell battery, and a rechargeable secondary battery 37 (see FIG. 4). The secondary battery of the battery 32 can be recharged by the electric signals (for example, current) generated from the electric signal generation units 31A and 31B, for example. The battery 32 is held in a holder 35. The holder 35 is, for example, a circuit substrate or the like on which at least a part of the position detection system 1 is provided. The holder 35 holds the detection unit 13, the switching unit 33, and the storage unit 14, for example. The holder 35 is provided with a plurality of battery cases capable of accommodating the battery 32, and an electrode, a wire and the like connected to the battery 32, for example.

The switching unit 33 switches whether to supply electric power from the battery 32 to the position detection system 1, based on the electric signals generated from the electric signal generation units 31A and 31B. For example, the switching unit 33 starts supply of electric power from the battery 32 to the position detection system 1 when post-full-wave-rectification levels of the electric signals generated from the electric signal generation units 31A and 31B become equal to or higher than a threshold value. Also, for example, the switching unit 33 stops the supply of electric power from the battery 32 to the position detection system 1 when the post-full-wave-rectification levels of the electric signals generated from the electric signal generation units 31A and 31B become lower than the threshold value. For example, the switching unit 33 stops the supply of electric power from the battery 32 to the position detection system 1 when the electric power generated from the electric signal generation units 31A and 31B becomes lower than the threshold value. For example, in a case where a pulsed electric signal is generated in the electric signal generation units 31A and 31B, the switching unit 33 starts the supply of electric power from the battery 32 to the position detection system 1 at the time when a post-full-wave-rectification level (electric power) of the electric signal rises from a low level to a high level, and stops the supply of electric power from the battery 32 to the position detection system 1 after a predetermined time elapses since the level (electric power) changes to the low level.

Figure 2A:
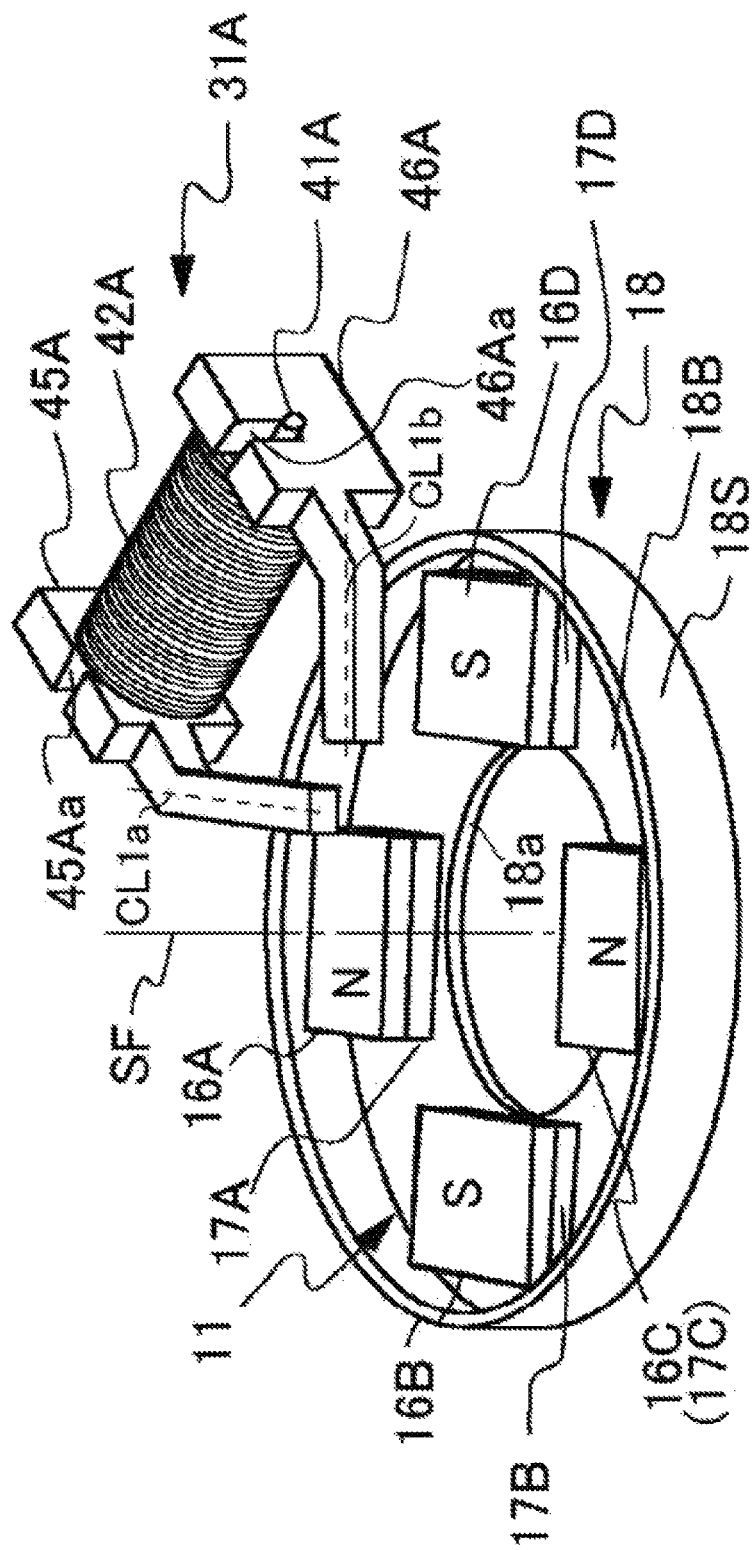
FIG. 2A is a perspective view showing a magnet and an electric signal generation unit in FIG. 1.
Figure 2B:
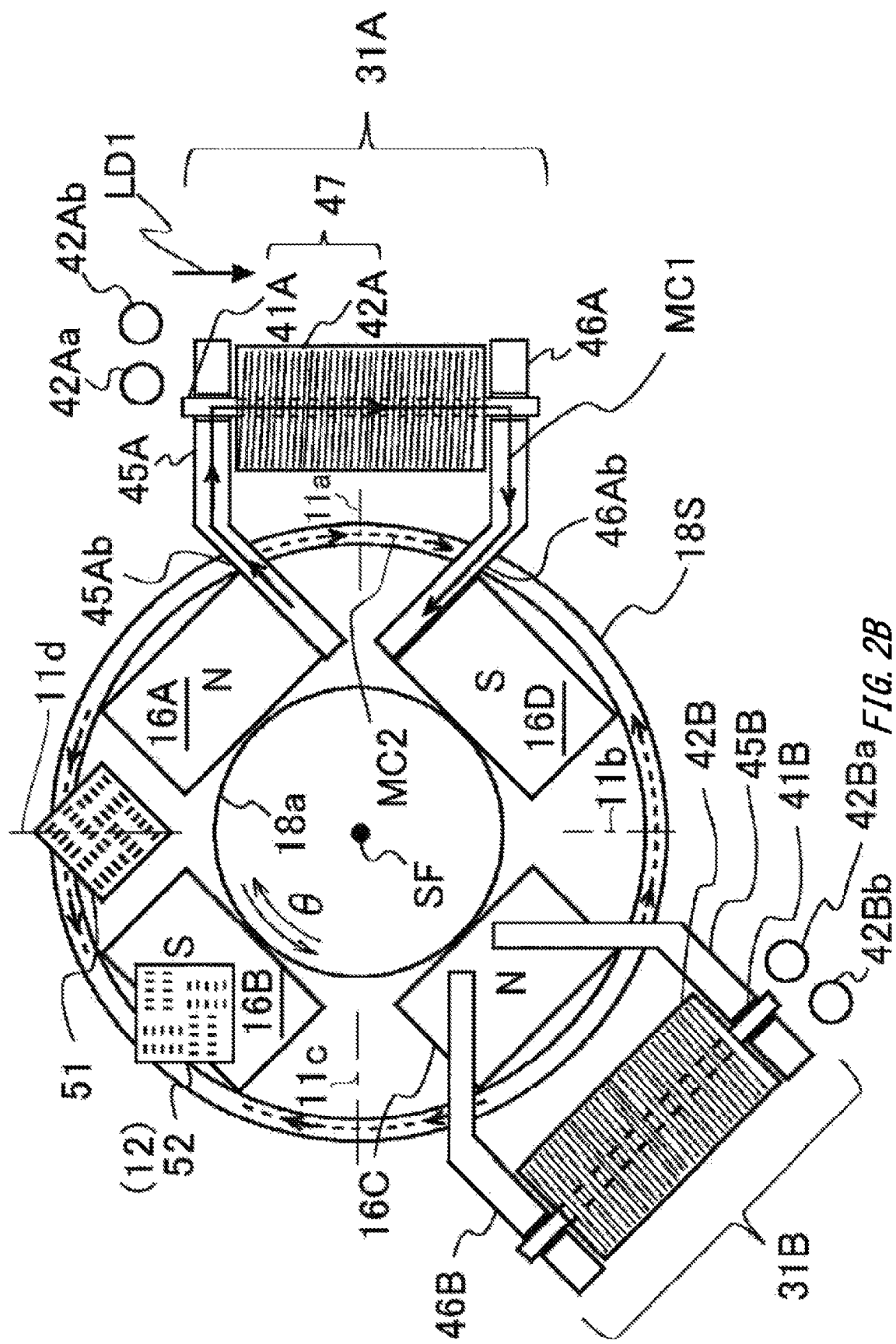
FIG. 2B is a plan view showing the magnet, the electric signal generation unit, and a magnetic sensor in FIG. 1.
Figure 2C:
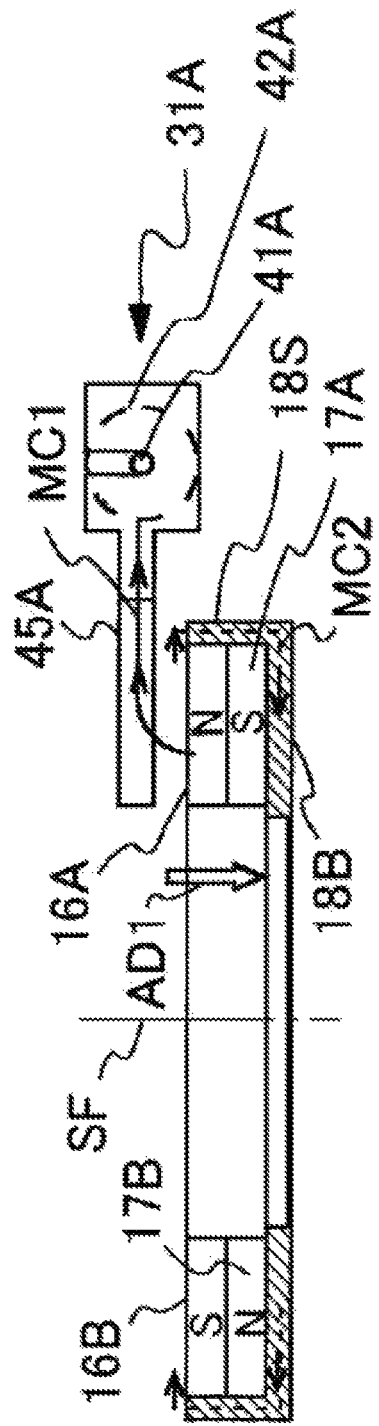
FIG. 2C is a sectional side view showing the magnet and the like in FIG. 2A.
Figure 2D:
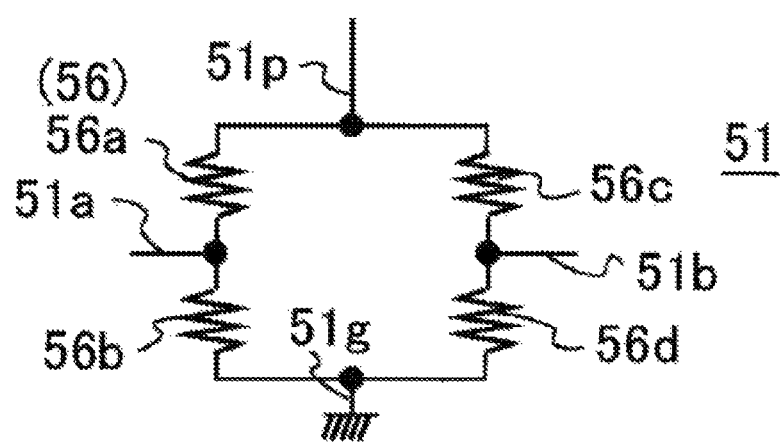
FIG. 2D is a circuit diagram showing the magnetic sensor in FIG. 2B.

FIG. 2B is a plan view showing the magnet 11 in FIG. 1, the electric signal generation units 31A and 31B, and two magnetic sensors 51 and 52 that are the magnetism detection units 12, and FIG. 2C is a sectional side view showing the yoke member 18 in FIG. 2B. Also, FIG. 2A is a perspective view showing the magnet 11 and one electric signal generation unit 31A, and FIG. 2D is a circuit diagram of the magnetic sensor 51. Note that, in FIG. 2A and the like, the rotary shaft SF of FIG. 1 is shown with a straight line.

In FIG. 2A to FIG. 2C, the magnet 11 is mounted on the yoke member 18 so that rotation changes the direction and strength of the magnetic field in an axial direction AD1 that is a direction parallel to a straight line (symmetrical axis) passing through a center of the rotary shaft SF. The magnet 11 is configured by a pair of rectangular magnets of N poles 16A and 16C disposed to symmetrically sandwich the rotary shaft SF, magnets of S poles 16B and 16D located in positions rotated by 90° from the N poles 16A and 16C around the rotary shaft SF, and magnets of S poles 17A and 17C and N poles 17B and 17D of the same shape disposed on back surfaces (surfaces on the same side as the motor M) of the N poles 16A and 16C and S poles 16B and 16D, respectively. The magnet 11 is a combination of a plurality of (four, in FIG. 2A) permanent magnets magnetized to have four pairs of polarities along a circumferential direction (also referred to as a θ direction or a rotating direction) around the rotary shaft SF. Note that, the magnet 11 may also be configured by one annular (annular-shaped) magnet, for example, and the magnet may be magnetized to have the N pole 16A to the S pole 16D. Also, for example, the member consisting of the N pole 16A and the S pole 17A may be regarded as one magnetic element magnetized to have two magnetic poles (an N pole and an S pole). The member consisting of the N pole 16A and the S pole 17A can be manufactured, for example, by magnetizing one ferromagnetic body having a size of combining the N pole 16A and the S pole 17A.

A front surface (a surface opposite to the motor M in FIG. 1) and a back surface that are main surfaces of the magnet 11 are each substantially perpendicular to the rotary shaft SF. In the magnet 11, the N pole 16A to the S pole 16D on the front surface-side and the S pole 17A to the N pole 17D on the back surface-side are offset by 90° in angle (for example, in positions of the respective N poles and the S poles) (180° in phase). Herein, for convenience of descriptions, rotation in a counterclockwise direction is referred to as forward rotation, and rotation in a clockwise direction is referred to as reverse rotation, as seen from a tip end side of the rotary shaft SF (an opposite side to the motor M in FIG. 1). Also, an angle of the forward rotation is indicated by a positive value, and an angle of the reverse rotation is indicated by a negative value. Note that, rotation in a counterclockwise direction may be defined as forward rotation, and rotation in a clockwise direction may be defined as reverse rotation, as seen from a rear end side of the rotary shaft SF (a motor M-side in FIG. 1).

Herein, in a coordinate system fixed to the magnet 11, an intermediate angular position between the S pole 16D and the N pole 16A in the circumferential direction is denoted as a first position 11a, and angular positions (middles between the N pole and the S pole) sequentially rotated by 90° from the first position 11a are each denoted as second, third and fourth positions 11b, 11c and 11d. In a first section from the first position 11a to the position 90° counterclockwise, the N pole 16A is disposed on the front surface-side of the magnet 11, and the S pole 17A is disposed on the back surface-side of the magnet 11. In the first section, a direction of the magnetic field of the magnet 11 in the axial direction is substantially parallel to the axial direction AD1 (see FIG. 2C) from the front surface-side toward the back surface-side of the magnet 11. In the first section, the strength of the magnetic field is maximized at the middle position of the N pole 16A, and is minimized near the first position 11a and the fourth position 11d.

In a second section from the second position 11b to the position 90° counterclockwise (a section in which the S pole is disposed on the front surface-side of the magnet 11, and the N pole is disposed on the back surface-side of the magnet 11), a direction of the magnetic field of the magnet 11 in the axial direction is substantially a direction from the back surface-side toward the front surface-side of the magnet 11 (for example, an opposite direction to the direction of the axial direction AD1 (FIG. 2C)). In the second section, the strength of the magnetic field is maximized at the middle of the S pole 16D, and is minimized near the first position 11a and the second position 11b. Similarly, in a third section from the third position 11c to the position 90° counterclockwise and in a fourth section from the fourth position 11d to the position 90° counterclockwise, directions of the magnetic fields of the magnet 11 in the axial direction are substantially a direction from the front surface-side toward the back surface-side of the magnet 11 and a direction from the back surface-side toward the front surface-side of the magnet 11, respectively.

As such, the directions of the magnetic field formed by the magnet 11 in the axial direction are sequentially reversed in the first position 11a to the fourth position 11d. In the present embodiment, since the magnets of the N pole 16A to the S pole 16D (the S pole 17A to the N pole 17D) are away from each other in the circumferential direction, the magnetic field is relatively small in the first to fourth positions and in areas near the first to fourth positions. The magnet 11 forms an AC magnetic field in which the direction of the magnetic field in the axial direction is reversed with the rotation of the magnet 11, with respect to the coordinate system fixed to the outside of the magnet 11. The electric signal generation units 31A and 31B are disposed on the upper surface and outer surface (for example, the vicinity of the side surface of the rotary shaft SF, the vicinity of the side surface of the yoke member 18 (a side yoke 18S)) of the magnet 11, as seen from a normal direction of the main surfaces of the magnet 11.

In the present embodiment, main body parts (parts including magnetosensitive parts 41A and 41B and electric power generation parts 42A and 42B, which will be described later) of the electric signal generation units 31A and 31B are provided without contacting the magnet 11 with each going away from the magnet 11 in a radial direction (for example, a diametrical direction) orthogonal to the rotary shaft SF or in a direction parallel to the radial direction. A first electric signal generation unit 31A includes a magnetosensitive part 41A, an electric power generation part 42A, a first magnetic body 45A, and a third magnetic body 46A. The first magnetic body 45A and the third magnetic body 46A are members that are substantially line-symmetric in shape. Note that, one of the first magnetic body 45A and the third magnetic body 46A can be omitted.

Also, in the present embodiment, the yoke member 18 (for example, a guide member of magnetic flux lines or magnetic field) is formed of a ferromagnetic material such as iron, and a bottom surface on which the magnet 11 is placed and has an opening 18a is referred to as a back yoke 18B, and a short cylindrical side part surrounding the back yoke 18B is referred to as a side yoke 18S. The back yoke 18B acts to guide magnetic flux lines (or magnetic field lines) of a part having a predetermined polarity (for example, the S pole 17A) of the magnet 11 placed on an upper surface thereof toward a part having the other polarity (for example, the N poles 17B and 17D). The side yoke 18S acts to guide magnetic flux lines of a part having a predetermined polarity (for example, the N pole 16A) close to the side yoke 18S toward a part having the other polarity (for example, the S pole 17A) on the back surface of the part, and toward a part having the other polarity (for example, the S poles 16B and 16D) circumferentially adjacent to the part. The yoke member 18 (side yoke 18S) is a different member from the first magnetic body 45A and the third magnetic body 46A (a member different from the first magnetic body 45A and the third magnetic body 46A). In the present embodiment, since the side yoke 18S can also be referred to as a second magnetic body, the magnetic body 46A of the electric signal generation unit 31A is referred to as the third magnetic body. As such, the electric signal generation unit 31A of the present embodiment can generate a stable and efficient signal as the yoke member 18 prevents the magnetic flux lines of the magnet 11 from directly being affected from the magnet 11.

The magnetosensitive part 41A and the electric power generation part 42A of the electric signal generation unit 31A are fixed near an outer surface (or an outer diameter-side) of the side yoke 18S surrounding continuously the magnet 11 along a moving direction of the moving part (for example, the rotating direction of the rotary shaft SF) or above the vicinity of the side surface, and relative positions thereof to each position on the magnet 11 change with rotation of the magnet 11. For example, in FIG. 2B, the first position 11a of the magnet 11 is disposed at a center of the first electric signal generation unit 31A. Thus, when the magnet 11 rotates one-turn in the forward direction (counterclockwise) from this state, the first position 11a to the fourth position 11d sequentially pass near the electric signal generation unit 31A. Note that, the magnetosensitive part 41A and the electric power generation part 42A of the electric signal generation unit 31A may also be fixed near an inner surface (or an inner diameter-side) of the side yoke 18S or above the vicinity of the side surface.

The magnetosensitive part 41A is a magnetosensitive wire such as a Wiegand wire. In the magnetosensitive part 41A, large Barkhausen jump (Wiegand effect) is generated by the change in magnetic field associated with the rotation of the magnet 11. The magnetosensitive part 41A is an elongated cylindrical member, and an axial direction thereof is set in the circumferential direction of the rotary shaft SF, as an example. Hereinafter, the axial direction of the magnetosensitive part 41A, i.e., a direction perpendicular to a circular (or which may be polygonal or the like) cross-section of the magnetosensitive part 41A is referred to as a length direction LD1 of the magnetosensitive part 41A. When the AC magnetic field is applied in the axial direction (length direction) of the magnetosensitive part 41A and the AC magnetic field is reversed, the magnetosensitive part 41A generates a magnetic domain wall from one end toward the other end in the axial direction. As shown in FIG. 2B, the length direction LD1 of the magnetosensitive part 41A is set in the circumferential direction of the rotary shaft SF, so that the electric signal generation unit 31A can be downsized. Note that, in the present embodiment, since the magnetic flux lines from the side surface of the magnet 11 are not leaked toward the magnetosensitive part 41A by the side yoke 18S (which will be described in detail later), the length direction LD1 of the magnetosensitive part 41A may be an arbitrary direction. For example, the length direction LD1 may be parallel to the axial direction AD1, may be parallel to the radial direction with respect to the rotary shaft SF or may be a direction intersecting obliquely with the axial direction AD1, the radial direction, or the like.

The first magnetic body 45A and the third magnetic body 46A are formed of a ferromagnetic material such as iron, cobalt, nickel, for example. The first magnetic body 45A is provided between the front surface of the magnet 11 and one end of the magnetosensitive part 41A, so as to override the side yoke 18S, and the third magnetic body 46A is provided between the front surface of the magnet 11 and the other end of the magnetosensitive part 41A, so as to override the side yoke 18S. In substantially rectangular flat plate-shaped parts of the first magnetic body 45A and the third magnetic body 46A, adjacent to the magnetosensitive part 41A, from their upper surfaces to central portions, elongated notched portions 45Aa and 46Aa for receiving the magnetosensitive part 41A when assembling and adjusting the electric signal generation unit 31A are formed. Tip end portions 45Ab and 46Ab of the first magnetic body 45A and the third magnetic body 46A on the magnet 11-side are symmetrically inwardly (inverted V-shape) inclined in substantially the same positions as one side of parts of two polarities different from each other (N pole 16A and S pole 17A) in the circumferential direction and so as to be substantially parallel to the one side, in the first position 11a. In other words, the tip end portion 45Ab of the first magnetic body 45A and the tip end portion 46Ab of the third magnetic body 46A are one pair (line symmetry), and the tip end portions 45Ab and 46Ab are formed in a direction of coming close to each other (an inward direction) with respect to a reference line of the line symmetry. Also, as shown in FIG. 2A, when the electric signal generation unit 31A is located in at least one angular position within one-turn of the magnet 11 (for example, an angular position in which the electric signal is generated from the electric signal generation units 31A and 31B), the tip end portions 45Ab and 46Ab are disposed (inclination angles of the tip end portions 45Ab and 46Ab are determined) so that a central line CL1a of the tip end portion 45Ab of the first magnetic body 45A and a central line CL1b of the tip end portion 46Ab of the third magnetic body 46A are parallel to both sides (both side surfaces) of parts having two adjacent polarities (in FIG. 2A, the N pole 16A and the S pole 16D) of the magnet 11 on the electric signal generation unit 31A-side, as seen from the axial direction of the rotary shaft SF. Also, in at least one angular position within one-turn of the magnet 11, the first magnetic body 45A is disposed in a position facing parts having predetermined polarities (the N pole 16A to the S pole 16D) of the magnet 11 in the axial direction of the rotary shaft SF or in a direction parallel to the axial direction. Also, at least a part of the first magnetic body 45A and the third magnetic body 46A are disposed in positions overlapping each of the parts having predetermined polarities (the N pole 16A to the S pole 16D) of the magnet 11 and the side yoke 18S, as seen from the axial direction of the rotary shaft SF.

In the first position 11a to the fourth position 11d and the near positions thereof, the polarities of the magnet 11 are always opposite to each other at the tip end portions 45Ab and 46Ab of the first magnetic body 45A and the third magnetic body 46A, and when the tip end portion 45Ab of the first magnetic body 45A is positioned near the N pole 16A (or the S pole 16B), the tip end portion 46Ab of the third magnetic body 46A is positioned near the S pole 16D (or the N pole 16A). For this reason, in the positions 11a to 11d and the near positions thereof, the first magnetic body 45A and the third magnetic body 46A guide magnetic flux lines from the two parts having polarities different from each other of the magnet 11 (for example, the N pole 16A and the S pole 16D), which are located at positions different from each other in the circumferential direction of the magnet 11, in the length direction of the magnetosensitive part 41A.

The electric power generation part 42A is, for example, a high-density coil wound and disposed on the magnetosensitive part 41A. Note that, in the present embodiment, as an example, the electric power generation part 42A and the magnetosensitive part 41A are manufactured or prepared independently of each other, and when assembling the encoder device EC, the magnetosensitive part 41A is inserted into a central through-hole 42Ac (refer to FIG. 7A) of the electric power generation part 42A. Two end portions of the magnetosensitive part 41A protruding from both ends of the electric power generation part 42A are accommodated in the notched portions 45Aa and 46Aa of the first magnetic body 45A and the third magnetic body 46A. At this time, as an example, the two end portions of the magnetosensitive part 41A slightly protrude outward beyond the notched portions 45Aa and 46Aa. In the electric power generation part 42A, electromagnetic induction is generated due to the generation of the magnetic domain wall in the magnetosensitive part 41A, so that an induction current flows. When the first to fourth positions of the magnet 11 pass near a center of the electric signal generation unit 31A (centers of the tip end portions of the magnetic bodies 45A and 46A), a pulsed current (electric signal, electric power) is generated in the electric power generation part 42A.

A direction of the current generated in the electric power generation part 42A is changed in accordance with the direction of the magnetic field before and after the reversal. For example, a direction of the current that is generated upon the reversal from the magnetic field toward the front surface-side to the magnetic field toward the back surface-side of the magnet 11 is opposite to a direction of the current that is generated upon the reversal from the magnetic field toward the back surface-side to the magnetic field toward the front surface-side of the magnet 11. The electric power (induction current) that is generated in the electric power generation part 42A can be set by the number of turns in the high-density coil, for example.

Figure 8A:
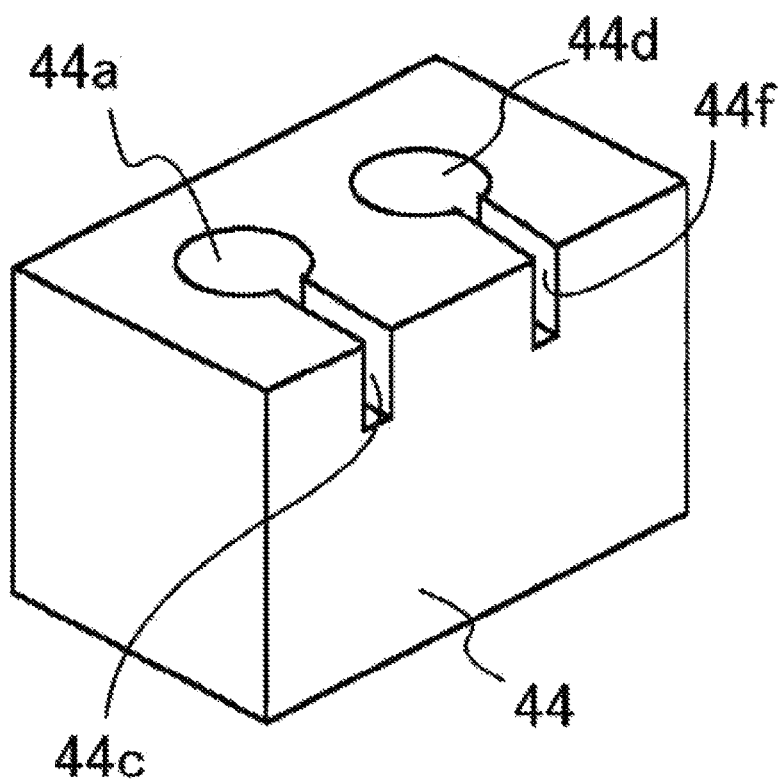
FIG. 8A is a perspective view showing an assembling jig.
Figure 8B:
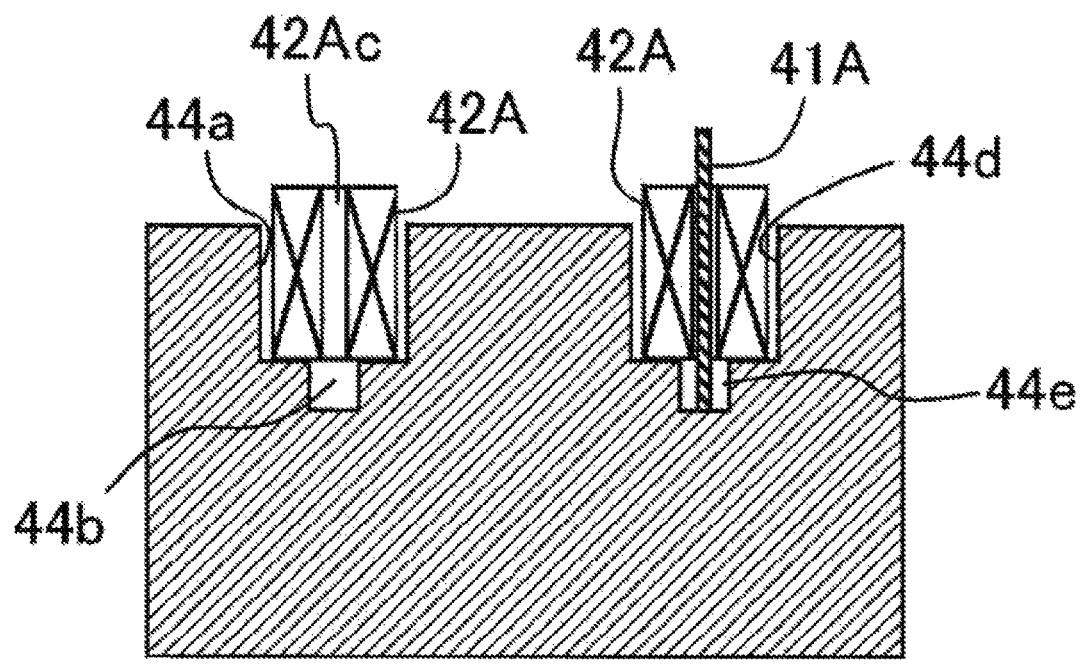
FIG. 8B is a sectional view showing the assembling jig.
Figure 8C:
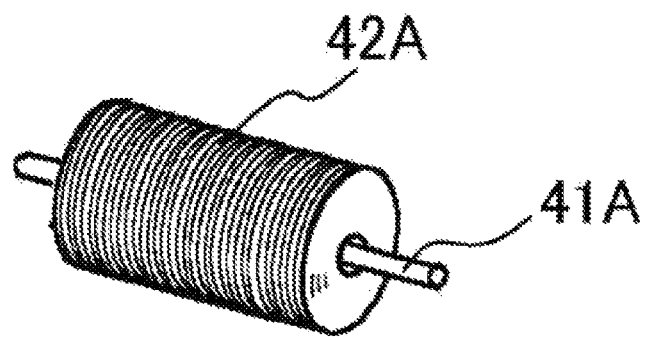
FIG. 8C is a perspective view showing a state where the magnetosensitive part is inserted into the electric power generation part.
Figure 8D:
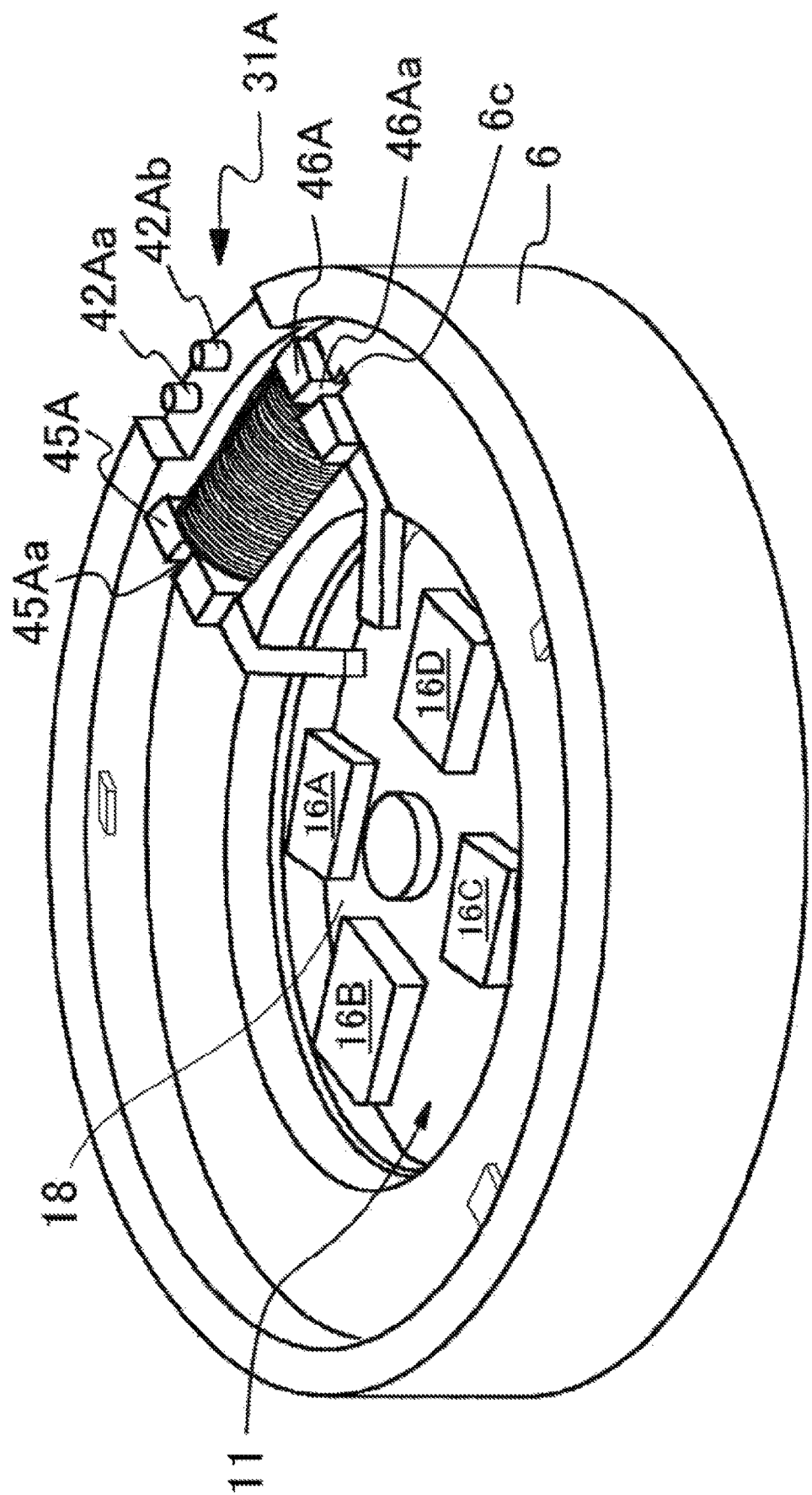
FIG. 8D is a perspective view showing a state where the electric signal generation unit is incorporated into the housing.

The magnetosensitive part 41A, the electric power generation part 42A, and the first magnetic body 45A and the third magnetic body 46A are accommodated in a housing 6 (see FIG. 8D). The housing 6 may also be referred to as a mold. The housing 6 is provided with terminals 42Aa and 42Ab. The high-density coil of the electric power generation part 42A has one end and the other end thereof that are electrically connected to the terminals 42Aa and 42Ab, respectively. The electric power generated in the electric power generation part 42A can be extracted outside of the first electric signal generation unit 31A via the terminals 42Aa and 42Ab. Also, the housing 6 is disposed without contacting the rotary shaft SF to which the yoke member 18 (for example, the side yoke 18S) is fixed.

The second electric signal generation unit 31B is disposed in an angular position forming an angle larger than 0° and smaller than 180° from the angular position in which the first electric signal generation unit 31A is disposed. An angle between the electric signal generation units 31A and 31B is selected within a range from 112.5° to 157.5°, for example, and is about 135° in FIG. 2B. The second electric signal generation unit 31B has a similar configuration to the first electric signal generation unit 31A. The second electric signal generation unit 31B includes a magnetosensitive part 41B, an electric power generation part 42B, a first magnetic body 45B, and a third magnetic body 46B. The magnetosensitive part 41B, the electric power generation part 42B, and the first magnetic body 45B and the third magnetic body 46B are similar to the magnetosensitive part 41A, the electric power generation part 42A, and the first magnetic body 45A and the third magnetic body 46A of the electric signal generation unit 31A, respectively, and the descriptions thereof are thus omitted. The second magnetosensitive part 41B, the second electric power generation part 42B, and the parts of the first magnetic body 45B and the third magnetic body 46B on the second magnetosensitive part 41B-side are accommodated in the housing 6. The housing 6 is provided with terminals 42Ba and 42Bb. The electric power generated in the second electric power generation part 42B can be extracted outside of the second electric signal generation unit 31B via the terminals 42Ba and 42Bb.

The magnetism detection unit 12 includes magnetic sensors 51 and 52. The magnetic sensor 51 is disposed in an angular position greater than 0° and smaller than 180° with respect to the second magnetosensitive part 41B (second electric signal generation unit 31B) in the rotating direction of the rotary shaft SF. The magnetic sensor 52 is disposed in an angular position (about 45°, in FIG. 2B) greater than 22.5° and smaller than 67.5° with respect to the magnetic sensor 51 in the rotating direction of the rotary shaft SF.

As shown in FIG. 2D, the magnetic sensor 51 includes a magnetoresistive element 56, a bias magnet (not shown) for applying a magnetic field with a certain strength to the magnetoresistive element 56, and a waveform shaping circuit (not shown) for shaping a waveform from the magnetoresistive element 56. The magnetoresistive element 56 has a full bridge shape with elements 56a, 56b, 56c and 56d connected in series. A signal line between the elements 56a and 56c is connected to a power supply terminal 51p, and a signal line between the elements 56b and 56d is connected to a ground terminal 51g. A signal line between the elements 56a and 56b is connected to a first output terminal 51a, and a signal line between the elements 56c and 56d is connected to a second output terminal 51b. The magnetic sensor 52 has a similar configuration to the magnetic sensor 51, and the descriptions thereof are thus omitted.

Subsequently, operations of the first electric signal generation unit 31A of the present embodiment are described. Hereinafter, the magnetosensitive part 41A and the electric power generation part 42A of the first electric signal generation unit 31A shown in FIG. 2B are collectively described as a magnetosensitive member 47. A length direction of the magnetosensitive member 47 is the same as a length direction of the magnetosensitive part 41A, and the center in the length direction of the magnetosensitive member 47 is the same as the center in the length direction of the magnetosensitive part 41A. Note that, since operations of the second electric signal generation unit 31B are similar to those of the first electric signal generation unit 31A, the descriptions thereof are omitted.

When the center of the electric signal generation unit 31A is located in the first position 11a to the fourth position 11d in FIG. 2B or the near positions thereof, the polarities of the magnet 11 are always opposite to each other at the tip end portions 45Ab and 46Ab of the first magnetic body 45A and the third magnetic body 46A, and when the tip end portion 45Ab of the first magnetic body 45A is positioned near the N pole 16A (or the S pole 16B), the tip end portion 46Ab of the third magnetic body 46A is positioned near the S pole 16D (or the N pole 16A). By the magnet 11, the first magnetic body 45A, the magnetosensitive part 41A, and the third magnetic body 46A, a magnetic circuit MC1 including the magnetic flux lines toward the length direction of the magnetosensitive part 41A is formed. Also, for example, in the first position 11a or the near position thereof, the magnetic flux lines from the N pole 16A facing the magnetosensitive member 47 toward the radial direction of the rotary shaft SF are directed toward the adjacent S pole 16D and the S pole 17A on the back surface of the N pole 16A (refer to FIG. 2C) along a magnetic circuit MC2 formed in the side yoke 18S of the yoke member 18. For this reason, the magnetic flux lines from the N pole 16A toward the radial direction of the rotary shaft SF are not directed toward the length direction of the magnetosensitive part 41A, so that opposite magnetic flux lines, which cancel the original magnetic flux lines, do not act in the length direction of the magnetosensitive part 41A. Similarly, when the position of the magnet 11 in the rotating direction is located in an arbitrary position, the magnetic flux lines from a part having a predetermined polarity of the magnet 11 toward the radial direction of the rotary shaft SF are guided toward a part having the other polarity via the side yoke 18S. Therefore, unnecessary magnetic flux lines except the magnetic flux lines that are guided via the magnetic bodies 45A and 46A are not guided in the length direction of the magnetosensitive part 41A. As a result, the encoder device EC can obtain a high-output pulse from the magnetosensitive member 47 all the time.

Figure 3A:
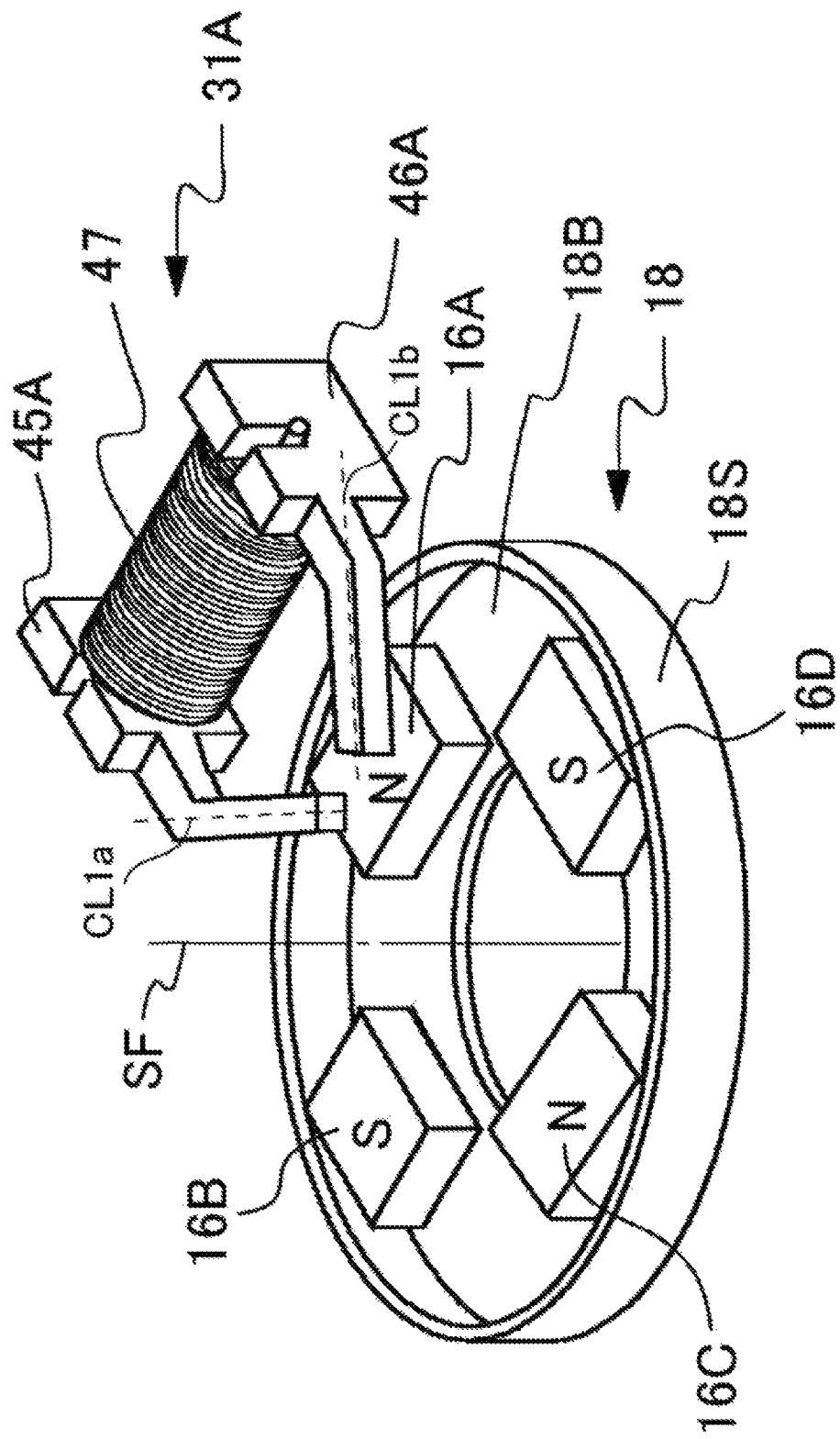
FIG. 3A is a perspective view showing the magnet and the electric signal generation unit in FIG. 2A.
Figure 3B:
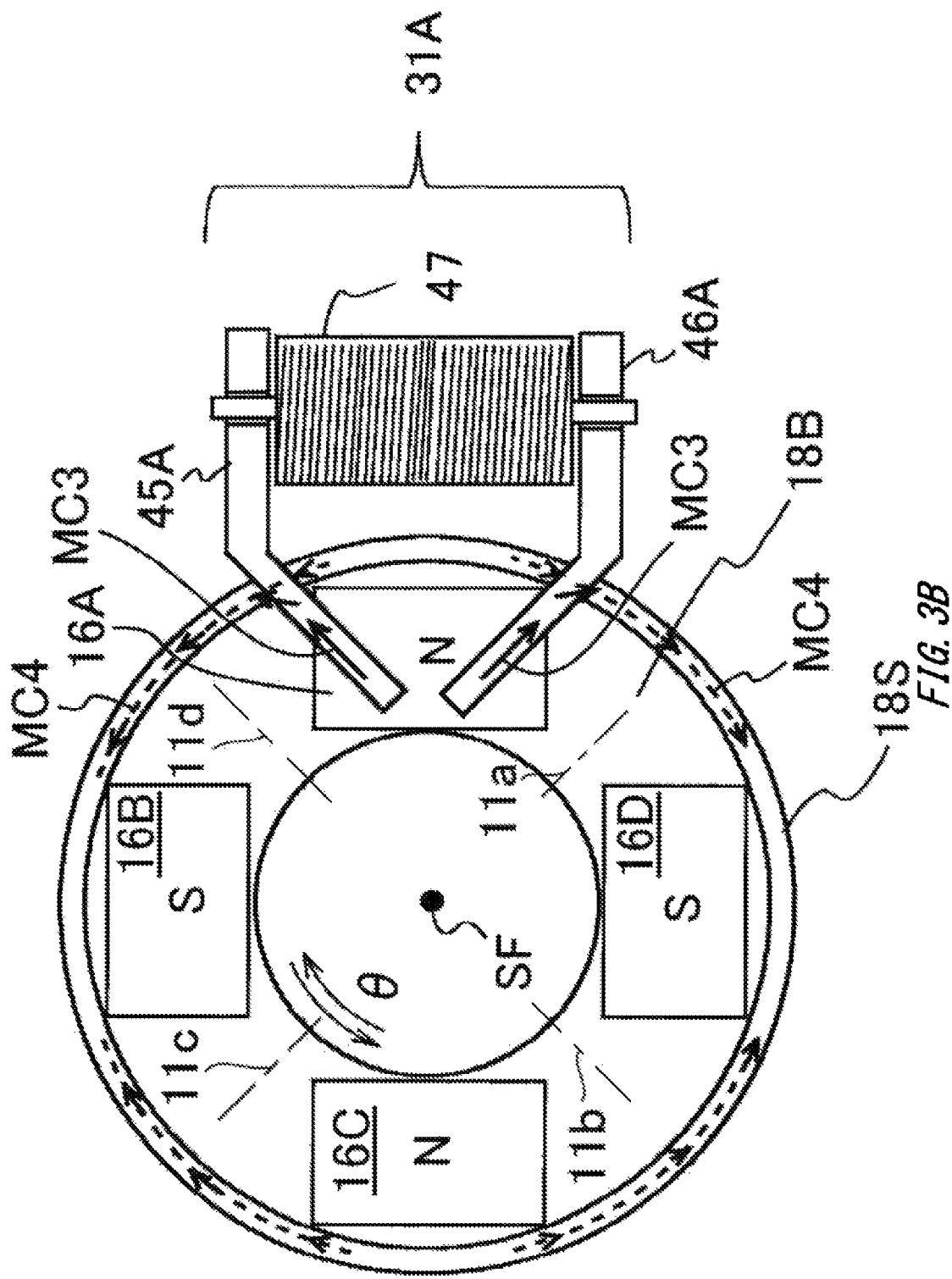
FIG. 3B is a plan view of FIG. 3A.

FIG. 3B shows a state where the magnet 11 and the yoke member 18 are rotated clockwise by 45° from the state of FIG. 2B, and FIG. 3A is a perspective view showing the state. In FIG. 3B, a center of the N pole 16A (a middle between the first position 11a and the fourth position 11d) or its vicinity is positioned at the center of the electric signal generation unit 31A, and the tip end portions of the first magnetic body 45A and third magnetic body 46A of the electric signal generation unit 31A are positioned above the same N pole 16A. That is, as seen from the axial direction of the rotary shaft SF, the central line CL1a of the tip end portion of the first magnetic body 45A and the central line CL1b of the tip end portion of the third magnetic body 46A are inclined to gradually come close to each other toward the center of the rotary shaft SF above the part of the same polarity (the N pole 16A, in FIG. 3A) of the magnet 11. For this reason, the magnetic flux lines from the N pole 16A toward the first magnetic body 45A (the radial direction of the rotary shaft SF) are guided toward the adjacent S pole 16B via a magnetic circuit MC3 of the tip end portion of the first magnetic body 45A and a magnetic circuit MC4 of the side yoke 18S, without being directed toward the magnetosensitive member 47. Similarly, the magnetic flux lines from the N pole 16A toward the third magnetic body 46A (the radial direction of the rotary shaft SF) are guided toward the adjacent S pole 16D via the magnetic circuit MC3 of the tip end portion of the third magnetic body 46A and the magnetic circuit MC4 of the side yoke 18S, without being directed toward the magnetosensitive member 47. Similarly, even when the centers of the S pole 16B, the N pole 16C and the S pole 16D or their vicinities are positioned at the center of the electric signal generation unit 31A, since the magnetic flux lines from the S pole 16B, the N pole 16C and the S pole 16D toward the radial direction of the rotary shaft SF are guided toward the part having the other polarity via the side yoke 18S, the magnetic flux lines are not guided in the length direction of the magnetosensitive member 47. For this reason, the induction current is not generated in the magnetosensitive member 47.

In the electric signal generation unit 31A of the present embodiment, while the rotary shaft SF rotates one-turn, there are a first timing (a time period with the time point in FIG. 2B centered) at which the magnetic flux lines from the magnet 11 pass the magnetosensitive part 41A via the first magnetic body 45A and the third magnetic body 46A and a second timing (a time period with the time point in FIG. 3B centered) at which the magnetic flux lines from the magnet 11 pass the side yoke 18S (a second magnetic body) and do not pass (are difficult to pass) the magnetosensitive part 41A, and the electric signal is generated in the electric signal generation unit 31A at the first timing. A section (a section of a predetermined angle during one-turn) of the magnet 11 at the second timing can also be referred to as a neutral section (at the second timing) in which a magnetic field becomes substantially zero in the magnetosensitive part 41A.

For this reason, according to the electric signal generation unit 31A of the present embodiment, the rotations of the magnet 11 and the yoke member 18 switch the section (second timing) in which the magnetic flux lines from the magnet 11 do not pass in the length direction of the magnetosensitive member 47 (see FIG. 3B) to the section (first timing) in which the magnetic flux lines from the magnet 11 pass in the length direction of the magnetosensitive member 47 via the first magnetic body 45A and the third magnetic body 46A (see FIG. 2B). Thereby, the magnetic flux lines change sharply in the length direction of the magnetosensitive part 41A and a higher output pulse can be generated from the electric power generation part 42A.

Also, the side yoke 18S is disposed so as to cover the side surface of the magnet 11 and the magnetic flux lines of the magnet 11 are not leaked outside of the outer surface of the side yoke 18S. Therefore, even when the magnetosensitive member 47 is disposed in close to the outer surface of the side yoke 18S to narrow an interval between the magnetosensitive member 47 and the magnet 11, it is possible to obtain the high-output electric signal from the magnetosensitive member 47. For this reason, in the encoder device EC, the electric signal generation unit 31A can be downsized while obtaining the high-output pulse.

Figure 4:
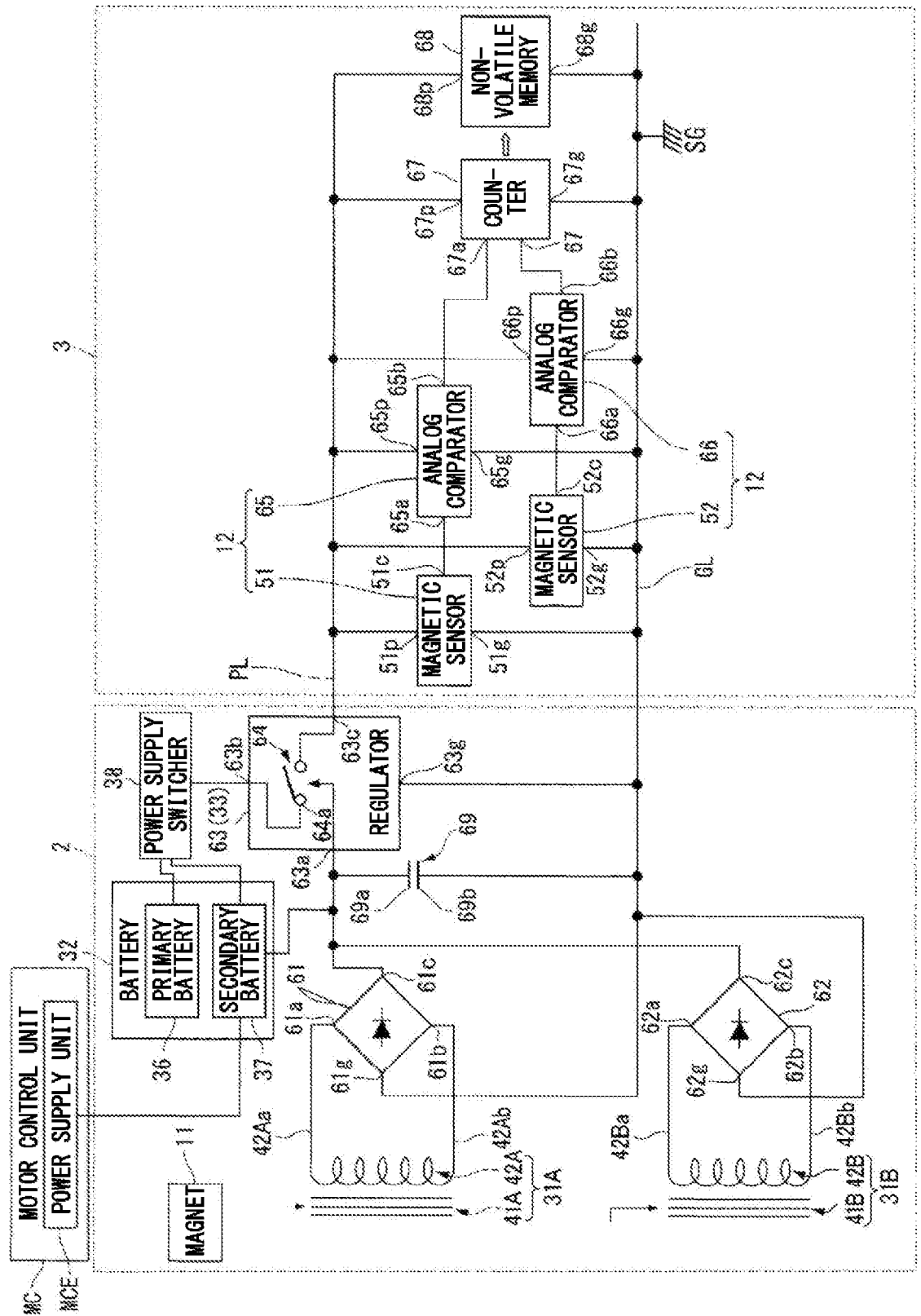
FIG. 4 shows a configuration of an electric power supplying system and a multi-turn information detection unit of the encoder device shown in FIG. 1.

FIG. 4 shows a circuit configuration of the electric power supplying system 2 and the multi-turn information detection unit 3 in accordance with the present embodiment. In FIG. 4, the electric power supplying system 2 includes the first electric signal generation unit 31A, a rectifier stack 61, the second electric signal generation unit 31B, a rectifier stack 62, and the battery 32. Also, the electric power supplying system 2 includes a regulator 63, as the switching unit 33 shown in FIG. 1. The rectifier stack 61 is a rectifier that performs full-wave rectification on a current (a positive or negative pulse) flowing from the first electric signal generation unit 31A. A first input terminal 61a of the rectifier stack 61 is connected to the terminal 42Aa of the first electric signal generation unit 31A. A second input terminal 61b of the rectifier stack 61 is connected to the terminal 42Ab of the first electric signal generation unit 31A. Aground terminal 61g of the rectifier stack 61 is connected to aground line GL to which the same potential as a signal ground SG is supplied. During the operation of the multi-turn information detection unit 3, the potential of the ground line GL becomes a reference potential of the circuit. An output terminal 61c of the rectifier stack 61 is connected to a control terminal 63a of the regulator 63.

The rectifier stack 62 is a rectifier that performs full-wave rectification on a current (a positive or negative pulse) flowing from the second electric signal generation unit 31B. A first input terminal 62a of the rectifier stack 62 is connected to the terminal 42Ba of the second electric signal generation unit 31B. A second input terminal 62b of the rectifier stack 62 is connected to the terminal 42Bb of the second electric signal generation unit 31B. Aground terminal 62g of the rectifier stack 62 is connected to the ground line GL. An output terminal 62c of the rectifier stack 62 is connected to the control terminal 63a of the regulator 63.

The regulator 63 regulates electric power that is supplied from the battery 32 to the position detection system 1. The regulator 63 may include a switch 64 provided on an electric power supply path between the battery 32 and the position detection system 1. The regulator 63 controls an operation of the switch 64, based on the electric signals generated from the electric signal generation units 31A and 31B. An input terminal 63b of the regulator 63 is connected to the battery 32. An output terminal 63c of the regulator 63 is connected a power supply line PL. A ground terminal 63g of the regulator 63 is connected to the ground line GL. The control terminal 63a of the regulator 63 is an enable terminal, and the regulator 63 keeps a potential of the output terminal 63c to a predetermined voltage in a state where a voltage equal to or higher than a threshold value is applied to the control terminal 63a. An output voltage (predetermined voltage) of the regulator 63 is, for example, 3V when a counter 67 is configured by a CMOS and the like. An operating voltage of a non-volatile memory 68 of the storage unit 14 is set to the same voltage as the predetermined voltage, for example. Note that the predetermined voltage is a voltage necessary for electric power supply, and may be not only a constant voltage value, but also a voltage changing in a stepwise manner.

A first terminal 64a of the switch 64 is connected to the input terminal 63b, and a second terminal 64b is connected to the output terminal 63c. The regulator 63 switches conduction and insulation states between the first terminal 64a and the second terminal 64b of the switch 64 by using the electric signals supplied from the electric signal generation units 31A and 31B to the control terminal 63a, as a control signal (enable signal). For example, the switch 64 includes a switching device such as a MOS, a TFT and the like, the first terminal 64a and the second terminal 64b are a source electrode and a drain electrode, and a gate electrode is connected to the control terminal 63a. The switch 64 is in a state (on state) where the source electrode and the drain electrode can be conductive therebetween, when the gate electrode is charged by the electric signals (electric power) generated from the electric signal generation units 31A and 31B and a potential of the gate electrode becomes equal to or higher than a threshold value. Note that the switch 64 may also be provided outside of the regulator 63, and may be externally attached such as a relay, for example.

Also, for example, at least a part (for example, the multi-turn information detection unit 3) of the position detection system 1 may operate by using electric power obtained by rectifying the electric signals generated in the electric signal generation units 31A and 31B, in a state (for example, an abnormal state and a backup state) where a power supply of a device on which the encoder device EC is mounted is off. The multi-turn information detection unit 3 includes, as the magnetism detection unit 12, the magnetic sensors 51 and 52, and analog comparators 65 and 66. The magnetism detection unit 12 detects the magnetic field formed by the magnet 11 by using the electric power supplied from the battery 32. Also, the multi-turn information detection unit 3 includes a counter 67, as the detection unit 13 shown in FIG. 1, and includes a non-volatile memory 68, as the storage unit 14.

The electric power supply terminal 51p of the magnetic sensor 51 is connected to the power supply line PL. The ground terminal 51g of the magnetic sensor 51 is connected to the ground line GL. An output terminal 51c of the magnetic sensor 51 is connected to an input terminal 65a of the analog comparator 65. In the present embodiment, the output terminal 51c of the magnetic sensor 51 outputs a voltage corresponding to a difference between a potential of the second output terminal 51b shown in FIG. 2D and the reference potential. The analog comparator 65 is a comparator that compares a voltage output from the magnetic sensor 51 with a predetermined voltage. A power supply terminal 65p of the analog comparator 65 is connected to the power supply line PL. A ground terminal 65g of the analog comparator 65 is connected to the ground line GL. An output terminal 65b of the analog comparator 65 is connected to a first input terminal 67a of the counter 67. The analog comparator 65 outputs an H-level signal from the output terminal when an output voltage of the magnetic sensor 51 is equal to or higher than a threshold value, and outputs an L-level signal from the output terminal when the output voltage of the magnetic sensor 51 is lower than the threshold value.

The magnetic sensor 52 and the analog comparator 66 have similar configurations to the magnetic sensor 51 and the analog comparator 65. A power supply terminal 52p of the magnetic sensor 52 is connected to the power supply line PL. A ground terminal 52g of the magnetic sensor 52 is connected to the ground line GL. An output terminal 52c of the magnetic sensor 52 is connected to an input terminal 66a of the analog comparator 66. A power supply terminal 66p of the analog comparator 66 is connected to the power supply line PL. A ground terminal 66g of the analog comparator 66 is connected to the ground line GL. An output terminal 58b of the analog comparator 66 is connected to a second input terminal 67b of the counter 67. The analog comparator 66 outputs an H-level signal from the output terminal when an output voltage of the magnetic sensor 52 is equal to or higher than a threshold value, and outputs an L-level signal from the output terminal 66b when the output voltage of the magnetic sensor 52 is lower than the threshold value.

The counter 67 counts the multi-turn information of the rotary shaft SF by using the electric power supplied from the battery 32. The counter 67 includes, for example, a CMOS logical circuit and the like. The counter 67 operates using the electric power that is supplied via a power supply terminal 67p and a ground terminal 67g. The power supply terminal 67p of the counter 67 is connected to the power supply line PL. The ground terminal 67g of the counter 67 is connected to the ground line GL. The counter 67 performs counting processing by using a voltage that is supplied via the first input terminal 67a, and a voltage that is supplied via the second input terminal 67b, as a control signal.

The non-volatile memory 68 stores at least a part (for example, the multi-turn information) of the rotational position information detected by the detection unit 13 by using the electric power supplied from the battery 32 (performs a writing operation). The non-volatile memory 68 stores a result (multi-turn information) of the counting by the counter 67, as the rotational position information detected by the detection unit 13. A power supply terminal 68p of the non-volatile memory 68 is connected to the power supply line PL. A ground terminal 68g of the storage unit 14 is connected to the ground line GL. The storage unit 14 shown in FIG. 1 includes the non-volatile memory 68, and can keep the information written while the electric power is supplied, even in a state where the electric power is not supplied.

In the present embodiment, a capacitor 69 is provided between the rectifier stacks 61 and 62 and the regulator 63. A first electrode 69a of the capacitor 69 is connected to a signal line for connecting the rectifier stacks 61 and 62 and the control terminal 63a of the regulator 63. A second electrode 69b of the capacitor 69 is connected to the ground line GL. The capacitor 69 is a so-called smoothing capacitor, and reduces pulsation to reduce a load of the regulator. A constant of the capacitor 69 is set so that the electric power supply from the battery 32 to the detection unit 13 and the storage unit 14 is kept for a time period in which the rotational position information is detected by the detection unit 13 and the rotational position information is written into the storage unit 14, for example.

Also, the battery 32 includes, for example, a primary battery 36 such as a button-shaped battery and a rechargeable secondary battery 37. The secondary battery 37 is electrically connected to a power supply unit MCE of the motor control unit MC. During at least a part of a time period (for example, a time period in which a main power supply is in an on state) in which the power supply unit MCE of the motor control unit MC can supply the electric power, the electric power is supplied from the power supply unit MCE to the secondary battery 37, and the secondary battery 37 is recharged by the electric power. During a time period (for example, a time period in which a main power supply is in an off state) in which the power supply unit MCE of the motor control unit MC cannot supply the electric power, the supply of the electric power from the power supply unit MCE to the secondary battery 37 is cut off.

Also, the secondary battery 37 may be electrically connected to a transmission path of the electric signals from the electric signal generation units 31A and 31B. In this case, the secondary battery 37 can be recharged by the electric power of the electric signals from the electric signal generation units 31A and 31B. For example, the secondary battery 37 is electrically connected to a circuit between the rectifier stack 61 and the regulator 63. The secondary battery 37 can be recharged by the electric power of the electric signals that are generated from the electric signal generation units 31A and 31B by the rotation of the rotary shaft SF, in a state where the supply of the electric power from the power supply unit MCE is cut off. Note that the secondary battery 37 may also be recharged by the electric power of the electric signals that are generated from the electric signal generation units 31A and 31B as the motor M is driven to rotate the rotary shaft SF.

The encoder device EC in accordance with the present embodiment selects to supply the electric power from which of the primary battery 36 and the secondary battery 37 to the position detection system 1, in a state where the supply of the electric power from an outside is cut off. The electric power supplying system 2 includes a power supply switcher (a power supply selection unit, a selection unit) 38, and the power supply switcher 38 switches (selects) to supply the electric power from which of the primary battery 36 and the secondary battery 37 to the position detection system 1. A first input terminal of the power supply switcher 38 is electrically connected to a positive electrode of the primary battery 36, and a second input terminal of the power supply switcher 38 is electrically connected to the secondary battery 37. An output terminal of the power supply switcher 38 is electrically connected to the input terminal 63b of the regulator 63.

The power supply switcher 38 selects the primary battery 36 or the secondary battery 37, as the battery for supplying the electric power to the position detection system 1, based on a remaining amount of the secondary battery 37, for example. For example, when a remaining amount of the secondary battery 37 is equal to or greater than a threshold value, the power supply switcher 38 supplies the electric power from the secondary battery 37, and does not supply the electric power from the primary battery 36. The threshold value is set, based on electric power that is consumed in the position detection system 1, and is set equal to or higher than the electric power that is to be supplied to the position detection system 1, for example. For example, when the electric power that is consumed in the position detection system 1 can be covered by the electric power that from the secondary battery 37, the power supply switcher 38 supplies the electric power from the secondary battery 37, and does not supply the electric power from the primary battery 36. Also, when the remaining amount of the secondary battery 37 is less than the threshold value, the power supply switcher 38 supplies the electric power from the primary battery 36, and does not supply the electric power from the secondary battery 37. The power supply switcher 38 may also serve as a charger for controlling the recharging of the secondary battery 37, for example, and may determine whether the remaining amount of the secondary battery 37 is equal to or greater than the threshold value by using remaining amount information of the secondary battery 37 that is used for control of the recharging.

The secondary battery 37 is used in a combined manner in this way, so that it is possible to delay the consumption of the primary battery 36. Therefore, the encoder device EC has no maintenance (for example, replacement) of the battery 32 or the maintenance frequency is low. Note that the battery 32 may include at least one of the primary battery 36 and the secondary battery 37. Also, in the above embodiment, the electric power is alternatively supplied from the primary battery 36 or the secondary battery 37. However, the electric power may be supplied from both the primary battery 36 and the secondary battery 37. For example, a processing unit to which the primary battery 36 supplies the electric power and a processing unit to which the secondary battery 37 supplies the electric power may be determined, in accordance with power consumption of each processing unit (for example, the magnetic sensor 51, the counter 67 and the non-volatile memory 68) of the position detection system 1. Note that the secondary battery 37 may be recharged using at least one of the electric power that is supplied from a power supply unit EC2 and the electric power of the electric signals that are generated from the electric signal generation units 31A and 31B.

Figure 5:
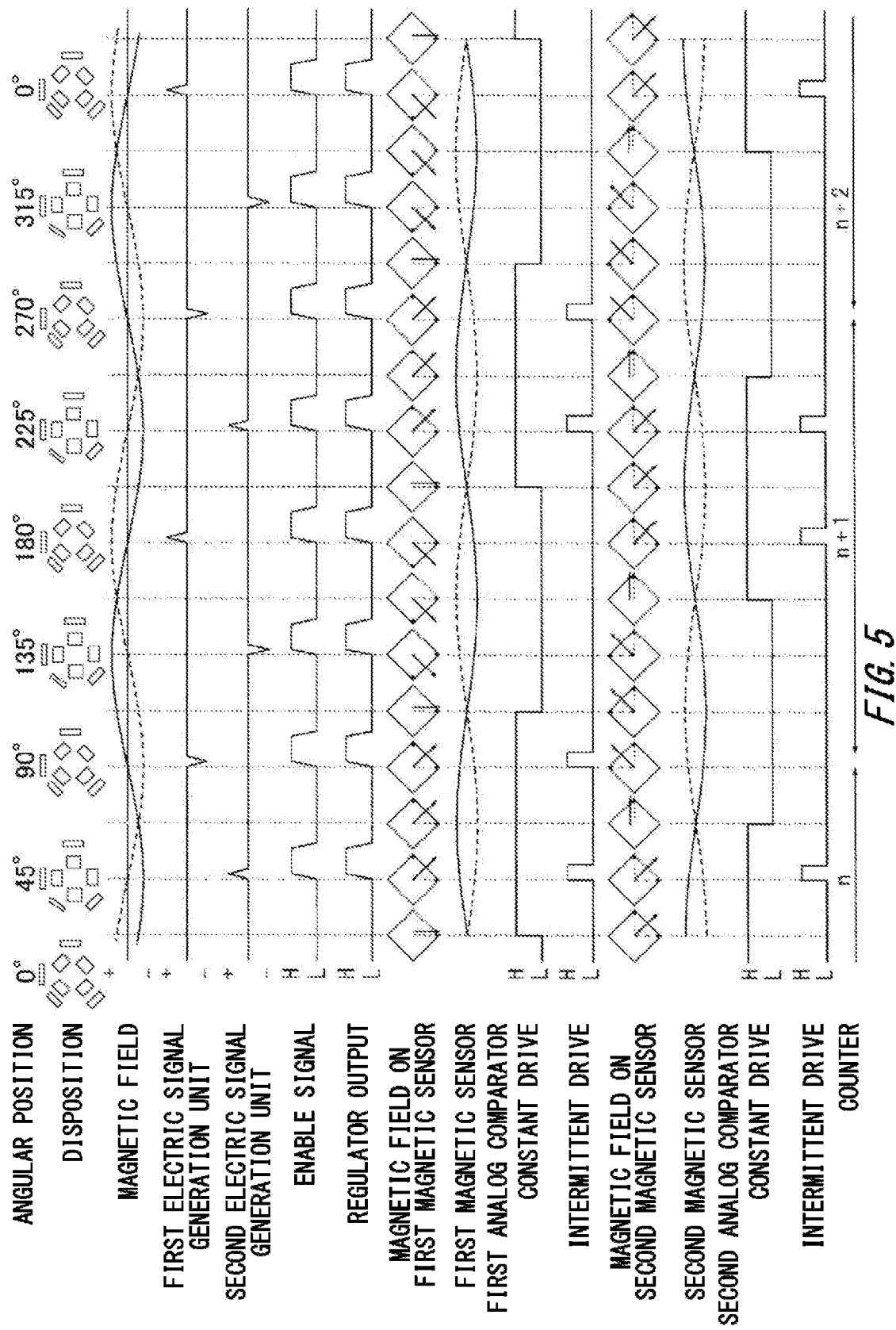
FIG. 5 shows operations of the encoder device shown in FIG. 1 during forward rotation.

Subsequently, operations of the electric power supplying system 2 and the multi-turn information detection unit 3 are described. FIG. 5 is a timing chart showing operations of the multi-turn information detection unit 3 when the rotary shaft SF rotates in the counterclockwise direction (forward rotation). Since a timing chart showing operations of the multi-turn information detection unit 3 when the rotary shaft SF rotates in the counterclockwise direction (reverse rotation) is inverted to the chart of FIG. 4 over time, the descriptions thereof are omitted.

In "Magnetic field" of FIG. 5, a solid line indicates a magnetic field in the position of the first electric signal generation unit 31A, and a broken line indicates a magnetic field in the position of the second electric signal generation unit 31B. "First electric signal generation unit", and "Second electric signal generation unit" indicate an output of the first electric signal generation unit 31A and an output of the second electric signal generation unit 31B, respectively, and an output of current flowing in one direction is denoted as positive (+), and an output of current flowing in an opposite direction thereof is denoted as negative (−). "Enable signal" indicates a potential that is applied to the control terminal 63a of the regulator 63 by the electric signals generated from the electric signal generation units 31A and 31B, and a high level is denoted as "H" and a low level is denoted as "L". "Regulator" indicates an output of the regulator 63, and a high level is denoted as "H" and a low level is denoted as "L".

In FIG. 5, "Magnetic field on first magnetic sensor" and "Magnetic field on second magnetic sensor" are magnetic fields formed on the magnetic sensors 51 and 52. The magnetic field formed by the magnet 11 is shown with a long broken line, the magnetic field formed by a bias magnet is shown with a short broken line, and a synthetic magnetic field thereof is shown with a solid line. "First magnetic sensor" and "Second magnetic sensor" each indicate outputs when the magnetic sensors 51 and 52 are constantly driven, an output from the first output terminal is shown with a broken line, and an output from the second output terminal is shown with a solid line. "First analog comparator" and "Second analog comparator" indicate outputs from the analog comparators 65 and 66, respectively. An output when the magnetic sensor and the analog comparator are constantly driven is denoted as "constant drive", and an output when the magnetic sensor and the analog comparator are intermittently driven is denoted as "intermittent drive".

When the rotary shaft SF rotates counterclockwise, the first electric signal generation unit 31A outputs the current pulse flowing in the forward direction ("+" of the "first electric signal generation unit"), at the angular positions of 180° and 0° (360°). Also, the first electric signal generation unit 31A outputs the current pulse flowing in the reverse direction ("−" of the "first electric signal generation unit"), at the angular positions of 90° and 270°. The second electric signal generation unit 31B outputs the current pulse flowing in the reverse direction ("−" of the "second electric signal generation unit"), at the angular positions of 135° and 315°. Also, the second electric signal generation unit 31B outputs the current pulse flowing in the forward direction ("−" of the "second electric signal generation unit"), at the angular positions of 45° and 225°. For this reason, the enable signal is switched to a high level at each of the angular positions of 45°, 90°, 135°, 180°, 225°, 270°, 315°, and 0°. Also, the regulator 63 supplies a predetermined voltage to the power supply line PL at each of the angular positions of 45°, 90°, 135°, 180°, 225°, 270°, 315°, and 0°, in a state where the enable signal is held at the high level.

In the present embodiment, the output of the magnetic sensor 51 and the output of the magnetic sensor 52 have a phase difference of 90°, and the detection unit 13 detects the rotational position information by using the phase difference. The output of the magnetic sensor 51 is a positive sine wave in a range from the angular position 22.5° to the angular position 112.5°. In the angle range, the regulator 63 outputs the electric power at the angular positions of 45 and 90°. The magnetic sensor 51 and the analog comparator 65 are driven by the electric power supplied at each of the angular positions of 45° and 90°. A signal (hereinafter, referred to as "A-phase signal") that is output from the analog comparator 65 is kept at an L-level in a state where the electric power is not supplied, and is an H-level at each of the angular positions of 45 and 90°.

The output of the magnetic sensor 52 is a positive sine wave in a range from the angular position 157.5° to the angular position 247.5°. In the angle range, the regulator 63 outputs the electric power at the angular positions of 180° and 225°. The magnetic sensor 52 and the analog comparator 66 are driven by the electric power supplied at each of the angular positions of 180° and 225°. A signal (hereinafter, referred to as "B-phase signal") that is output from the analog comparator 66 is kept at an L-level in a state where the electric power is not supplied, and is an H-level at each of the angular positions of 180° and 225°.

Herein, when the A-phase signal supplied to the counter 67 is an H-level (H) and the B-phase signal supplied to the counter 67 is an L-level, a set of the signal levels is denoted as (H, L). In FIG. 5, a set of the signal levels at the angular position of 180 is (L, H), a set of the signal levels at the angular position of 225° is (H, H), and a set of the signal levels at the angular position of 270° is (H, L).

When one or both of the detected A-phase signal and B-phase signal is an H-level, the counter 67 stores the set of the signal levels in the storage unit 14. When one or both of the A-phase signal and B-phase signal detected next time is an H-level, the counter 67 reads out the set of the previous signal levels from the storage unit 14 and compares the set of the previous signal levels and a set of the current signal levels to determine the rotating direction. For example, when the set of the previous signal levels is (H, H) and the set of the current signal levels is (H, L), since the angular position in the previous detection is 225° and the angular position in the current detection is 270°, it can be seen that it is a counterclockwise direction (forward rotation). When the set of the current signal levels is (H, L) and the set of the previous signal levels is (H, H), the counter 67 supplies an up signal, which indicates that the counter will be counted up, to the storage unit 14. When the up signal from the counter 67 is detected, the storage unit 14 updates the stored multi-turn information to a value increased by 1. In a case of the reverse rotation, since the previous signal levels are (H, H) and the current signal levels are (L, H), the storage unit 14 subtracts "1" from the multi-turn information. In this way, the multi-turn information detection unit 3 in accordance with the present embodiment can detect the multi-turn information while determining the rotating direction of the rotary shaft SF. Also, since the current is intermittently supplied to the magnetic sensors 51 and 52 only for a time period during which the pulse signals are generated from the electric signal generation units 31A and 31B, it is possible to considerably suppress the power consumption of the battery 32, as compared to a case where the current is supplied all the time to the magnetic sensors 51 and 52.

Figure 6A:
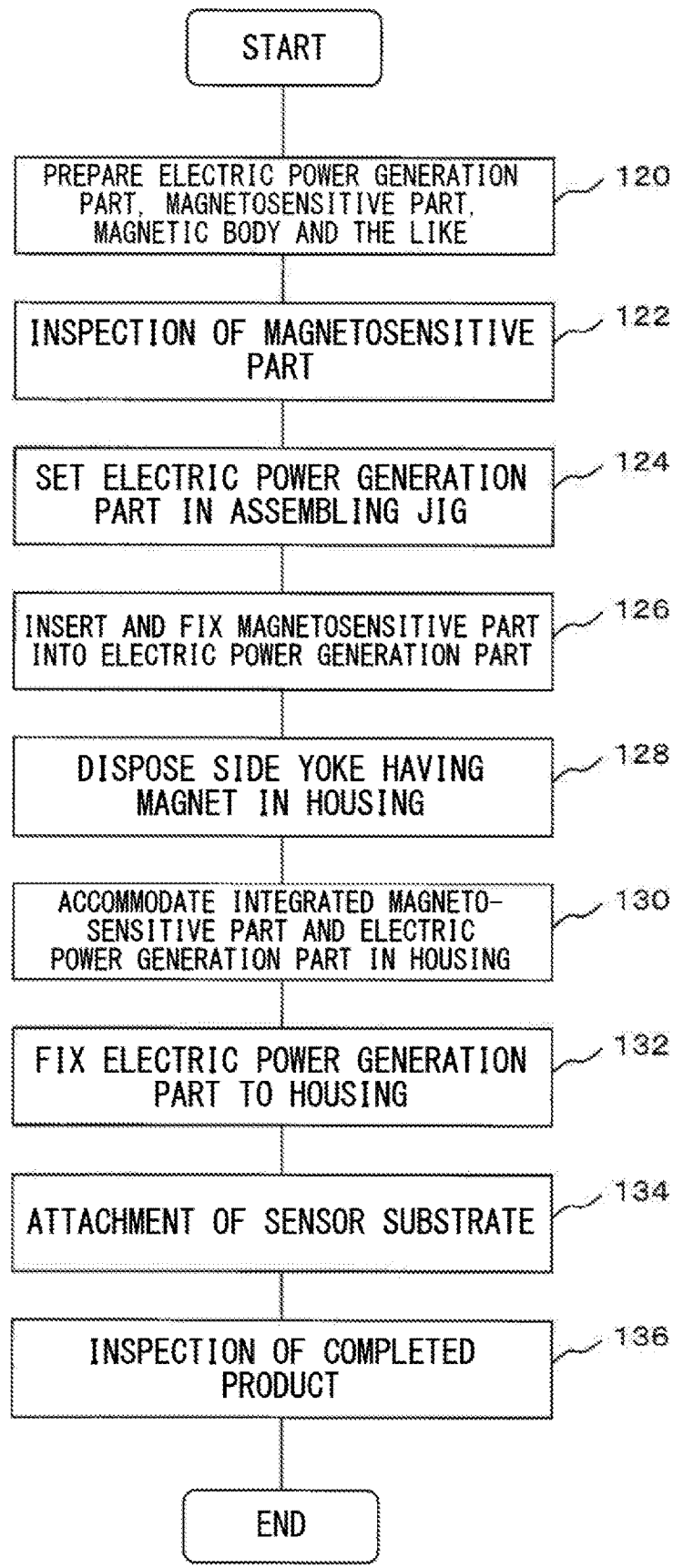
FIG. 6A is a flowchart showing an example of a manufacturing method of an encoder device.
Figure 7A:
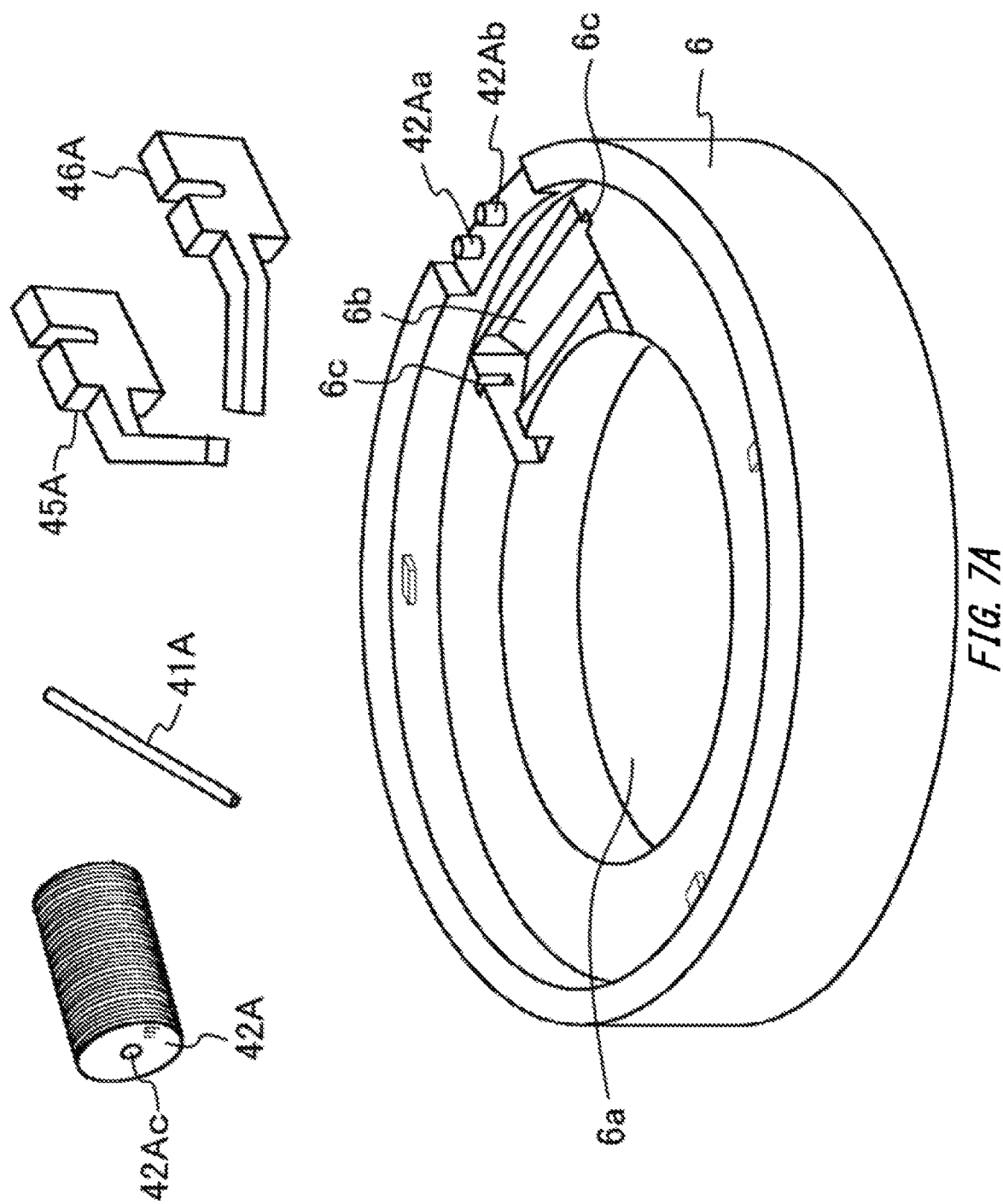
FIG. 7A is a perspective view showing an electric power generation part, a magnetosensitive part, a magnetic body, and a housing.

Hereinafter, an example of a manufacturing method of the encoder device EC of the present embodiment is described with reference to a flowchart of FIG. 6A. In the below, the encoder device EC is described as having only one electric signal generation unit 31A. Even when a plurality of electric signal generation units is provided, the encoder device can be similarly manufactured. First, in step 120 in FIG. 6A, the housing 6 and the like (including the magnet 11, the yoke member 18 and the like) to which the electric power generation part 42A, the magnetosensitive part 41A, the first magnetic body 45A, the third magnetic body 46A, and the electric signal generation unit 31A shown in FIG. 7A are mounted are prepared (for example, manufactured). The housing 6 has a short cylindrical shape whose central part is provided with an opening 6a, a part of the housing 6 is formed with a groove portion 6b for accommodating the first and third magnetic bodies 45A and 46A and the electric power generation part 42A, and the circumferential side surface of the groove portion 6b is formed with clearance grooves 6c for accommodating both end portions of the magnetosensitive part 41A.

In next step 122, the magnetosensitive part 41A is mounted to an inspection tool (not shown) to inspect whether an electric signal equal to or more than a predetermined standard is obtained from the electric power generation part 42A, for example. The inspection tool is a completed product of the encoder device EC comprising the electric signal generation unit 31A serving as a reference that allows the magnetosensitive part 41A to be taken in an out, for example. The magnetosensitive part 41A that has passed the inspection is used in step 126. In step 124, an assembling jig 44 shown in FIG. 8A and FIG. 8B is used. The assembling jig 44 has a cuboid shape, and is formed on its one surface with two cylindrical hole portions 44a and 44d each having a diameter slightly greater than the electric power generation part 42A and a depth slightly smaller than the electric power generation part 42A. At centers of the hole portions 44a and 44d, hole portions 44b and 44e each having a diameter slightly greater than the magnetosensitive part 41A and a depth slightly greater than a thickness of parts on the side of the electric power generation part 42A of the magnetic bodies 45A and 46A are formed. Also, clearance grooves 44c and 44f for allowing both end portions of the coil of the electric power generation part 42A to pass are formed from side surfaces of the hole portions 44a and 44d to a side surface of the assembling jig 44. Then, the electric power generation part 42A is set (inserted) into the hole portion 44d of the assembling jig 44. The other electric power generation part 42A is also set in the other hole portion 44a.

In next step 126, the magnetosensitive part 41A is inserted into the through-hole 42Ac of the electric power generation part 42A in the hole portion 44d of the assembling jig 44 in FIG. 8B. The tip end portion of the magnetosensitive part 41A is inserted into the hole portion 44e in the hole portion 44d. In this state, the magnetosensitive part 41A is fixed at one or two places of the end portion (mouth portion) of the through-hole 42Ac in the electric power generation part 42A by adhesion or the like. Thereby, as shown in FIG. 8C, the electric power generation part 42A and the magnetosensitive part 41A are integrated each other.

Figure 7B:
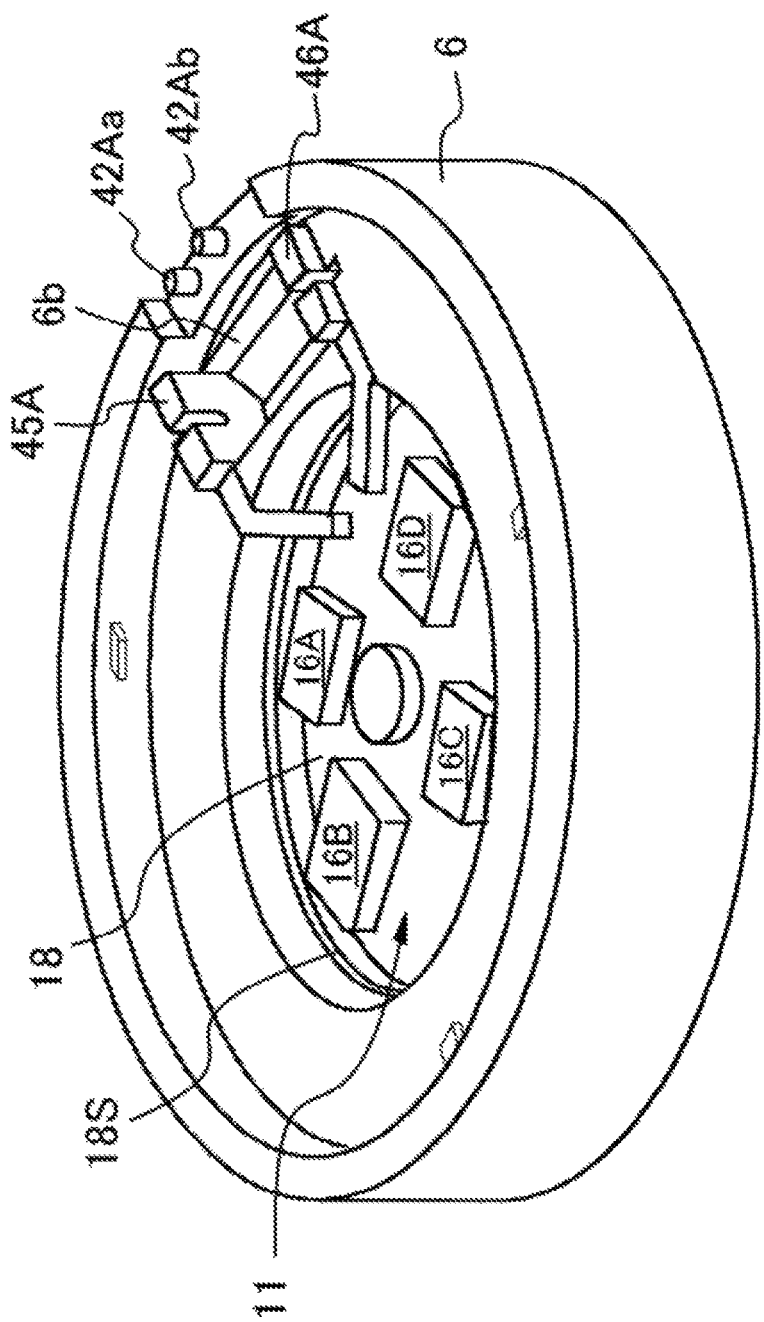
FIG. 7B is a perspective view showing a state where the magnetic body is incorporated into the housing.

In step 128 in parallel with or prior to these operations, as shown in FIG. 7B, the yoke member 18 (side yoke 18S) on which the magnet 11 is provided is disposed inside of the housing 6. Note that, as an example, as shown in FIG. 9B, the rotary shaft SF is rotatably supported to a center of a base member 7 for supporting the motor M in FIG. 1, via a rotary bearing (not shown). Also, a cylindrical end portion of the disc 5 is fixed to the tip end portion of the rotary shaft SF by a bolt 10, the yoke member 18 (side yoke 18S) is coupled to a bottom surface of the disc 5, and the magnet 11 is disposed inside of the yoke member 18. In other words, in this example, the disc 5 also serves as a support member. The housing 6 is fixed at three places to an upper surface of the base member 7 by bolts (not shown) so as to surround the disc 5 and the magnet 11, for example. For this reason, the housing 6 (a mold) is disposed to be relatively rotatable together with the side yoke 18S so as to surround the side yoke 18S (a second magnetic body). Also, as shown in FIG. 7B, the first and third magnetic bodies 45A and 46A are attached to the groove portion 6b of the housing 6. The first and third magnetic bodies 45A and 46A are provided at the upper part (groove portion 6b) of the housing 6. Note that, the yoke member 18 may also be configured not to rotate (in this case, the magnet 11 is fixed to the rotary shaft SF and the like via a support member (not shown)). In this case, the yoke member 18 may also be fixed to the housing 6.

Then, in step 130, the integrated electric power generation part 42A and magnetosensitive part 41A are accommodated in the groove portion 6b of the housing 6. At this time, the two end portions of the magnetosensitive part 41A protruding from both ends of the electric power generation part 42A are accommodated in the notched portions 45Aa and 46Aa of the first and third magnetic bodies 45A and 46A and in the clearance grooves 6c of the housing 6. In next step 132, the electric power generation part 42A is fixed to the housing 6 by adhesion or the like, and both end portions of the coil of the electric power generation part 42A are connected to the terminals 42Aa and 42Ab by soldering or the like. Thereby, the electric signal generation unit 31A is completed.

Figure 9A:
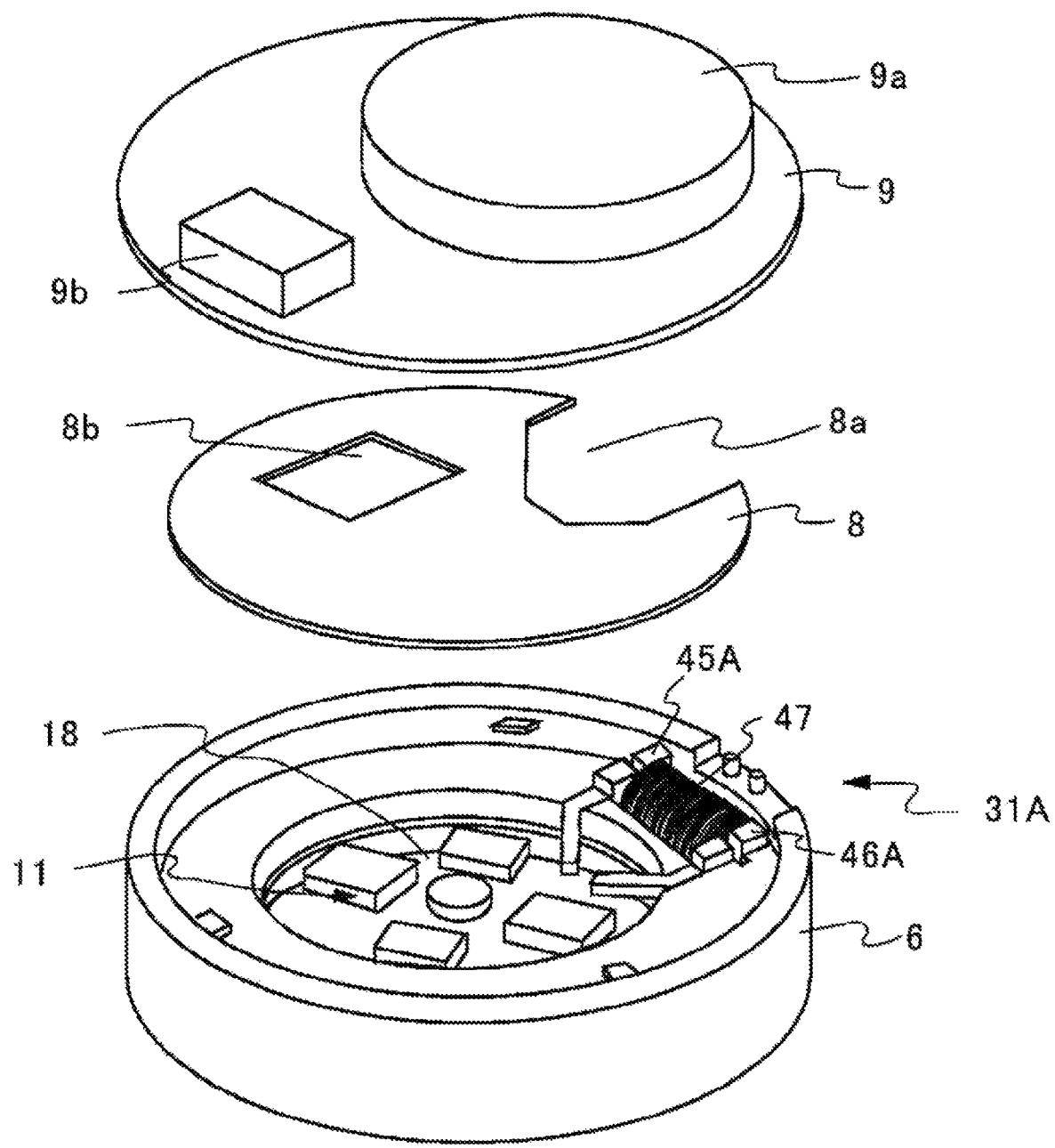
FIG. 9A is a perspective view showing a substrate, a shield plate and the housing.
Figure 9B:
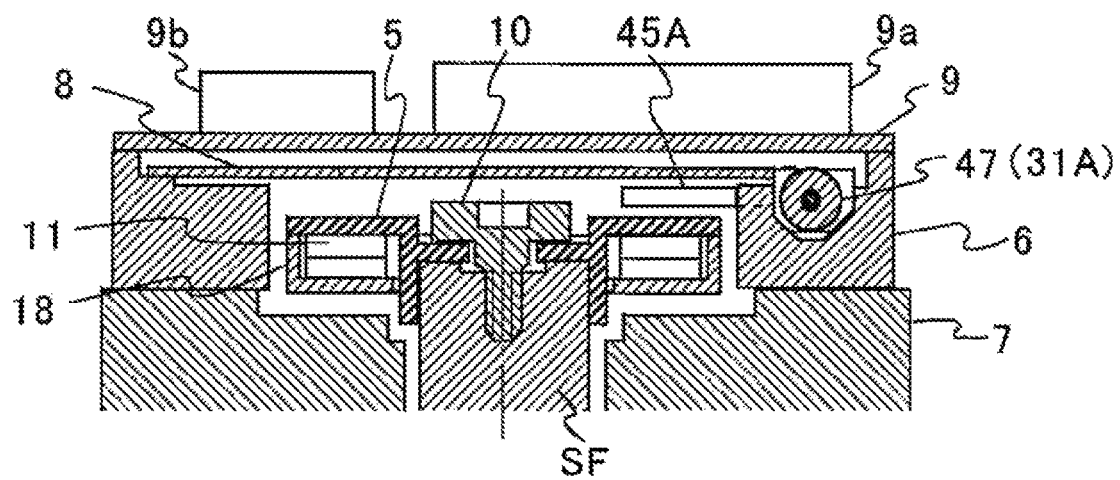
FIG. 9B is a sectional view showing the assembled encoder device.

In step 134, as shown in FIG. 9A and FIG. 9B, a disc-shaped shield plate 8 for magnetism and a sensor substrate 9 on which the angle detection unit 4 and the magnetism detection unit 12 shown in FIG. 1 are mounted are attached to an upper part of the housing 6 in which the electric signal generation unit 31A is incorporated, so that the encoder device EC is completed. The shield plate 8 is formed with a notched portion 8a in which the electric signal generation unit 31A is accommodated and a rectangular opening 8b for allowing light from a light-emitting unit of the sensor substrate 9 and magnetic flux lines for the magnetism detection unit 12 to pass therethrough. Also, the sensor substrate 9 is provided with an accommodation part 9a for accommodating the battery 32 (for example, a primary battery) and an accommodation part 9b for accommodating a processing circuit. In step 136, the completed product of the encoder device EC is inspected. As an example, it is inspected whether an electric signal equal to or more than a predetermined standard is obtained from the electric signal generation unit 31A by rotating the rotary shaft SF at a predetermined rotating speed. When an electric signal equal to or more than a predetermined standard is obtained from the electric signal generation unit 31A, the encoder device EC is determined as an accepted product and the manufacturing process is over. When an electric signal equal to or more than a predetermined standard is not obtained from the electric signal generation unit 31A, the processing returns to step 130, for example, and the integrated electric power generation part 42A and magnetosensitive part 41A may be replaced, or the like. According to the manufacturing method, since it is possible to perform efficiently and accurately relative positioning between the electric power generation part 42A and the magnetosensitive part 41A by using the assembling jig 44, it is possible to efficiently manufacture the electric signal generation unit 31A and the encoder device EC.

In this way, the encoder device EC in accordance with the present embodiment comprises the position detection system 1 (position detection unit) that detects the rotational position information of the rotary shaft SF (moving part) of the motor M (power supplying unit); the magnet 11 that rotates in conjunction with the rotary shaft SF and has a plurality of polarities along the rotating direction (θ direction) of the rotary shaft SF; the electric signal generation unit 31A (electric signal generation unit) that has the magnetosensitive part 41A (magnetosensitive member 47) whose magnetic characteristic is changed by the change in magnetic field associated with movement of the magnet 11 (rotary shaft SF) and the first magnetic body 45A for guiding the magnetic flux lines of the magnet 11 toward the magnetosensitive part 41A, and generates the electric signal, based on the magnetic characteristic of the magnetosensitive part 41A; and the side yoke 18S (a second magnetic body) disposed between the magnet 11 and the magnetosensitive part 41A and provided so as to guide the magnetic flux lines of a part having one polarity of the magnet 11 toward a part having the other polarity of the magnet 11.

According to the present embodiment, a magnetic field component (a component (a noise component) of cancelling a necessary magnetic field component) unnecessary for pulse generation in the electric signal generation unit 31A including magnetic flux lines generated on the side surface of the magnet 11 is returned to the magnet 11 via the side yoke 18S. As a result, the unnecessary magnetic field component does not adversely affect the generation of the magnetic domain wall from one end toward the other end in the length direction of the magnetosensitive part 41A caused by the reversal of the AC magnetic field due to the rotation of the magnet 11. For this reason, even when the magnetosensitive part 41A is disposed near the side yoke 18S (magnet 11) and the electric signal generation unit 31A is downsized, it is possible to effectively generate the high-output pulse (electric signal) with high reliability (stable output) by using the electric signal generation unit 31A through the reversal of the AC magnetic field in the axial direction due to the rotation of the magnet 11, without being affected by the unnecessary magnetic field component. Also, in a case where the encoder device EC comprises the battery 32, it is possible to omit the maintenance (for example, replacement) of the battery 32 or to reduce the maintenance frequency of the battery 32 by using the electric signal effectively generated from the electric signal generation unit 31A.

Also, the present inventors actually measured the pulses generated using the electric signal generation unit 31A of the present embodiment and found out that a stable pulse with a small variation in amplitude was obtained during the rotation of the magnet 11. It is believed that this is because the electric signal generation unit 31A is provided with the neutral section (second timing) where the magnetic field is substantially zero in the magnetosensitive part 41A.

Also, in the encoder device EC, the electric power is supplied from the battery 32 to the multi-turn information detection unit 3 in a short time after the electric signal is generated from the electric signal generation unit 31A, so that the multi-turn information detection unit 3 is dynamically driven (intermittently driven). After the detection and writing of the multi-turn information are over, the power delivery to the multi-turn information detection unit 3 is cut off but the counted value is kept because it is stored in the storage unit 14. The sequence is repeated each time the predetermined position on the magnet 11 passes near the electric signal generation unit 31A, even in a state where the supply of the electric power from the outside is cut off. Also, the multi-turn information stored in the storage unit 14 is read by the motor control unit MC and the like when the motor M starts next time, and is used to calculate an initial position of the rotary shaft SF, and the like. In the encoder device EC, the battery 32 supplies at least a part of the electric power that is consumed in the position detection system 1, in accordance with the electric signal generated from the electric signal generation unit 31A. Therefore, it is possible to increase the lifetime of the battery 32. For this reason, it is possible to omit the maintenance (for example, replacement) of the battery 32 or to reduce the maintenance frequency of the battery 32. For example, when the lifetime of the battery 32 is longer than other parts of the encoder device EC, it may be unnecessary to replace the battery 32.

Note that, when a magnetosensitive wire such as a Wiegand wire is used, the output of the pulse current (electric signal) is obtained from the electric signal generation unit 31A even though the magnet 11 is rotated at extremely low speed. For this reason, for example, in a state where the electric power is not supplied to the motor M, even though the rotary shaft SF (magnet 11) is rotated at extremely low speed, the output of the electric signal generation unit 31A can be used as the electric signal. Note that, as the magnetosensitive wire (magnetosensitive part 41A), an amorphous magnetostrictive wire and the like can also be used.

Also, the manufacturing method of the encoder device EC of the present embodiment comprises step 120 of preparing the magnetosensitive part 41A, the electric power generation part 42A and the first magnetic body 45A; steps 124 and 126 of inserting the electric power generation part 42A into the first hole portion 44d of the assembling jig 44, and inserting the magnetosensitive part 41A into the second hole portion 44e formed in the first hole portion 44d through the electric power generation part 42A; step 126 of fixing the electric power generation part 42A and the magnetosensitive part 41A; and step 132 of fixing the electric power generation part 42A taken out from the assembling jig 44 to the housing 6 disposed on the side surface of the side yoke 18S (a second magnetic body). According to the manufacturing method, since it is possible to fix easily the electric power generation part 42A and the magnetosensitive part 41A with an accurate positional relation in the assembling jig 44, it is possible to efficiently manufacture the electric signal generation unit 31A and the encoder device EC.

Also, a method of incorporating the magnetosensitive part 41A and the electric power generation part 42A into the housing 6 (a mold) for the encoder device EC of the present embodiment is a method of incorporating the magnetosensitive part 41A and the electric power generation part 42A into the housing 6 of the encoder device EC comprising the position detection system 1 (position detection unit) that detects the rotational position information of the rotary shaft SF (moving part), the magnet 11 that rotates in conjunction with the rotary shaft SF and has a plurality of polarities along the rotating direction (θ direction) of the rotary shaft SF, the electric signal generation unit 31A (electric signal generation unit) that has the magnetosensitive part 41A whose magnetic characteristic is changed by the change in magnetic field associated with movement of the magnet 11 (rotary shaft SF), the electric power generation part 42A for generating the electric signal based on the magnetic characteristic of the magnetosensitive part 41A, and the first magnetic body 45A for guiding the magnetic flux lines of the magnet 11 toward the magnetosensitive part 41A, and the side yoke 18S (a second magnetic body) disposed between the magnet 11 and the magnetosensitive part 41A and provided so as to guide the magnetic flux lines of a part having one polarity of the magnet 11 toward a part having the other polarity of the magnet 11. This method comprises steps 124 and 126 of inserting the electric power generation part 42A into the first hole portion 44d of the assembling jig 44, and inserting the magnetosensitive part 31A into the second hole portion 44e formed in the first hole portion 44d through the electric power generation part 42A; step 126 of fixing the electric power generation part 42A and the magnetosensitive part 41A; and step 132 of fixing the electric power generation part 42A taken out from the assembling jig 44 to the housing 6 disposed on the side surface of the side yoke 18S (a second magnetic body). According to the incorporating method, since it is possible to fix easily the electric power generation part 42A and the magnetosensitive part 41A with an accurate positional relation in the assembling jig 44, it is possible to efficiently manufacture the electric signal generation unit 31A.

Note that, the present embodiment can be modified as follows. In the present embodiment, the two electric signal generation units 31A and 31B are provided. However, the encoder device EC may comprise only one electric signal generation unit 31A. Also, the encoder device EC may comprise three or more electric signal generation units. Also, in other embodiments and modified embodiments thereof to be described later, one electric signal generation unit will be described. However, a plurality of electric signal generation units may also be provided.

Figure 6B:
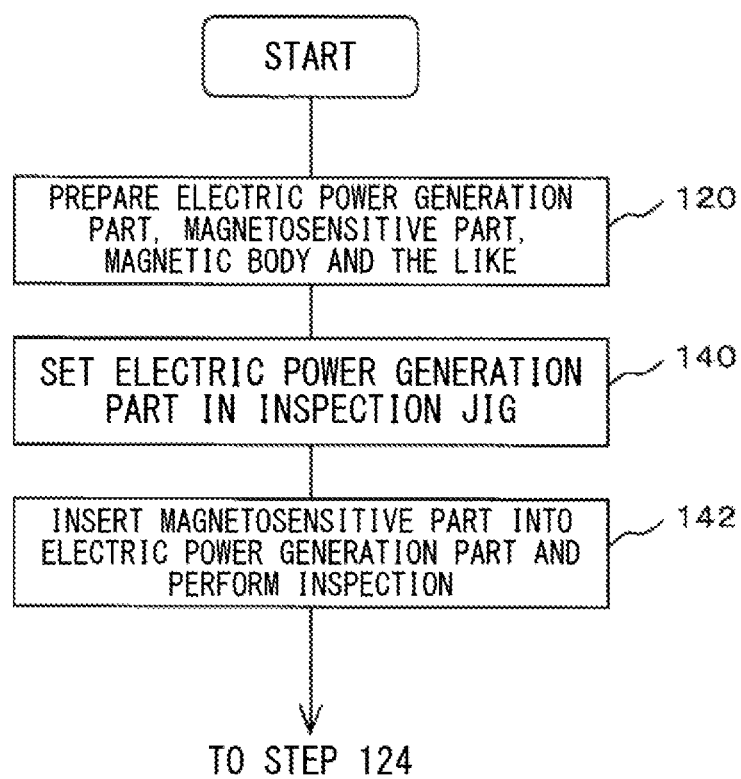
FIG. 6B is a flowchart showing a part of a modified embodiment of the manufacturing method.

Also, in the manufacturing method of the encoder device EC or the method of incorporating the magnetosensitive part 41A and the electric power generation part 42A into the housing 6, as shown in a modified embodiment in FIG. 6B, subsequently to step 120 (preparation process), in step 140, the electric power generation part 42A may be set in the inspection tool (not shown). Also, in step 142, the magnetosensitive part 41A (not shown) (a master magnetosensitive part), which becomes a reference as it is confirmed that an appropriate electric signal is generated from the electric power generation part 42A when the magnetosensitive part 41A is inserted in advance into the electric power generation part 42A (not shown) for inspection, may be inserted into the through-hole 42Ac of the electric power generation part 42A, and it may be inspected whether an electric signal equal to or more than a predetermined standard, for example, is obtained from the electric power generation part 42A. By the inspection, the electric power generation part 42A is inspected. The electric power generation part 42A that has passed the inspection is set in the assembling jig 44 in step 124 in FIG. 6A. The subsequent manufacturing processes are similar to the operations in FIG. 6A. According to this modified embodiment, since the inspection on the electric power generation part 42A has completed, the yield in the inspection on the completed product in step 136 is improved.

Figure 10:
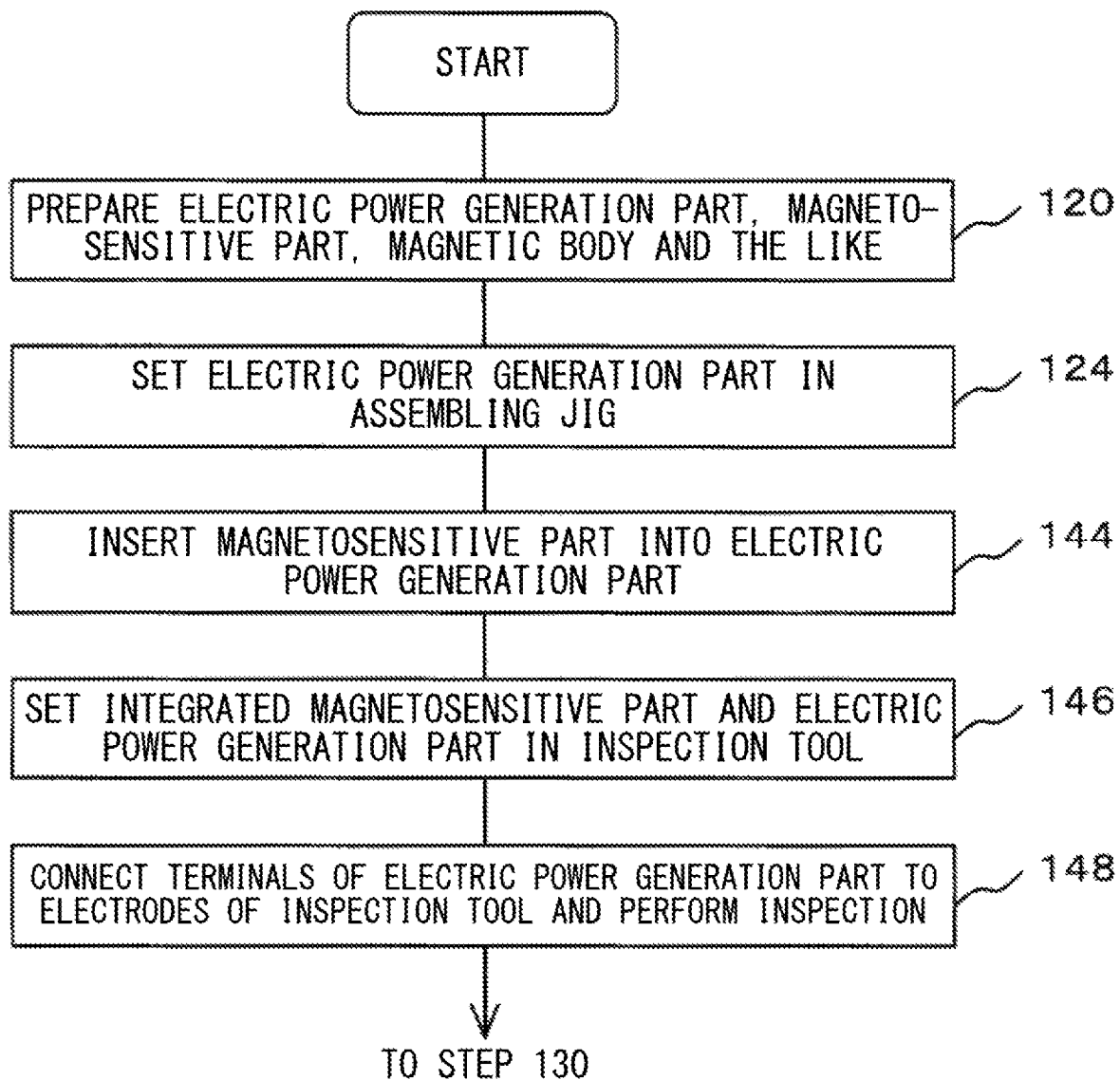
FIG. 10 is a flowchart showing a part of a modified embodiment of the manufacturing method of an encoder device.

Also, as shown in a modified embodiment of FIG. 10, subsequently to step 120 (preparation process), in step 124, the electric power generation part 42A may be set in the hole portion 44d of the assembling jig 44, in step 144, the magnetosensitive part 41A may be inserted into the electric power generation part 42A, and in step 146, the electric power generation part 42A and magnetosensitive part 41A integrated in the assembling jig 44 may be set in the inspection tool (not shown). In this example, in step 148, the two terminals of the coil of the electric power generation part 42A may be connected to electrodes (not shown) of the inspection tool, and it may be inspected whether an electric signal equal to or more than a predetermined standard, for example, is obtained from the electric power generation part 42A. The electric power generation part 42A and the magnetosensitive part 41A that have passed the inspection are fixed to the mouth portion (for example, the tip end) of the through-hole 42Ac by adhesion or the like. Then, the connection is disconnected, and the processing proceeds to step 132 in FIG. 6A in which the integrated electric power generation part 42A and magnetosensitive part 41A are mounted to the housing 6. The subsequent operations are similar to the operations in FIG. 6A. According to this modified embodiment, since the inspection on the electric power generation part 42A and the magnetosensitive part 41A has integrally completed, the yield in the inspection on the completed product in step 136 is improved.

Second Embodiment

Figure 11A:
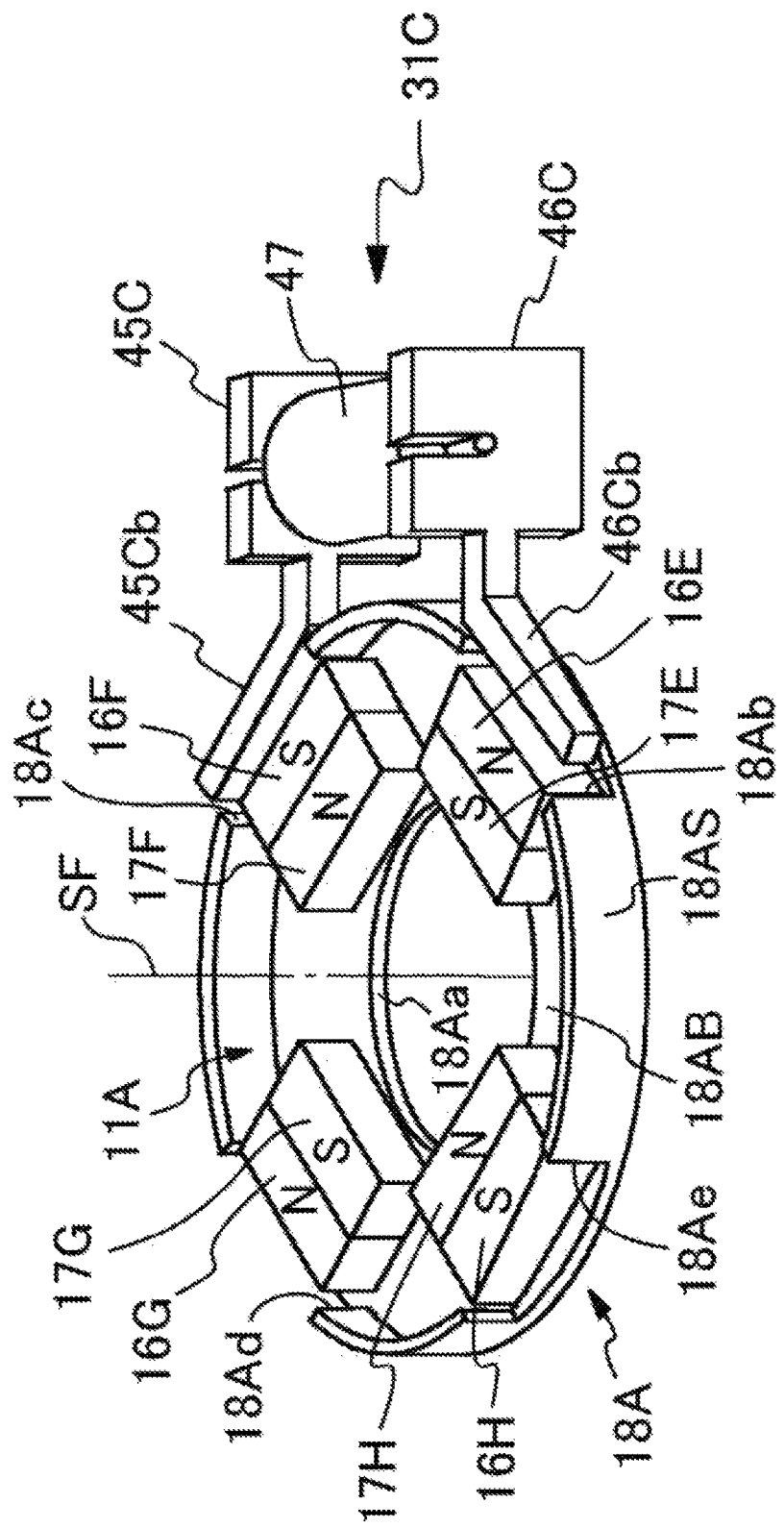
FIG. 11A is a perspective view showing a magnet and an electric signal generation unit in accordance with a second embodiment.
Figure 11B:
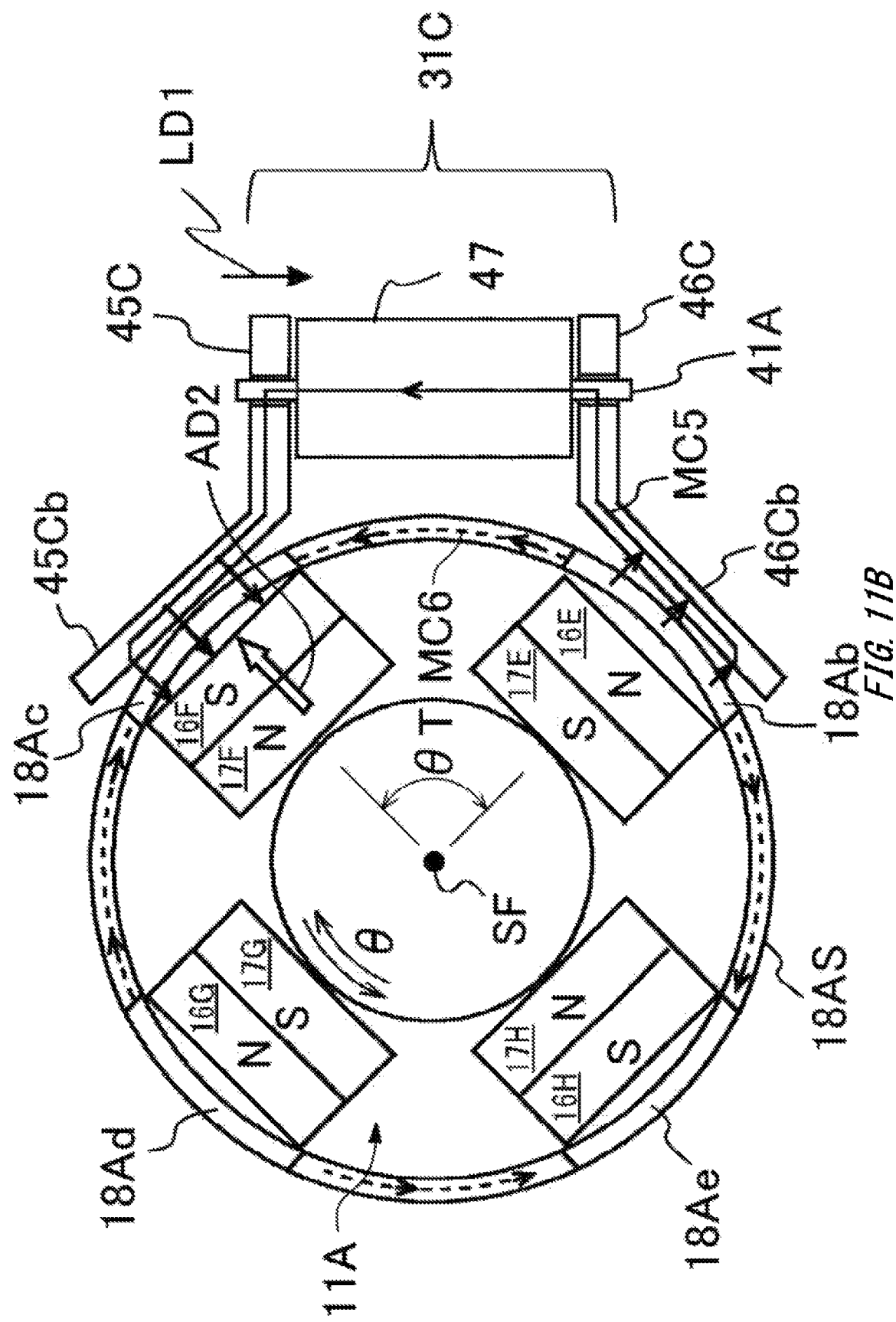
FIG. 11B is a plan view of FIG. 11A.
Figure 11C:
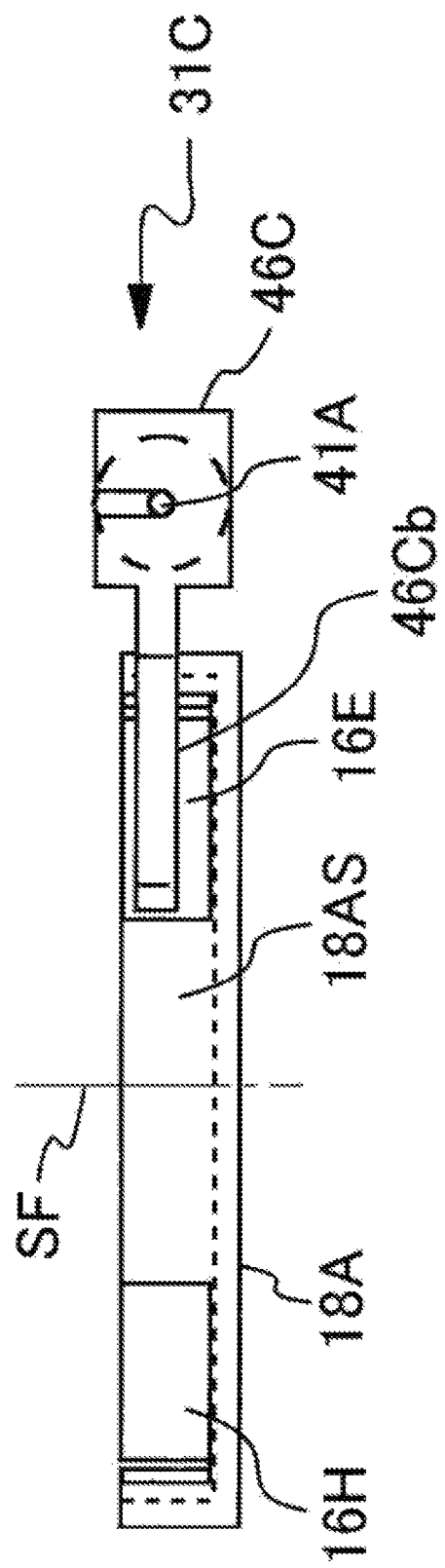
FIG. 11C is a side view of FIG. 11B.

A second embodiment is described with reference to FIG. 11A to FIG. 12C. Note that, in FIG. 11A to FIG. 12C, the parts corresponding to FIG. 2A to FIG. 2C are denoted with the same reference signs, and the detailed descriptions thereof are omitted. FIG. 11A is a perspective view showing a magnet 11A, a yoke member 18A, and an electric signal generation unit 31C of an encoder device in accordance with the present embodiment, FIG. 11B is a plan view showing the encoder device, and FIG. 11C is a side view of FIG. 11B. In FIG. 11A and FIG. 11B, the magnet 11A is configured so that the direction and strength of the magnetic field in a radial direction (or a diametrical direction, or a radiation direction) AD2 with respect to the rotary shaft SF are changed by rotation. The magnet 11A is, for example, configured by a plurality of magnets disposed in an annular shape coaxial with the rotary shaft SF. The main surfaces (front surface) and back surface of the magnet 11A are each substantially perpendicular to the rotary shaft SF.

The magnet 11A includes a first set of magnets on an outer periphery-side where four magnets of an N pole 16E, an S pole 16F, an N pole 16G, and an S pole 16H each having the same cuboid shape are disposed in an annular shape with intervals of 90° in the rotating direction or the circumferential direction (θ direction) of the rotary shaft SF and a second set of magnets consisting of magnets of an S pole 17E, an N pole 17F, an S pole 17G, and an N pole 17H each having the same shape and disposed in an annular shape so as to closely contact inner surfaces of the first set of magnets. The first set of magnets on the outer periphery-side and the second set of magnets on the inner periphery-side are offset by 180° in phase. In this way, the magnet 11A has the plurality of (four, in this example) polarities (the N pole 16E, the S pole 16F, and the like) along the θ direction. Also, in the magnet 11A, a direction orthogonal to the rotating direction (moving direction), i.e., in the present embodiment, the radial direction AD2 with respect to the rotary shaft SF is regarded as a width direction of the magnet 11A. The magnet 11A has polarities (the N pole 16E, the S pole 17E and the like) that are also different from each other in the width direction (radial direction AD2) orthogonal to the θ direction, on the front surface or back surface. As the magnet 11A, for example, annular-shaped permanent magnets magnetized to have a plurality of pairs of polarities (for example, 4 pairs) in the θ direction may be used. Also, for example, a member consisting of the N pole 16E and the S pole 17E may be regarded as one magnetic element magnetized to have two magnetic poles. In the present embodiment, a magnetization direction (orientation direction) of the magnet 11A is the radial direction AD2.

Also, the yoke member 18A formed of a ferromagnetic material has an annular-shaped back yoke 18AB that has an opening 18Aa and the magnet 11A is placed thereon, and a cylindrical side yoke 18AS provided so as to surround the magnet 11A on the back yoke 18AB. The side yoke 18AS of the present embodiment is provided with a plurality of (four, in this example) openings 18Ab, 18Ac, 18Ad and 18Ae at the same positions as parts of polarities (the N pole 16E, the S pole 16F and the like) different from each other in the circumferential direction of the magnet 11A with the same angle intervals as angle intervals θT of the parts having polarities different from each other. A width of each of the openings 18Ab to 18Ae is substantially the same as a width of each of the magnets of the N pole 16E to the S pole 16H facing the side surface of the magnet 11 in a direction (radial direction) orthogonal to the rotary shaft SF.

In the present embodiment, the magnetosensitive member 47 of the electric signal generation unit 31C is disposed so that the length direction LD1 is parallel to the circumferential direction of the rotary shaft SF in the vicinity of the outer surface of the side yoke 18AS. For this reason, the electric signal generation unit 31C can be made small. Also in the present embodiment, since the magnetic flux lines of the magnet 11A are not leaked toward the magnetosensitive member 47 by the side yoke 18AS, the direction of the length direction LD1 of the magnetosensitive member 47 is arbitrary.

Also, a tip end portion 45Cb of a first magnetic body 45C on one end-side of the magnetosensitive member 47 is disposed near an outer surface of the side yoke 18AS so as to be substantially parallel to the outer surface. Also, a tip end portion 46Cb of a third magnetic body 46C on the other end-side of the magnetosensitive member 47 is disposed near the outer surface of the side yoke 18AS so as to be substantially parallel to the outer surface. The tip end portion 45Cb of the first magnetic body 45C and the tip end portion 46Cb of the third magnetic body 46C are line-symmetrically formed so as to expand in a V-shape, and an angle interval between the tip end portion 45Cb and the tip end portion 46Cb is substantially the same as the angle intervals θT of the openings 18Ab to 18Ae of the side yoke 18AS (i.e., the angle intervals of the parts having polarities different from each other in the magnet 11A). In other words, the tip end portion 45Cb of the first magnetic body 45C and the tip end portion 46Cb of the third magnetic body 46C are one pair, and the tip end portions 45Cb and 46Cb are formed in a direction away from each other (an outward direction) with respect to a reference line of the line symmetry. The other configurations are similar to the first embodiment.

In the present embodiment, as shown in FIG. 11B, when a center of the electric signal generation unit 31C is located in an intermediate position between the parts having polarities different from each other (for example, the N pole 16E and the S pole 16F) of the magnet 11A or in near positions thereof, the tip end portions 45Cb and 46Cb of the first and third magnetic bodies 45C and 46C face the parts having polarities different from each other in the magnet 11A through the openings (for example, the openings 18Ac and 18Ab) of the side yoke 18AS. By the magnet 11A, the first magnetic body 45C, the magnetosensitive member 47 (a magnetosensitive part 41A), and the third magnetic body 46C, a magnetic circuit MC5 including the magnetic flux lines toward the length direction of the magnetosensitive part 41A is formed. Also, the unnecessary magnetic flux lines from the N pole 16E, for example, in a position close to the magnetosensitive member 47 toward an oblique direction (a direction of the magnetosensitive member 47) with respect to the diametrical direction of the rotary shaft SF are directed toward the adjacent S pole 16F along the magnetic circuit MC6 formed in the side yoke 18AS. For this reason, the magnetic flux lines generated in the oblique direction from the N pole 16E and the like are not directed toward the length direction of the magnetosensitive part 41A, so that opposite magnetic flux lines, which cancel the original magnetic flux lines, do not act in the length direction of the magnetosensitive part 41A.

Figure 12A:
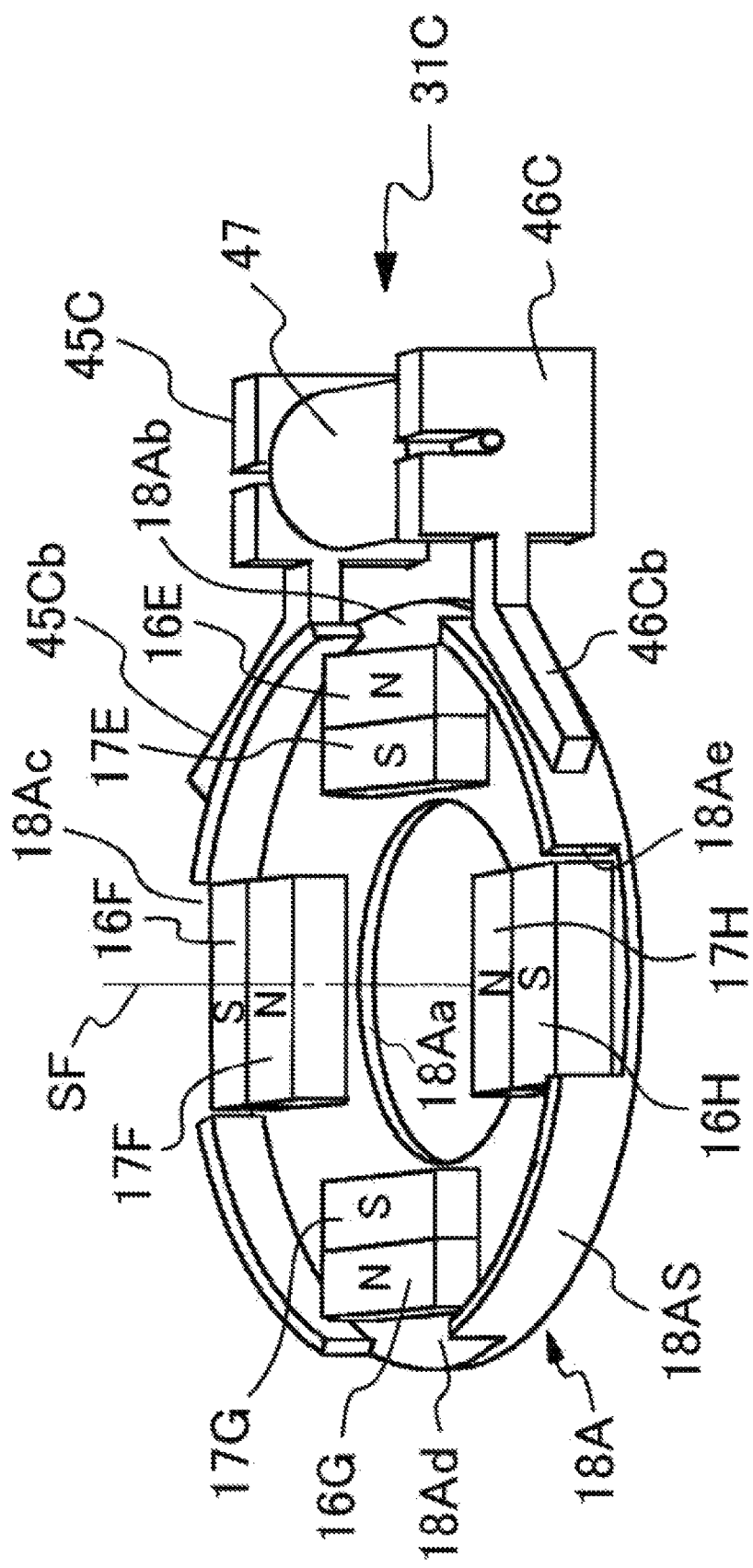
FIG. 12A is a perspective view showing a state of the magnet rotated by 45° from the state shown in FIG. 11A.
Figure 12C:
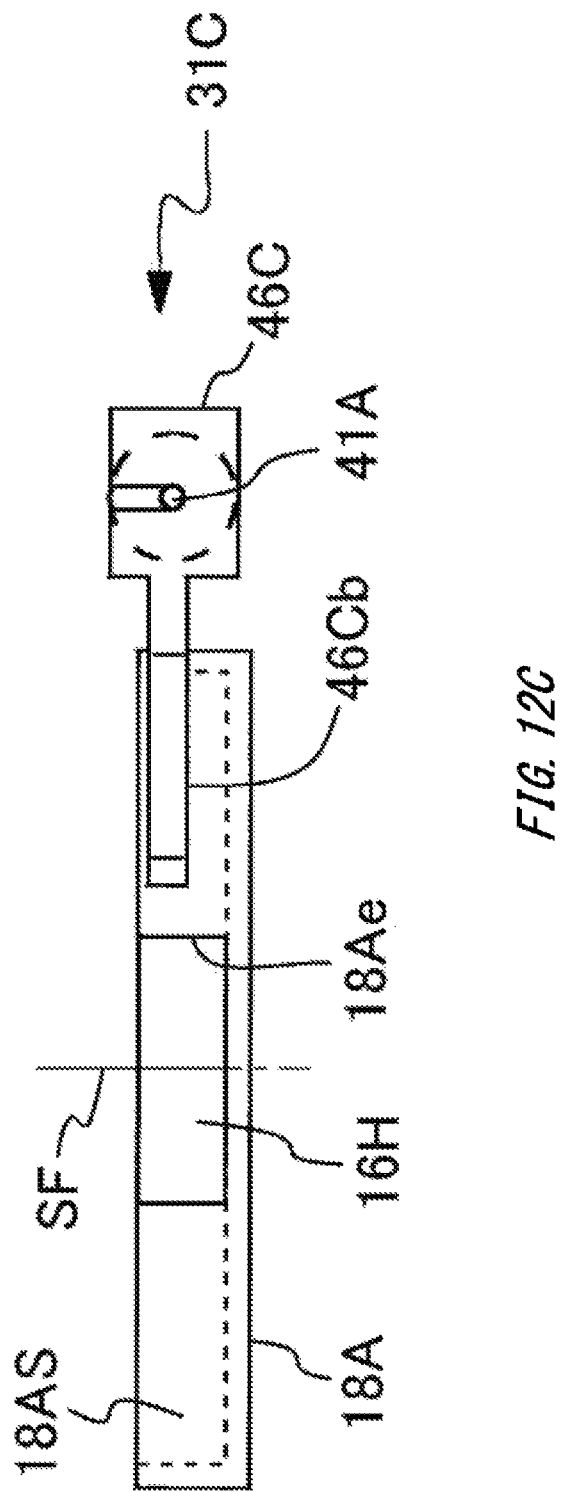
FIG. 12C is a side view of FIG. 12B.

Also, FIG. 12B shows a state where the magnet 11A and the yoke member 18A are rotated counterclockwise by 45° from the state of FIG. 11B, FIG. 12A is a side view showing the state, and FIG. 12C is a side view of FIG. 12B. In FIG. 12B, the center of the N pole 16E of or its vicinity is positioned at the center of the electric signal generation unit 31C via the opening 18Ab of the side yoke 18AS, and the tip end portions 45Cb and 46Cb of the first and third magnetic bodies 45C and 46C of the electric signal generation unit 31C are positioned near the outer surface of the side yoke 18AS. For this reason, the magnetic flux lines from the N pole 16E toward the first and third magnetic bodies 45C and 46C (the radial direction of the rotary shaft SF) are guided toward the adjacent S poles 16F and 16H via the magnetic circuit MC6 of the side yoke 18AS, without being directed toward the magnetosensitive member 47. Similarly, even when the centers of the S pole 16F, the N pole 16G and the S pole 16H or their vicinities are positioned at the center of the electric signal generation unit 31C, since the magnetic flux lines from the S pole 16F, the N pole 16G and the S pole 16H toward the diametrical direction of the rotary shaft SF are guided toward the part having the other polarity via the side yoke 18AS, the magnetic flux lines are not guided in the length direction of the magnetosensitive member 47. For this reason, the induction current is not generated in the magnetosensitive member 47. Also, as shown in FIG. 11B and FIG. 12B, when located in at least one angular position within one-turn of the magnet 11 (for example, an angular position in which the electric signal is generated from the electric signal generation units 31A and 31B), the tip end portions 45Cb and 46Cb are disposed (inclination angles of the tip end portions 45Cb and 46Cb are determined) so that a central line CL2a of the tip end portion 45Cb of the first magnetic body 45C and a central line CL2b of the tip end portion 46Cb of the third magnetic body 46C are substantially parallel to the side yoke 18AS on both sides of a part having a predetermined polarity (the N pole 16E in FIG. 12B) of the magnet 11 or a predetermined opening (the opening 18Ab in FIG. 12B), as seen from the axial direction of the rotary shaft SF. Also, in at least one angular position within one-turn of the magnet 11A, the tip end portion 45Cb of the first magnetic body 45C is disposed in a position facing a part having a predetermined polarity (the N pole 16E to the S pole 16H) of the magnet 11A in the radial direction of the rotary shaft SF. Also, at least a part of the first and third magnetic bodies 45C and 46C is disposed in a position overlapping the side yoke 18AS in the radial direction of the rotary shaft SF.

Also in the electric signal generation unit 31C of the present embodiment, while the rotary shaft SF rotates one-turn, there is a first timing (a time period based on the time point in FIG. 11B) at which the magnetic flux lines from the magnet 11A pass the magnetosensitive part 41A via the opening of the side yoke 18AS and the first and third magnetic bodies 45C and 46C and a second timing (a time period based on the time point in FIG. 12B) at which the magnetic flux lines from the magnet 11A pass the side yoke 18AS (a second magnetic body) and do not pass the magnetosensitive part 41A, and the electric signal is generated in the electric signal generation unit 31A at the first timing. A section (a section of a predetermined angle during one-turn) of the magnet 11A at the second timing is a neutral section (at the second timing) in which a magnetic field becomes substantially zero in the magnetosensitive part 41A.

For this reason, according to the electric signal generation unit 31C of the present embodiment, the rotations of the magnet 11A and the yoke member 18A switch the section (second timing) in which the magnetic flux lines from the magnet 11A do not pass in the length direction of the magnetosensitive member 47 (see FIG. 12B) to the section (first timing) in which the magnetic flux lines from the magnet 11A pass in the length direction of the magnetosensitive member 47 via the opening of the side yoke 18AS and the first magnetic body 45C and the third magnetic body 46C (see FIG. 11B). Thereby, the magnetic flux lines change sharply in the length direction of the magnetosensitive part 41A, so that a higher output pulse can be generated from the electric power generation part 42A.

Also, for a time period based on the second timing, the magnetic flux lines of the magnet 11A are not leaked outside of the outer surface of the side yoke 18AS. Therefore, even when the magnetosensitive member 47 is disposed in close to the outer surface of the side yoke 18AS to narrow an interval between the magnetosensitive member 47 and the magnet 11A, it is possible to obtain a high-output electric signal from the magnetosensitive member 47. For this reason, the electric signal generation unit 31C can be downsized while obtaining the high-output pulse.

Third Embodiment

Figure 13A:
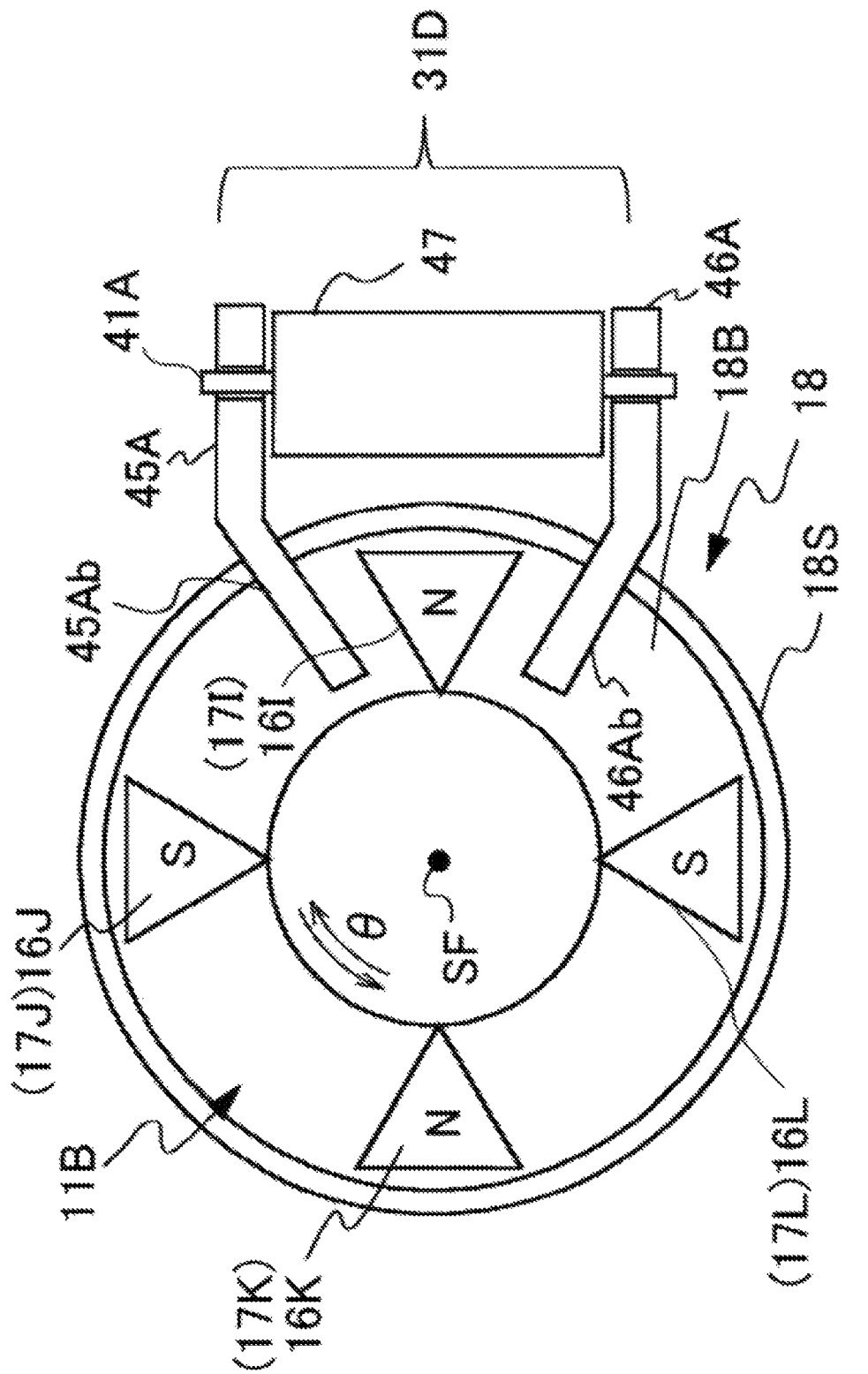
FIG. 13A is a plan view showing a magnet and an electric signal generation unit in accordance with a third embodiment.
Figure 13B:
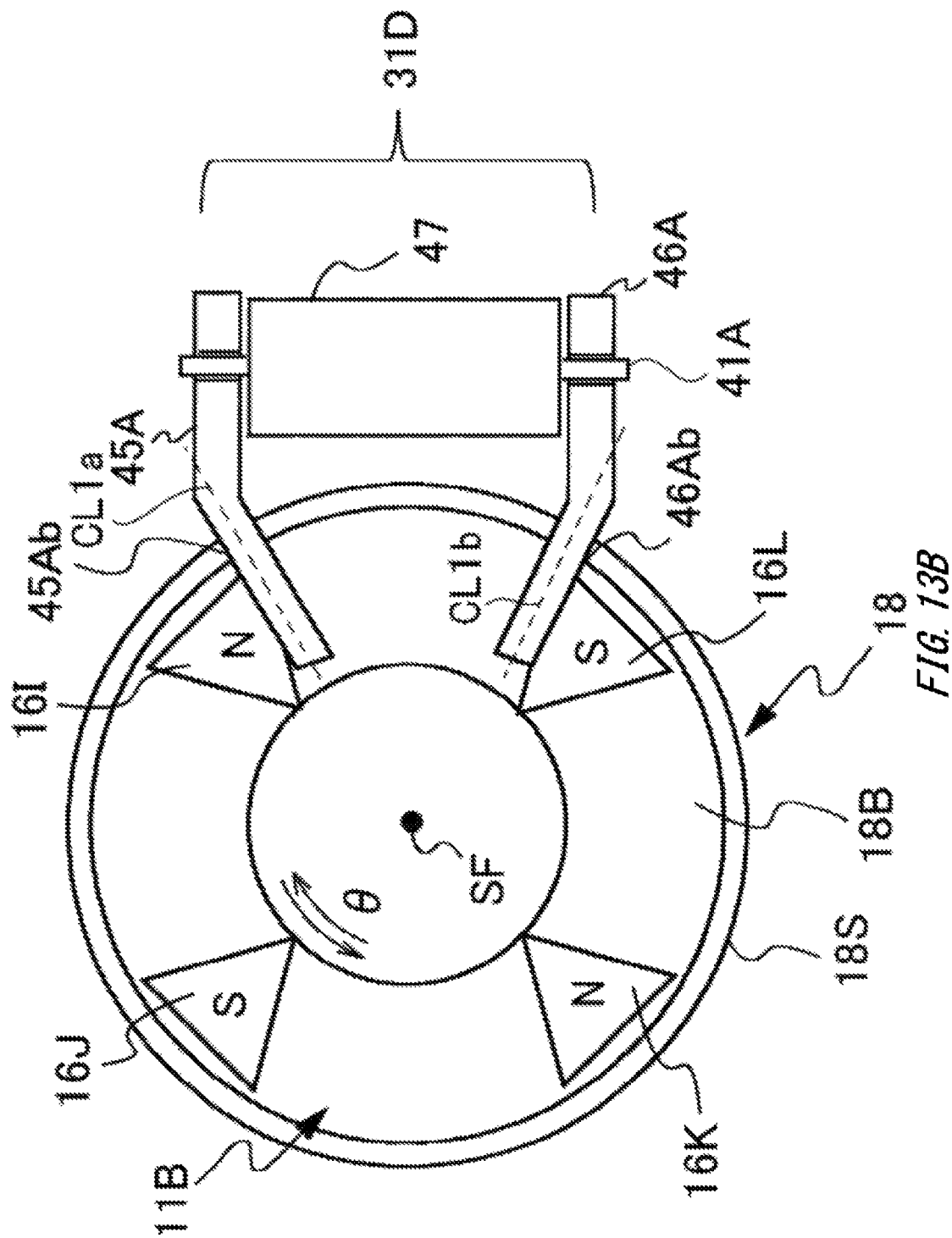
FIG. 13B is a plan view showing a state of the magnet rotated by 45° from the state shown in FIG. 13A.

A third embodiment is described with reference to FIG. 13A and FIG. 13B. Note that, in FIG. 13A and FIG. 13B, the parts corresponding to FIG. 2A to FIG. 2C are denoted with the same reference signs, and the detailed descriptions thereof are omitted. FIG. 13A is a plan view showing a magnet 11B, the yoke member 18 and an electric signal generation unit 31D of an encoder device in accordance with the present embodiment, and FIG. 13B is a plan view showing the magnet 11B rotated counterclockwise by 45° from the state shown in FIG. 13A. In FIG. 13A, the magnet 11B is mounted on the back yoke 18B of the yoke member 18 so that rotation changes the direction and strength of the magnetic field in an axial direction that is a direction parallel to a straight line passing through the center of the rotary shaft SF. Also, the magnet 11B is surrounded by the side yoke 18S. The magnet 11B is configured by a pair of isosceles triangular flat plate-shaped magnets of N poles 16I and 16K disposed to symmetrically sandwich the rotary shaft SF, magnets of S poles 16J and 16L of the same shape located in positions rotated by 90° from the N pole 16I and 16K around the rotary shaft SF, and magnets (not shown) of S poles 17I and 17K and N poles 17J and 17L of the same shape disposed on back surfaces of the N poles 16I and 16K and S poles 16J and 16L, respectively.

The magnet 11B is a combination of a plurality of (four, in FIG. 13A) permanent magnets magnetized to have four pairs of polarities along the circumferential direction (θ direction) around the rotary shaft SF. Note that, the magnet 11B may also be configured by one magnet, and this magnet nay be magnetized to have the N pole 16I to the S pole 16L, and the like. A front surface (a surface opposite to the motor M in FIG. 1) and a back surface that are main surfaces of the magnet 11B are each substantially perpendicular to the rotary shaft SF. An AC magnetic field whose direction of the magnetic field in the axial direction is reversed as the magnet 11B rotates is formed. The electric signal generation unit 31D is disposed on the upper surface and outer surface of the magnet 11B, as seen from the normal direction to the main surfaces of the magnet 11B.

In the present embodiment, each main body part (a part including the magnetosensitive member 47) of the electric signal generation unit 31D is provided without contacting the magnet 11B with going away from the magnet 11B in a radial direction orthogonal to the rotary shaft SF or in a direction parallel to the radial direction. The electric signal generation unit 31D includes the magnetosensitive member 47, the first magnetic body 45A, and the third magnetic body 46A. The first and third magnetic bodies 45A and 46A are provided to override the side yoke 18S between the front surface of the magnet 11B and both ends of the magnetosensitive part 41A. Since the length direction of the magnetosensitive member 47 is, for example, substantially parallel to the circumferential direction of the rotary shaft SF, the electric signal generation unit 31D can be downsized but the length direction is arbitrary. Also, as shown in FIG. 13B, when located in at least one angular position within one-turn of the magnet 11 (for example, an angular position in which the electric signal is generated from the electric signal generation units 31A and 31B), the tip end portions 45Ab and 46Ab are disposed (inclination angles of the tip end portions 45Ab and 46Ab are determined) so that the central line $CL1a$ of the tip end portion 45Ab of the first magnetic body 45A and the central line $CL1b$ of the tip end portion 46Ab of the third magnetic body 46A are substantially parallel to both sides (both side surfaces) of parts having two adjacent polarities (in FIG. 13B, the N pole 16I and the S pole 16L) of the magnet 11B on the electric signal generation unit 31D-side, as seen from the axial direction of the rotary shaft SF. Also, in at least one angular position within one-turn of the magnet 11B, the first magnetic body 45A is disposed in a position facing a part having a predetermined polarity (the N pole 16I to the S pole 16L) of the magnet 11B in the axial direction of the rotary shaft SF or in a direction parallel to the axial direction. Also, at least a part of the first and third magnetic bodies 45A and 46A are disposed in positions overlapping each of the parts having predetermined polarities (the N pole 16I to the S pole 16L) of the magnet 11B and the side yoke 18S, as seen from the axial direction of the rotary shaft SF.

As shown in FIG. 13A, when the center of the N pole 16I (or the S pole 16J, the N pole 16K, the S pole 16L) of the magnet 11B or its vicinity is located in the same angular position as the center of the electric signal generation unit 31D, the tip end portions 45Ab and 46Ab of the first and third magnetic bodies 45A and 46A on the magnet 11B-side are symmetrically inclined inward to be parallel to two symmetrical sides of the magnet of the N pole 16I and to go away outward from the two sides. In this state, the magnetic flux lines of the N pole 16N are directed toward the parts of the other polarity (the S poles 16J, 16L and 17I) via the side yoke 18AS, without being directed toward the magnetosensitive member 47 via the tip end portions 45Ab and 46Ab. For this reason, the neutral section (second timing) where the magnetic field component in the length direction of the magnetosensitive part 41A is substantially zero is set to an angle range wider than the case of FIG. 3B.

Also, as shown in FIG. 13B, in the state where the magnet 11B is rotated by 45° from the state of FIG. 13A, a center between the N pole 16I and S pole 16L of the magnet 11 (or a center between the S pole 16L and N pole 16K, a center between the N pole 16K and S pole 16J or a center between the S pole 16J and N pole 16I) or its vicinity is located in the same angular position as the center of the electric signal generation unit 31D. In this state, the tip end portions 45Ab and 46Ab of the first and third magnetic bodies 45A and 46A on the magnet 11B-side are substantially parallel to two facing sides of each of the magnets of the N pole 16I and the S pole 16L and are located above the two sides. For this reason, the magnetic flux lines of N pole 16I are guided toward the S pole 16L via the first magnetic body 45A, the magnetosensitive part 41A and the third magnetic body 46A, and the magnetic domain wall is formed in the length direction of the magnetosensitive part 41A (first timing). Also, when the magnet 11B rotates by 90°, the direction of the magnetic domain wall in the magnetosensitive part 41A is reversed. At this time, in the present embodiment, since the neutral section is wide, the magnetic field in the magnetosensitive part 41A is reversed sharply due to the rotation of the magnet 11B, so that it is possible to generate a higher output pulse more stably from the magnetosensitive member 47.

Fourth Embodiment

Figure 14:
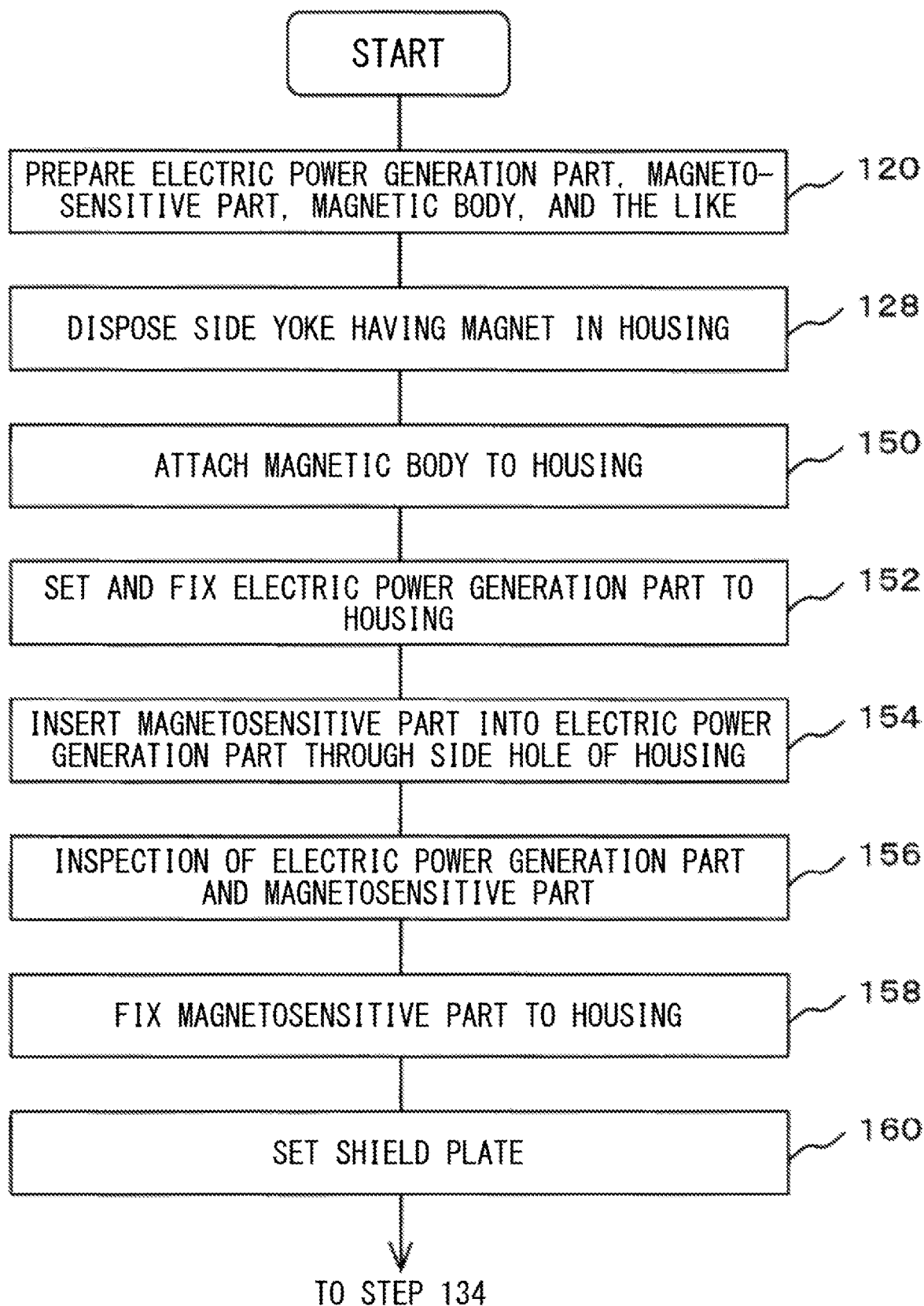
FIG. 14 is a flowchart showing a manufacturing method of an encoder device in accordance with a fourth embodiment.

A fourth embodiment is described with reference to a flowchart of FIG. 14, and FIG. 15A and FIG. 15B. Note that, in FIG. 14, and FIG. 15A and FIG. 15B, the parts corresponding to FIG. 6A and FIG. 9A are denoted with the same reference signs, and the detailed descriptions thereof are omitted. The configuration of the encoder device in accordance with the present embodiment is substantially the same as that of the encoder device EC in accordance with the first embodiment. However, as shown in FIG. 15A, a difference is that a notched portion 6d is provided near a part on the side surface of the housing 6, in which the first and third magnetic bodies 45A and 46A are accommodated, and a side hole 6e, which is a through-hole for inserting the magnetosensitive part 41A, is formed in a sidewall of the notched portion 6d.

Hereinafter, examples of a manufacturing method of the encoder device of the present embodiment and a method of incorporating the magnetosensitive part 41A and the electric power generation part 42A into the housing 6 (a mold) for the encoder device are described. First, in step 128 subsequently to step 120 (preparation process) of FIG. 14, the yoke member 18 (side yoke 18S) on which the magnet 11 is provided is disposed inside of the housing 6, as shown in FIG. 15A. In next step 150, the first and third magnetic bodies 45A and 46A are attached to the groove portion 6b (see FIG. 7A) of the housing 6. Also, in step 152, the electric power generation part 42A is set in the groove portion 6b (between the first and third magnetic bodies 45A and 46A) of the housing 6, and the electric power generation part 42A is fixed to the housing 6 by adhesion or the like. Also, both end portions of the coil of the electric power generation part 42A are connected to the terminals 42Aa and 42Ab.

Figure 15A:
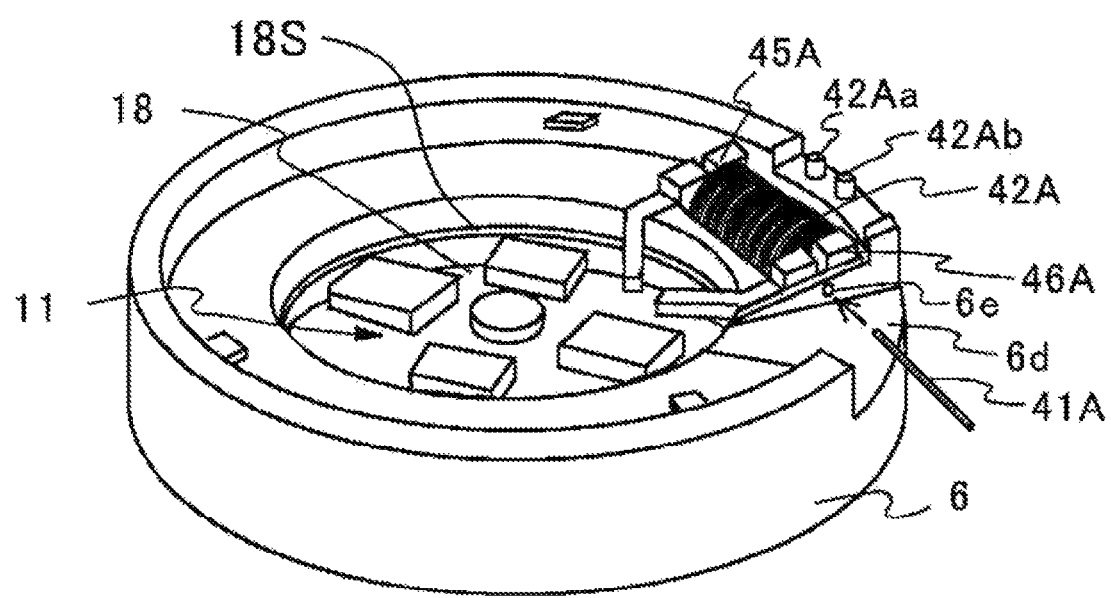
FIG. 15A is a perspective view showing a housing in accordance with the fourth embodiment.

In next step 154, as shown in FIG. 15A, the magnetosensitive part 41A is inserted into the through-hole 42Ac (see FIG. 7A) of the electric power generation part 42A via the notched portion 6d and the side hole 6e of the housing 6. Note that, in the present embodiment, the magnetosensitive part 41A can be inserted into the electric power generation part 42A from a side direction. Therefore, parts of the first and third magnetic bodies 45A and 46A on the electric power generation part 42A-side may also be provided with circular openings, instead of the elongated notched portions 45Aa and 46Aa (see FIG. 2A). In this state, in step 156, the electric power generation part 42A and the magnetosensitive part 41A are inspected as to whether a pulse having a magnitude equal to or more than a predetermined standard is obtained from the electric power generation part 42A by rotating the rotary shaft SF (magnet 11). When a pulse equal to or more than the predetermined standard is obtained, both ends of the magnetosensitive part 41A are fixed to the housing 6 by adhesion or the like, in step 158. Thereby, the electric signal generation unit 31A is completed.

Figure 15B:
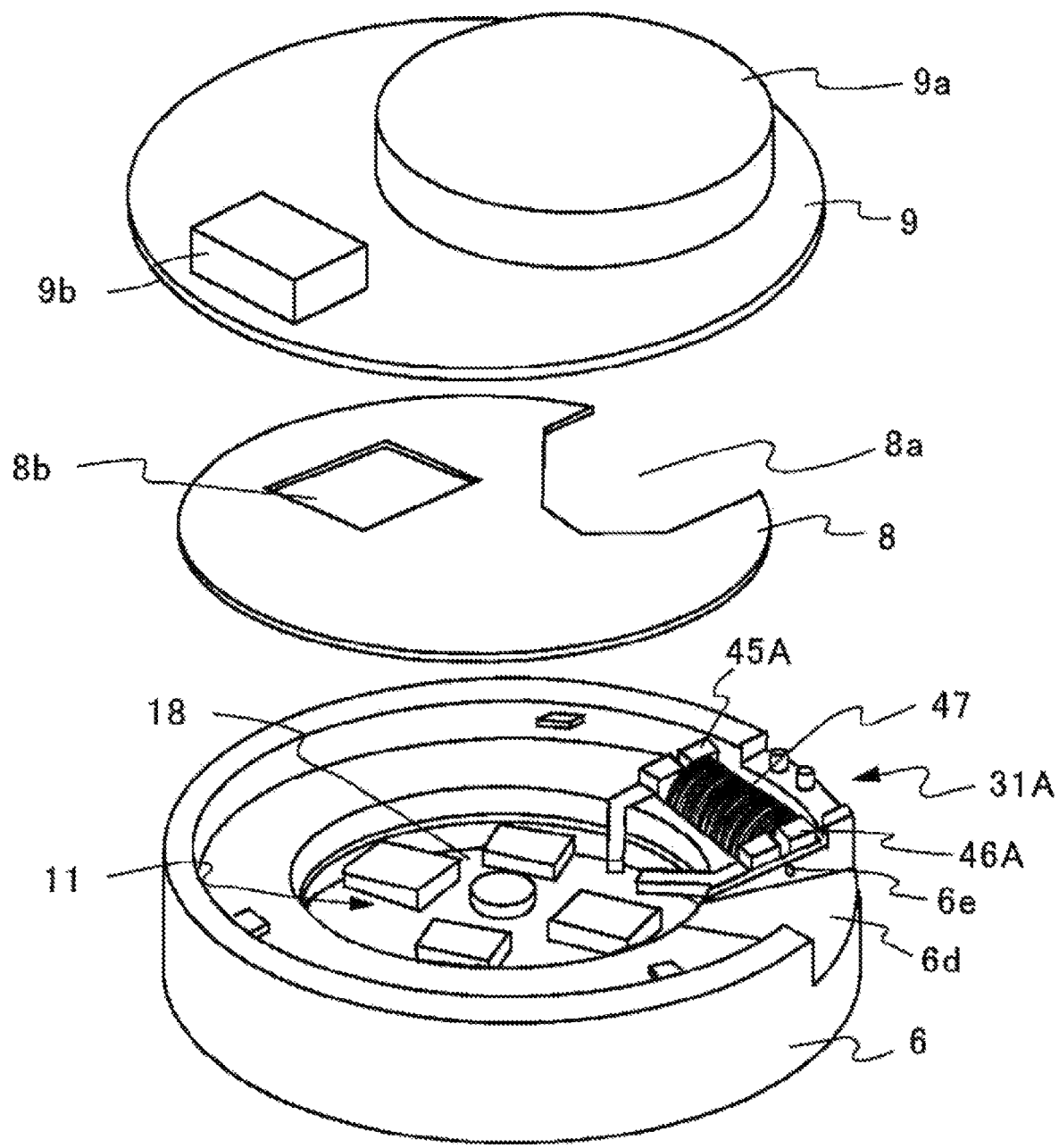
FIG. 15B is a perspective view showing the substrate, the shield plate, and the housing.

Subsequently, in step 160, as shown in FIG. 15B, the shield plate 8 is attached to the housing 6. Also, the processing proceeds to step 134 in FIG. 6A where the sensor substrate 9 is attached, and the completed product is inspected (step S136), so that the encoder device EC is completed. According to the present embodiment, the method comprises step 152 of fixing the electric power generation part 42A to the housing 6 disposed on the side surface of the side yoke 18S (a second magnetic body), step 154 of inserting the magnetosensitive part 41A into the electric power generation part 42A through the side hole 6e (an opening) provided in the housing 6, and step 158 of fixing the magnetosensitive part 41A to the housing 6. In this way, the magnetosensitive part 41A is inserted into the electric power generation part 42A fixed to the housing 6, so that it is possible to efficiently assemble the electric power generation part 42A and the magnetosensitive part 41A, as compared to a case where the assembling jig 44 is used. As a result, it is possible to efficiently manufacture the electric signal generation unit 31A and the encoder device.

Note that, when the plurality of electric signal generation units is provided, like the above embodiments, the electric power that is output from the electric signal generation unit 31A may also be used as a detection signal for detecting the multi-turn information or may be used for supply to a detection system and the like. Note that, in the first embodiment, the magnet 11 is an eight-pole magnet having four poles in the circumferential direction and two poles in the thickness direction. However, the present invention is not limited thereto, and can be changed as appropriate. For example, the number of poles of the magnet 11 in the circumferential direction may be two or may be four or more.

Note that in the above embodiments, the position detection system 1 detects the rotational position information of the rotary shaft SF (moving part), as the position information but may also detect at least one of a position in a predetermined direction, a speed and an acceleration, as the position information. The encoder device EC may comprise a rotary encoder or a linear encoder. Also, the encoder device EC may have a configuration where the electric power generation part and the detection unit are provided on the rotary shaft SF and the magnet 11 is provided outside the moving body (for example, the rotary shaft SF), so that the relative positions of the magnet and the detection unit are changed with movement of the moving part. Also, the position detection system 1 may not detect the multi-turn information of the rotary shaft SF, and may detect the multi-turn information by an external processing unit of the position detection system 1.

In the above embodiments, the electric signal generation units 31A and 31B generate the electric power (electric signal) when a predetermined positional relation with the magnet 11 is satisfied. The position detection system 1 may also detect the position information of the moving part (for example, the rotary shaft SF) by using, as the detection signal, the change in electric power (signal) generated from the electric signal generation units 31A and 31B. For example, the electric signal generation units 31A and 31B may be used as sensors, and the position detection system 1 may detect the position information of the moving part by the electric signal generation units 31A and 31B and one or more sensors (for example, the magnetic sensor and the light-receiving sensor). Also, when the number of the electric signal generation units is two or more, the position detection system 1 may detect the position information by using the two or more electric signal generation units, as sensors. For example, the position detection system 1 may detect the position information of the moving part by using the two or more electric signal generation units, as sensors, without using the magnetic sensors, or may detect the position information of the moving part without using the light-receiving sensor.

Also, the electric signal generation units 31A and 31B may supply at least a part of electric power that is consumed in the position detection system 1. For example, the electric signal generation units 31A and 31B may supply the electric power to a processing unit of the position detection system 1, which has relatively small power consumption. Also, the electric power supply system 2 may not supply the electric power to some of the position detection system 1. For example, the electric power supplying system 2 may intermittently supply the electric power to the detection unit 13 and may not supply the electric power to the storage unit 14. In this case, the electric power may be supplied intermittently or continuously to the storage unit 14 from a power supply, a battery and the like provided outside the electric power supplying system 2. The electric power generation part may generate the electric power by a phenomenon other than the large Barkhausen jump, and for example, may not supply the electric power to the moving part (for example, the rotary shaft SF) and some of the position detection system 1. For example, the electric power supplying system 2 may intermittently supply the electric power to the detection unit 13 and may not supply the electric power to the storage unit 14. In this case, the electric power may be supplied intermittently or continuously to the storage unit 14 from a power supply, a battery and the like provided outside the electric power supplying system 2. The electric power generation part may generate the electric power by a phenomenon other than the large Barkhausen jump, and for example, may generate the electric power by electromagnetic induction associated with the change in magnetic field due to movement of the moving part (for example, the rotary shaft SF). The storage unit in which the detection result of the detection unit is stored may be provided outside the position detection system 1 or may be provided outside the encoder device EC.

[Drive Device]

Figure 16:
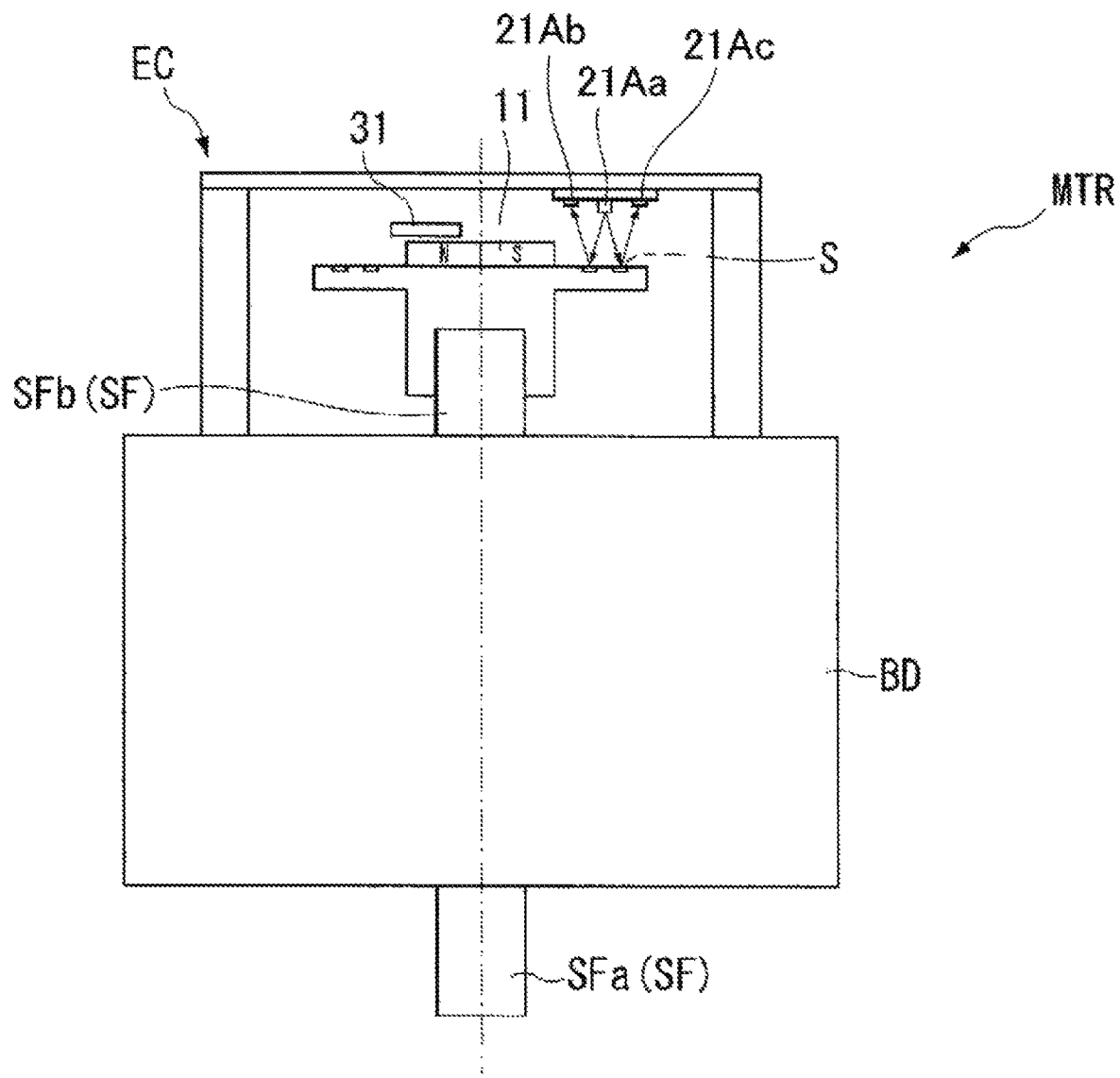
FIG. 16 shows an example of a drive device.

An example of the drive device is described. FIG. 16 shows an example of a drive device MTR. In descriptions below, the constitutional parts that are the same as or equivalent to the above embodiments are denoted with the same reference signs for omitting or simplifying the descriptions. The drive device MTR is a motor device comprising an electric motor. The drive device MTR comprises the rotary shaft SF, a main body part (drive part) BD that rotates the rotary shaft SF, and the encoder device EC that detects the rotational position information of the rotary shaft SF.

The rotary shaft SF has a load-side end portion SFa, and an anti-load-side end portion SFb. The load-side end portion SFa is connected to another power transmission mechanism such as a decelerator. A scale S is fixed to the anti-load-side end portion SFb via a fixing part. The scale S is fixed, and the encoder device EC is attached. The encoder device EC is an encoder device in accordance with the embodiments, the modified embodiments or combinations thereof. As an example, the encoder device comprises an optical detection unit that irradiates the scale S with illumination light from the light-emitting element 21Aa, and detects the light from the scale S by the light-receiving sensors 21Ab and 21Ac to detect the angle information.

In the drive device MTR, the motor control unit MC shown in FIG. 1 controls the main body part BD by using a detection result of the encoder device EC. Since the replacement of the battery of the encoder device EC is not required or is less required, the drive device MTR can reduce the maintenance cost. Note that the drive device MTR is not limited to the motor device, and may also be another drive device having a shaft part that rotates by using a hydraulic pressure or pneumatic pressure.

[Stage Device]

Figure 17:
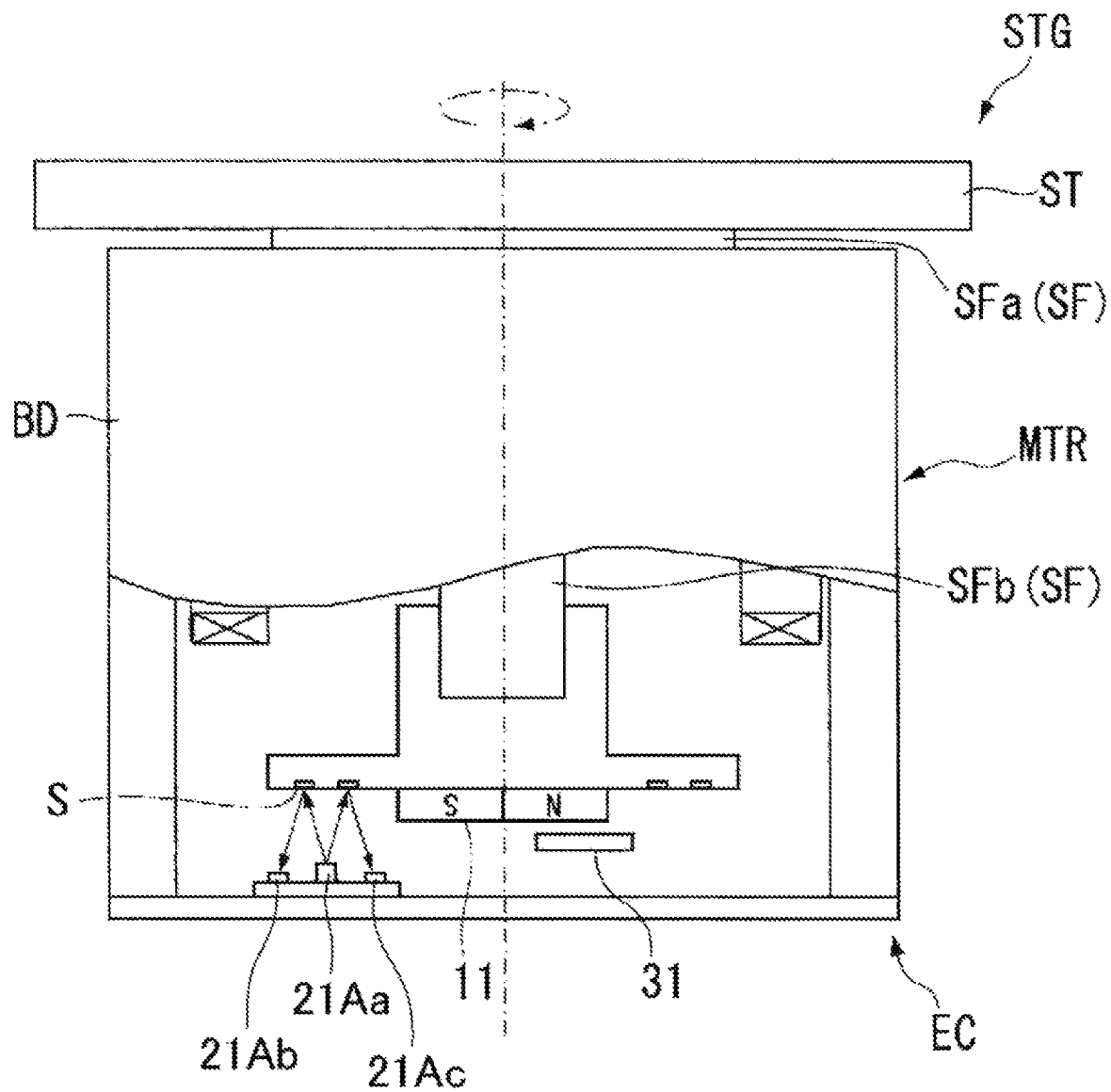
FIG. 17 shows an example of a stage device.

An example of a stage device is described. FIG. 17 shows a stage device STG. The stage device STG has such a configuration that a rotational table (moving object) ST is attached to the load-side end portion SFa of the rotary shaft SF of the drive device MTR shown in FIG. 16. In descriptions below, the constitutional parts that are the same as or equivalent to the above embodiments are denoted with the same reference signs for omitting or simplifying the descriptions.

In the stage device STG, when the drive device MTR is driven to rotate the rotary shaft SF, the rotation is transmitted to the rotational table ST. At this time, the encoder device EC detects the angular position of the rotary shaft SF, and the like. Therefore, it is possible to detect an angular position of the rotational table ST by using an output from the encoder device EC. Note that, a decelerator and the like may be disposed between the load-side end portion SFa of the drive device MTR and the rotational table ST.

Since the replacement of the battery of the encoder device EC is not required or is less required, the stage device STG can reduce the maintenance cost. Note that, the stage device STG can be applied to a rotational table provided in a machine tool such as a lathe, for example.

[Robot Device]

Figure 18:
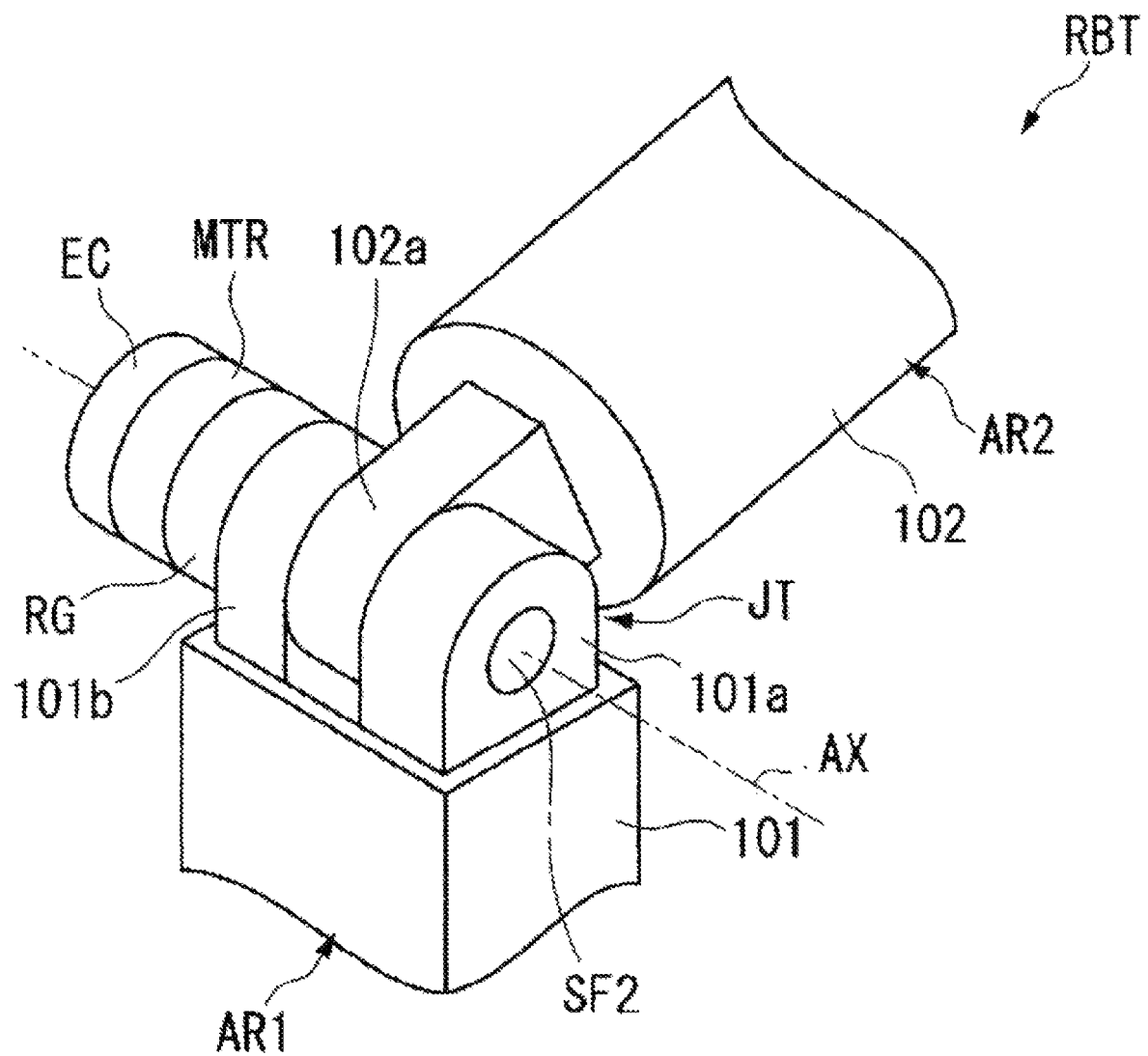
FIG. 18 shows an example of a robot device.

An example of a robot device is described. FIG. 18 is a perspective view showing a robot device RBT. Note that, FIG. 18 pictorially shows a part (joint part) of the robot device RBT. In descriptions below, the constitutional parts that are the same as or equivalent to the above embodiments are denoted with the same reference signs for omitting or simplifying the descriptions. The robot device RBT comprises a first arm AR1, a second arm AR2, and a joint part JT. The first arm AR1 is connected to the second arm AR2 via the joint part JT.

The first arm AR1 includes an arm part 101, a bearing 101a, and a bearing 101b. The second arm AR2 includes an arm part 102 and a connection part 102a. The connection part 102a is disposed between the bearing 101a and the bearing 101b at the joint part JT. The connection part 102a is provided integrally with the rotary shaft SF2. The rotary shaft SF2 is inserted into both the bearing 101a and the bearing 101b at the joint part JT. An end portion on a side of the rotary shaft SF2, which is inserted into the bearing 101b, is connected to a decelerator RG through the bearing 101b.

The decelerator RG is connected to the drive device MTR, and decelerates rotation of the drive device MTR to $1/100$ or the like, for example, and transmits the same to the rotary shaft SF2. Although not shown and described in FIG. 18, the load-side end portion SFa of the rotary shaft SF of the drive device MTR is connected to the decelerator RG. Also, the scale S of the encoder device EC is attached to the anti-load-side end portion SFb of the rotary shaft SF of the drive device MTR.

In the robot device RBT, when the drive device MTR is driven to rotate the rotary shaft SF, the rotation is transmitted to the rotary shaft SF2 via the decelerator RG. The connection part 102a is integrally rotated by the rotation of the rotary shaft SF2, so that the second arm AR2 rotates with respect to the first arm AR1. At this time, the encoder device EC detects an angular position of the rotary shaft SF, and the like. Therefore, it is possible to detect an angular position of the second arm AR2 by using an output from the encoder device EC.

Since the replacement of the battery of the encoder device EC is not required or is less required, the robot device RBT can reduce the maintenance cost. Note that, the robot device RBT is not limited to the above configuration, and the drive device MTR can be applied to a variety of robot devices having a joint.

What is claimed is:

1. An encoder device comprising:
   a position detection unit for detecting rotational position information of a rotary shaft that rotates;
   a magnet that rotates in conjunction with the rotary shaft and in which two types of polarities are alternately provided along a rotating direction of the rotary shaft; and
   an electric signal generation unit for generating an electric signal based on a magnetic characteristic of a magnetosensitive part, the electric signal generation unit having the magnetosensitive part, whose magnetic characteristic is changed by a change in magnetic field associated with rotation of the rotary shaft, and first and third magnetic bodies for guiding magnetic flux lines of the magnet toward the magnetosensitive part, wherein
   the magnetosensitive part is arranged such that there is an interval between the magnetosensitive part and the magnet in a radial direction of the magnet,
   a first end of the first magnetic body and a second end of the third magnetic body contact the magnetosensitive part, and
   a third end of the first magnetic body and a fourth end of the third magnetic body are arranged such that there is an interval toward the magnet in a direction that is parallel to the rotary shaft.

2. The encoder device according to claim 1, further comprising a second magnetic body for guiding magnetic flux lines of a part of the magnet having one polarity toward a part of the magnet having another polarity, the second magnetic body being disposed between the magnet and the magnetosensitive part.

3. The encoder device according to claim 2, wherein
   the magnet has a flat plate shape along the rotating direction and polarities that are also different from each other in a width direction orthogonal to the rotating direction,
   the second magnetic body is provided with a plurality of openings with intervals the same as intervals of the polarities different from each other in the magnet along the rotating direction,
   the first magnetic body is provided between the second magnetic body and the magnetosensitive part, and
   the first magnetic body guides the magnetic flux lines of the magnet toward the magnetosensitive part through the openings of the second magnetic body.

4. The encoder device according to claim 2, wherein
   in the electric signal generation unit, while the rotary shaft rotates one-turn, there is (i) a first timing at which the magnetic flux lines from the magnet pass the magnetosensitive part via the first magnetic body and the third magnetic body and (ii) a second timing at which the magnetic flux lines from the magnet pass the second magnetic body and do not pass the magnetosensitive part, and
   an electric signal is generated in the electric signal generation unit at the first timing.

5. The encoder device according to claim 1, wherein
   a neutral section where the magnetic flux lines from the magnet are not guided toward the magnetosensitive part is provided along the rotating direction of the rotary shaft.

6. The encoder device according to claim 1, wherein
   the magnetosensitive part generates large Barkhausen jump by a change in magnetic field associated with rotation of the magnet.

7. The encoder device according to claim 1, wherein
   the electric signal generation unit generates pulsed electric power by rotation of the rotary shaft.

8. The encoder device according to claim 1, further comprising
   a battery for supplying at least a part of electric power that is consumed in the position detection unit, based on an electric signal generated from the electric signal generation unit.

9. The encoder device according to claim 8, further comprising
   a switching unit for switching whether to supply electric power from the battery to the position detection unit, based on the electric signal generated from the electric signal generation unit.

10. The encoder device according to claim 8, wherein
    the battery includes a primary battery or a secondary battery.

11. The encoder device according to claim 8, wherein
    the position detection unit (i) includes a magnet for detecting positions and a magnetism detection unit, whose mutual relative positions are changed by rotation of the rotary shaft, and (ii) detects the position information, based on a magnetic field formed by the magnet for detecting positions, and
    the magnetism detection unit detects the magnetic field formed by the magnet for detecting positions by using electric power supplied from the battery.

12. The encoder device according to claim 1, wherein
    the position detection unit includes:
    a scale that rotates in conjunction with the rotary shaft,
    an irradiation unit for irradiating the scale with light, and
    a light detection unit for detecting light from the scale.

13. The encoder device according to claim 2, wherein
    the magnet and the second magnetic body each have an annular shape, and
    the magnetosensitive part is disposed outside of an outer surface of the second magnetic body.

14. The encoder device according to claim 13, wherein
    the position detection unit includes:
    an angle detection unit for detecting angular position information within one-turn of the rotary shaft, and a multi-turn information detection unit for detecting, as the position information, multi-turn information of the rotary shaft.

15. A drive device comprising:
the encoder device according to claim 1; and
a power supplying unit for supplying power to the moving part.

16. A stage device comprising:
a moving object; and
the drive device according to claim 15 for rotating the moving object.

17. A robot device comprising:
the drive device according to claim 15; and
an arm for causing relative movement by the drive device.

18. A manufacturing method of an encoder device, the encoder device comprising:
a position detection unit for detecting position information of a moving part;
a magnet having a plurality of polarities along a moving direction of the moving part;
an electric signal generation unit having a magnetosensitive part whose magnetic characteristic is changed by a change in magnetic field associated with movement of the moving part, an electric power generation part for generating an electric signal based on the magnetic characteristic of the magnetosensitive part, and a first magnetic body for guiding magnetic flux lines of the magnet toward the magnetosensitive part; and
a second magnetic body for guiding magnetic flux lines of a part having one polarity of the magnet toward a part having other polarity of the magnet, the second magnetic body being disposed between the magnet and the magnetosensitive part,
the manufacturing method comprising:
preparing the magnetosensitive part, the electric power generation part, and the first magnetic body;
inserting the electric power generation part into a first hole portion of an assembling jig and inserting the magnetosensitive part into a second hole portion provided in the first hole portion through the electric power generation part;
fixing the electric power generation part and the magnetosensitive part each other; and
fixing the electric power generation part taken out from the assembling jig to a housing disposed on a side surface of the second magnetic body.

19. The manufacturing method of the encoder device according to claim 18, further comprising inspecting at least one of the magnetosensitive part and the electric power generation part before the electric power generation part and the magnetosensitive part are mounted to the assembling jig.

20. The manufacturing method of the encoder device according to claim 18, further comprising inspecting the magnetosensitive part and the electric power generation part in a state where the electric power generation part and the magnetosensitive part are mounted to the assembling jig.

21. A manufacturing method of an encoder device, the encoder device comprising:
a position detection unit for detecting position information of a moving part;
a magnet having a plurality of polarities along a moving direction of the moving part;
an electric signal generation unit having a magnetosensitive part whose magnetic characteristic is changed by a change in magnetic field associated with movement of the moving part, an electric power generation part for generating an electric signal based on the magnetic characteristic of the magnetosensitive part, and a first magnetic body for guiding magnetic flux lines of the magnet toward the magnetosensitive part; and
a second magnetic body for guiding magnetic flux lines of a part having one polarity of the magnet toward a part having other polarity of the magnet, the second magnetic body being disposed between the magnet and the magnetosensitive part,
the manufacturing method comprising:
preparing the magnetosensitive part, the electric power generation part, and the first magnetic body;
fixing the electric power generation part to a housing disposed on a side surface of the second magnetic body;
inserting the magnetosensitive part into the electric power generation part through an opening provided in the housing; and
fixing the magnetosensitive part to the housing.

22. The manufacturing method of the encoder device according to claim 21, further comprising inspecting the magnetosensitive part and the electric power generation part in a state where the electric power generation part and the magnetosensitive part are mounted to the housing.

23. The encoder device according to claim 1, wherein
a distance between the first end of the first magnetic body and the second end of the third magnetic body is larger than a distance between the third end of the first magnetic body and the fourth end of the third magnetic body.

24. The encoder device according to claim 1, wherein
the first magnetic body and the third magnetic body extend along a plane that is parallel to a circumferential direction and the radial direction of the magnet.

25. The encoder device according to claim 2, wherein
the magnet has a flat plate shape along the rotating direction and has polarities that are also different from each other in a thickness direction orthogonal to the rotating direction,
the second magnetic body is provided continuously along the rotating direction, and
the first magnetic body is provided from the magnetosensitive part to a position in which the first magnetic body can face the magnet, so as to override the second magnetic body.

* * * * *